May 12, 1964 A. R. CHASAR ETAL 3,132,753

LOAD TRANSFER AND STORAGE APPARATUS AND CONTROL MEANS THEREFOR

Filed May 15, 1959 17 Sheets-Sheet 1

INVENTORS
ANTHONY R. CHASAR
& WALTER F. DOUBLE
BY
Meyer, Baldwin, Doran & Young
ATTORNEYS

LOAD TRANSFER AND STORAGE APPARATUS AND CONTROL MEANS THEREFOR

Filed May 15, 1959

INVENTORS
ANTHONY R. CHASAR
& WALTER F. DOUBLE
BY
Meyer, Baldwin, Doran & Young
ATTORNEYS

LOAD TRANSFER AND STORAGE APPARATUS AND CONTROL MEANS THEREFOR

Filed May 15, 1959 17 Sheets-Sheet 3

INVENTORS
ANTHONY R. CHASAR
& WALTER F. DOUBLE
BY
Meyer, Baldwin, Doran & Young
ATTORNEYS INVENTORS
ANTHONY R. CHASAR
& WALTER F. DOUBLE
BY
Meyer, Baldwin, Doran & Young
ATTORNEYS INVENTORS
ANTHONY R. CHASAR
& WALTER F. DOUBLE
BY
Meyer, Baldwin, Doran & Young
ATTORNEYS May 12, 1964 A. R. CHASAR ETAL 3,132,753

LOAD TRANSFER AND STORAGE APPARATUS AND CONTROL MEANS THEREFOR

Filed May 15, 1959 17 Sheets-Sheet 6

INVENTORS
ANTHONY R. CHASAR
& WALTER F. DOUBLE
BY
Meyer, Baldwin, Doran & Young
ATTORNEYS

LOAD TRANSFER AND STORAGE APPARATUS AND CONTROL MEANS THEREFOR

Filed May 15, 1959

17 Sheets-Sheet 7

INVENTORS
ANTHONY R CHASAR
& WALTER F. DOUBLE
BY
Meyer, Baldwin, Doran & Young
ATTORNEYS INVENTORS
ANTHONY R. CHASAR
& WALTER F. DOUBLE
BY
Meyer, Baldwin, Doran & Yang
ATTORNEYS INVENTORS
ANTHONY R. CHASAR
& WALTER F. DOUBLE
BY Meyer, Baldwin, Doran & Young
ATTORNEYS INVENTORS
ANTHONY R. CHASAR
& WALTER F. DOUBLE
BY
Meyer, Baldwin, Doran & Young
ATTORNEYS INVENTORS
ANTHONY R. CHASAR
& WALTER F. DOUBLE
BY
Meyer, Baldwin, Doran & Young
ATTORNEYS May 12, 1964 A. R. CHASAR ETAL 3,132,753

LOAD TRANSFER AND STORAGE APPARATUS AND CONTROL MEANS THEREFOR

Filed May 15, 1959 17 Sheets-Sheet 12

INVENTORS
ANTHONY R. CHASAR
& WALTER F. DOUBLE
BY
Meyer, Baldwin, Doran & Young
ATTORNEYS INVENTORS
ANTHONY R. CHASAR
& WALTER F. DOUBLE
BY
Meyer, Baldwin, Doran & Young
ATTORNEYS INVENTORS
ANTHONY R. CHASAR
& WALTER F. DOUBLE
BY
Meyer, Baldwin, Doran & Young
ATTORNEYS INVENTORS
ANTHONY R. CHASAR
& WALTER F. DOUBLE
BY
Meyer, Baldwin, Doran & Young
ATTORNEYS INVENTORS
ANTHONY R. CHASAR
& WALTER F. DOUBLE
BY
Meyer, Baldwin, Doran & Young
ATTORNEYS INVENTORS
ANTHONY R. CHASAR
& WALTER F. DOUBLE
BY
Meyer, Baldwin, Doran & Young
ATTORNEYS United States Patent Office 3,132,753
Patented May 12, 1964

3,132,753
LOAD TRANSFER AND STORAGE APPARATUS AND CONTROL MEANS THEREFOR

Anthony R. Chasar, Cleveland, and Walter F. Double, Bainbridge, Ohio, assignors to Triax Equipment, Cleveland, Ohio, a partnership Filed May 15, 1959, Ser. No. 813,585
15 Claims. (Cl. 214—16.4)

This invention relates to improvements in mechanical storage equipment and more particularly to load transfer and storage apparatus.

An object of the present invention is to provide a load transfer, handling, and/or storage apparatus characterized by stacking the maximum number of loads in minimum vertical and horizontal space in any portion of or in the full height from floor to ceiling in a wall type, load stacking storage frame so as to put unused space to work; handling loads with minimum breakage and/or spoilage; automatically storing and retrieving each load by push button control; storing articles in process of manufacture at the manufacturing location instead of at a remote location so as to absorb surges of work in process near the manufacturing operations; having a load receiving position, a load storage position or a plurality of load storage positions, a load discharge position, and a load carrier for moving a load between these positions; having at least some or all of this load carrier movement being automatically effected by an operator using a control at a control position; having a multiplicity of functions provided by some components; providing assurance of satisfactory operation of the apparatus under all conditions; having coaction of the component storage frame and carrier frames such that minimum space is wasted in the load storage frame by operation of these frames and maximum space is retained for storage of loads W; having positive drive to and/or braking action of the different frames of the load carrier; having flexibility of some of the components to permit movement of component parts under adverse conditions and to correct misalignment; having guides to minimize deflection of long members; having automatically operated limit switches and trips therefor carried by component frames of the apparatus to maintain these limit switches and/or trips in proper alignment at all times; having suitable guide means to assure proper entry of a frame of the load carrier into the storage frame in all positions; having means responsive to approaching movement of a load carrier frame at any position or the location of that frame in a position for automatically moving the load carrier to another position; having operational features including thermal overload protection, operation after thermal overload is corrected, manual operation, safety over travel protection, safety jam action to prevent a load carrier from moving a load into a loaded storage frame position to cause damage, and/or service by the load carrier of the load storage frame at positions on either of two opposite sides of the travel zone of said carrier; having cantilever support of the load on the load carrier with means to prevent tipping thereof; having guides for power lines connecting relatively movable frames for protection thereof during this relative movement; having means for relatively moving the frame components; and/or having many other features disclosed herein.

A further object of the present invention is to provide an apparatus characterized by the ease of assembly of its component parts, its structural simplicity, strong and sturdy nature, automatic mode of operation, labor saving features, operating efficiency, ease of operation and use, low operating cost, and/or multiplicity of advantages.

Other features of this invention reside in the arrangement and design of the parts for carrynig out their appropriate functions.

Other objects and advantages of this invention will be apparent from the accompanying drawings and description and the essential features will be set forth in the appended claims.

In the drawings,

FIG. 8 is a horizontal sectional view taken generally along the line 8—8 in FIGS. 7 and 9 through the load carrier with the laterally movable and load support frames thereof removed;

FIG. 13 is a side view of the load carrier and of the switches and trips for controlling the horizontal movement of the load carrier with this view taken generally along the line 13—13 in FIG. 7 and line 13—13 in FIG. 12 but with the vertically movable frame of the carrier in the lowest position with no load thereon;

Before the apparatus here illustrated is specifically described, it is to be understood that the invention here involved is not limited to the structural details here shown and described since an apparatus embodying the present invention may take various forms. It is also to be understood that the phraseology or terminology herein employed is for purposes of description and not of limitation since the scope of the present invention is denoted by the appended claims.

While the present invention might be adapted to various apparatus or uses, it has been chosen to show the same embodied in mechanical storage equipment taking the form of a load transfer and storage apparatus.

*Introduction and Introductory Description*

The load transfer, load handling and/or load storage apparatus disclosed herein is described generally in this section with reference to FIGS. 1–4, and then the invention is described in detail in later sections of the specification with respect to FIGS. 5–24V.

Figure 1:
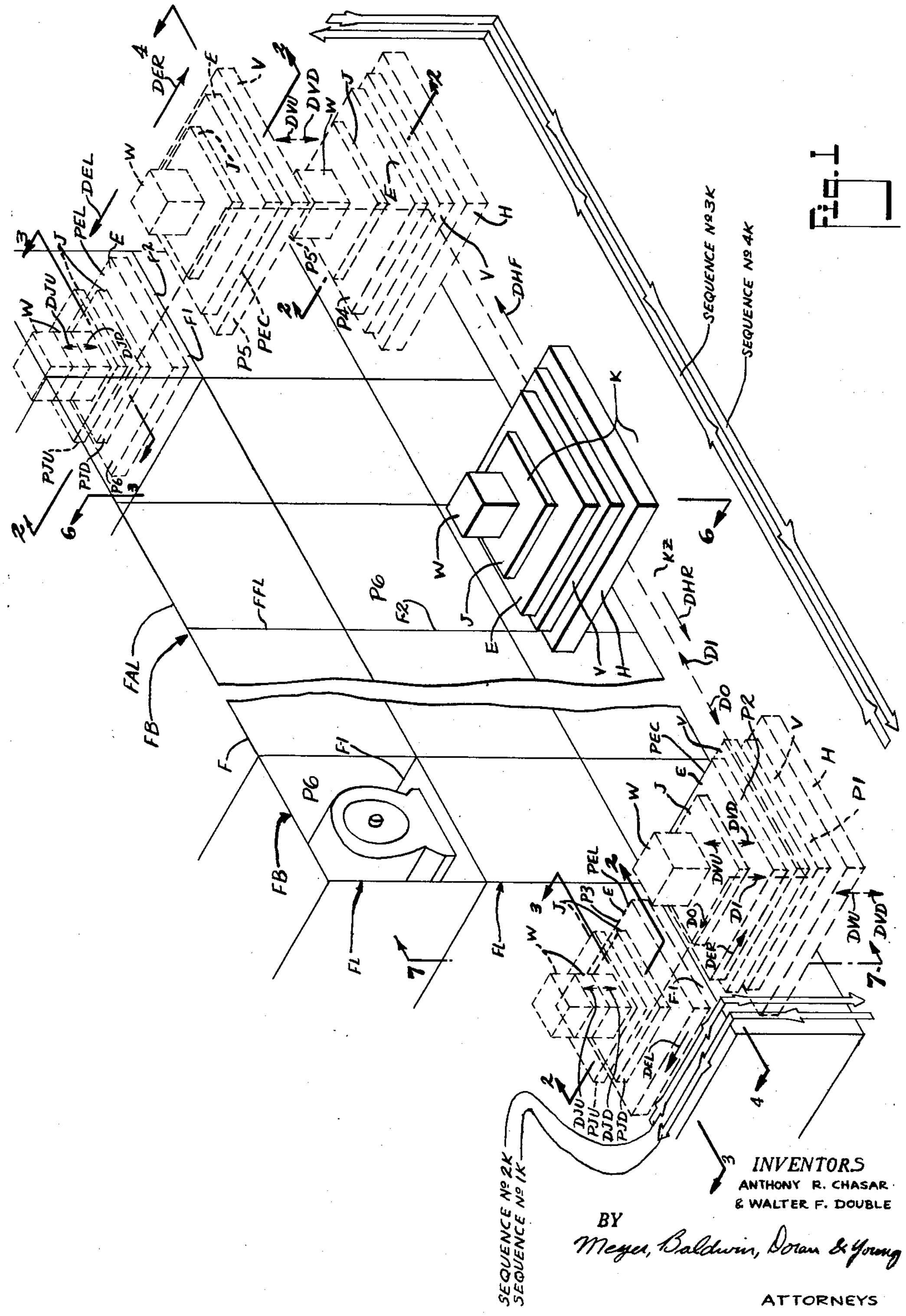
FIG. 1 is a schematic perspective view looking toward the left at the right hand side of a load carrier and at a left panel of a load storage frame with this schematic view showing the mode of operation of the invention and showing by arrows travel sequences frequently described hereinafter.

Load storage frame F has a generally planar work face portion FFL and a carrier travel zone KZ in FIG. 1 located along a side thereof along which a load carrier or carriage K travels and carries a load W. Work face portion FFL has horizontally and vertically arranged in checkerboard pattern in a vertical plane along horizontal directions DHR and DHF and along vertical directions DVU and DVD frame openings F–2 in frame F with a load support surface F–1 at and extending away from each of these openings F–2 on the side opposite carrier travel zone KZ. These openings and surfaces are vertically aligned in horizontally spaced apart bays or stacks FB with each vertically aligned opening or surface in any one bay being at a different level or shelf FL.

Figures 2, 3:
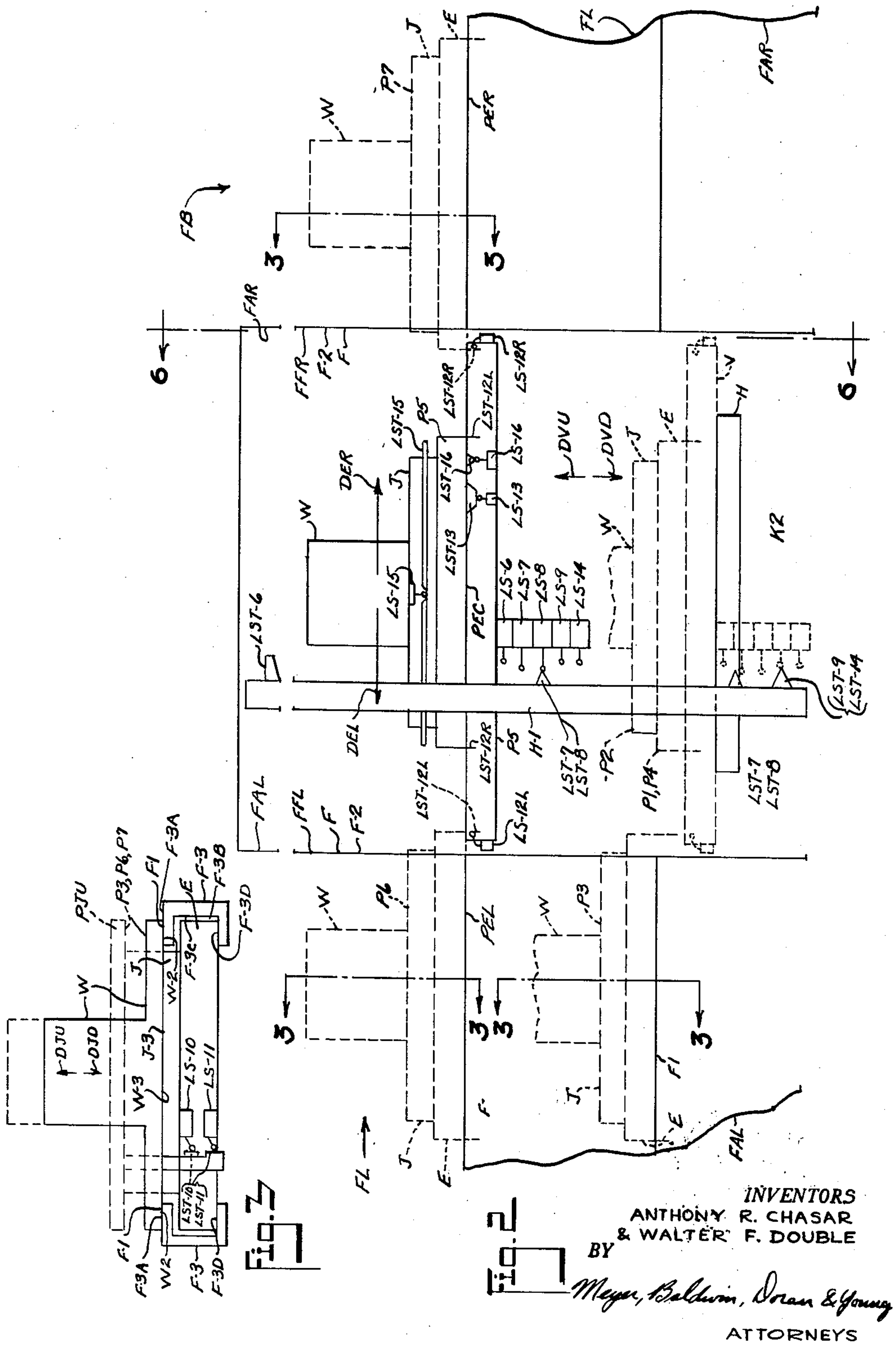
FIG. 2 is a schematic sectional view taken generally along the line 2—2 in FIG. 1.
FIG. 3 is a schematic vertical sectional view of the invention taken generally along any of the lines 3—3 in FIGS. 1 and 2.

Frame F and carrier K provides a plurality of load transfer positions. These include a load receiving or discharging bay aligned, travel zone, load transfer position P1, also sometimes referred to as a reference, starting, or control position P1; a load receiving or discharging level aligned travel zone, load transfer position P2; a load receiving or discharging load support, load transfer position P3; a load storage bay aligned, travel zone, load transfer position P4; a load storage level aligned, travel zone, load transfer position P5; a left load storage support, load transfer position P6; and, as shown in FIG. 2, a right load storage support, load transfer position P7 to be discussed in more detail hereinafter. Load W is received into the apparatus at position P3, is transferred to any suitable storage position P6 (or P7 in FIG. 2) by carrier K with position P6 being merely illustrative of one of the many load storage support positions P6 (or P7 at the opposite side of zone KZ in FIG. 2) which may be located in any one of the checkerboard arranged openings F–2 with suitable load support surface F–1 at each of the many positions P3, P6 or P7.

Figure 6:
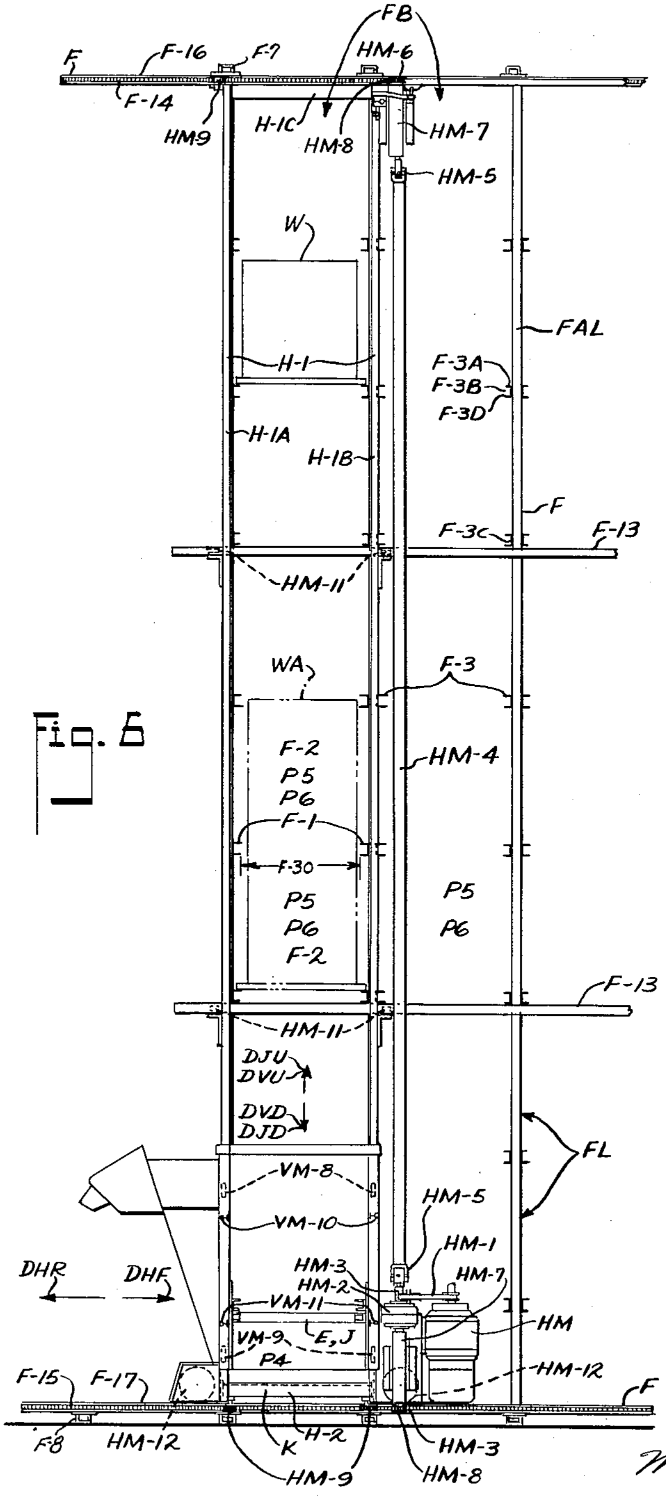
FIG. 6 is a vertical view of the load carrier and load storage frame taken generally along line 6—6 in FIGS. 1 and 2.

Load W may be of any suitable type, such as articles, whether raw materials, in process or finished articles, carried by a skid, pallet, bin, tray, compartmented carrier, etc. Although only the load W is discussed in detail hereinafter, the apparatus will handle either small loads W or large loads WA, as shown in FIG. 6. The articles may be carried on an open skid or pallet, as shown by load W in FIGS. 12 and 14.

Each load support surface F–1 is provided in FIG. 3 by two parallel load support members F–3 at each opening F–2 with these members being of substantially identical cross section at each opening and arranged in horizontally spaced apart relationship as mirror images. Each load support member F–3 in FIG. 3 is of generally U-shape in cross section with the parallel legs of the U-shapes being horizontally arranged. Generally U-shape is intended to include not only the U-shape illustrated but also C-shape, a double L-shape with one L inverted and with the vertical flanges secured together, etc. surface XF–1 being on a load support surface F–1 is on top of the upper horizontal legs on the two opposed members F–3.

A load carrier K is provided for moving load W from one of these positions to another with the load being moved in the carrier travel zone KZ horizontally by load carrier frame H and vertically by carrier frame V relative to stationary frame F, and being moved by carrier frames E and J between travel zone KZ and any of the load support surfaces F–1 through its associated opening F–2. Carrier K has these aforementioned frames for load carrying including horizontally movable frame H, also called a load advancer and retriever or horizontal carriage, driven in travel zone KZ in horizontal forward direction DHF or horizontal reverse direction DHR between positions P1 and P4 in FIG. 1 by motor HM in FIGS. 6 and 21; vertically movable frame V, also called an elevator or vertical carriage, movable vertically in vertical up direction DVU or vertical down direction DVD between positions P1 and P2 or positions P4 and P5 in FIG. 1 by motor VM in FIGS. 8 and 21 with this vertical movement being along mast H–1 in FIG. 2 secured to and vertically extending up from the remainder of frame H; laterally movable frame E, also called a load inserter and extractor, movable in horizontal or lateral left direction DEL or lateral or horizontal right direction DER in FIG. 1 between position PEL and PEC (or PER and PEC at position P7) at position P3 or P6 by a motor EM in FIGS. 8 and 21; and load support frame J, also called a jack, movable in vertical up direction DJD or vertical down direction VJD in FIG. 1 between a load supporting or up position PJU and a load released or down position PJD at positions P3, P6 or P7 by motor JM in FIGS. 8 and 21. These directions of movements of load carrier frames H, V, E, and J are shown in solid line arrows in the drawings and the electrical or hydraulic components for causing these respective movements upon energization have the respective directions of movements they cause shown in dotted line arrows closely associated therewith.

Frame F includes a right frame panel FAR in FIG. 2 having a right work face portion FFR arranged with left work face portion FFL on left frame panel FAL in two parallel planes straddling travel zone KZ. At each position P5, there is a left panel storage position P6 and a right panel storage position P7 straddling carrier K in position P5 with position P7 having a load support surface F–1, opening F–2, and two load support members F–3 shown in FIG. 3 in the same manner as the corresponding left panel position P6 so that carrier frame E may move to left out position PEL in position P6 in the left panel or to right out position PER in position P7 in the right panel, whichever is desired by the operator of the apparatus.

The invention includes a control means for controlling the movement of the frames of its carrier K for transferring its load W between a selected first support surface F–1 at one load transfer position P2 and P3 to a second selected load support surface at another of these positions P5 and P6 or P7 for providing carrier loading action at one of these positions and unloading action at the other position by sequential movement of the frames of the carrier. The invention will be described by sequential movement of the frames in the following manner. Carrier K will be in position P1. Then, carrier K will move in out direction DO from position P1 to position P3 and in direction DI from position P3 to position P6 by frame V moving in direction DVU from position P1 to position P2 in FIG. 1, frame E moving from in position PEC to left out position PEL in direction DEL, frame J moving in direction DJU from position PJD to PJU to engage and lift the load W off the load support surface F–1 at position P3, frame E moving in direction DER from position PEL to position PEC to place load W in position P2, frame V moving in direction DVD from position P2 to position P1, carrier K moving from position P1 in direction DHF to position P4 by propelling frame H, frame V moving in direction DVU from position P4 to position P5, frame E moving in direction DEL from position P5 to P6, and frame J moving in direction DJD from position PJU to PJD to transfer load W onto load support surface F–1 at position P6. Then, carrier K will move in out direction DO from position P6 to position P1 or P4 by frame E moving in direction DER back to position PEC in position P5 without load W, and frame V moving in direction DVD to position P4. Frame H moves carrier K from position P4 automatically back to position P1. Then, the empty carrier K will be returned back to position P6 to pick up load W thereat by movement of frame J in direction DJU from position PJD to position PJU at position P6 so as to pick up and return load W back to position P3 for discharge from the apparatus by having frame J move in direction DJD at position P3 from position PJU to position PJD. It will be readily apparent that this same control means may be used for transferring load W from one position P6 and P5 to another position P6 and P5 in frame F; and in the same manner in FIG. 2 for position P7 as has been described for position P6, and in FIG. 2 between different positions P6 and P7.

Figures 12, 14, 15:
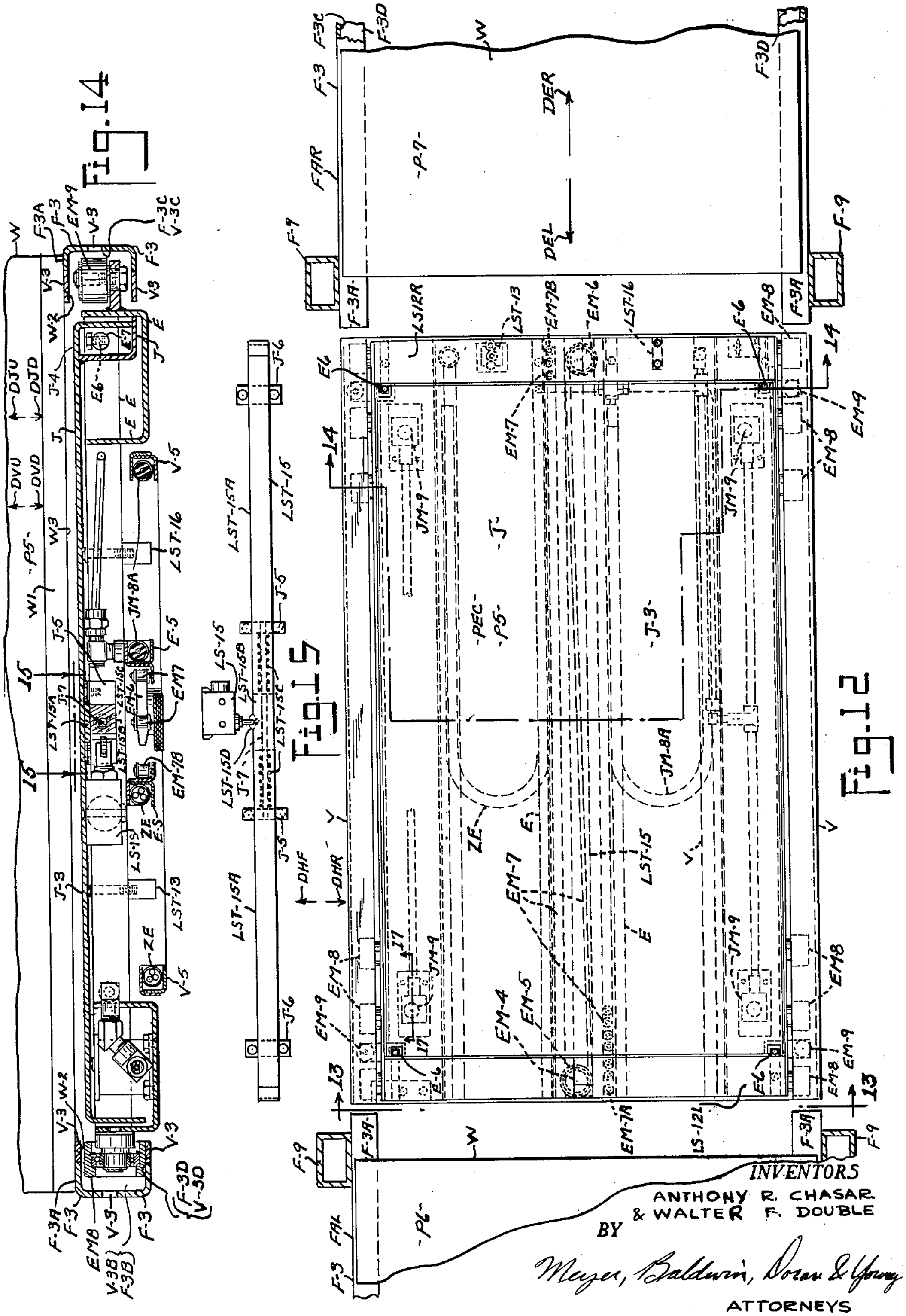
FIG. 12 is a top view of the load support and laterally movable frames of the load carrier and of a portion of the left and right storage frame panels taken generally along the line 12—12 in FIG. 9.
FIG. 14 is a vertical sectional view through the load carrier taken generally along the line 14—14 in FIG. 12 with the corners of the U-shape channel members at the left and right ends of this view cut away on the vertically movable frame to show portions of U-shape channel members of the storage frame therebehind in section.
FIG. 15 is a vertical view of limit switch LS-15 and its trip LST-15 removed from the load carrier with this view of these parts taken generally along the line 15—15 in FIG. 14.

Load W includes a flat bottomed skid W–1 in FIG. 14 on which articles or other members may be carried to make the complete load W. Load W is handled by having its bottom load support surfaces W–2 on skid W–1 and surfaces W–3 on skid W–1 engaged respectively by load support surfaces F–3A and J–3 on frames F and J.

By using the load stacking concept, it is possible to stack the maximum number of loads in minimum vertical and horizontal space in full height from floor to ceiling so as to put unused space to work. It is possible to stack a maximum number of loads with minimum aisle or travel zone width. The apparatus handles the loads with minimum breakage or spoilage, and as will be more apparent hereinafter, automatically stores or retrieves each load by push button control. The storing of articles in process of manufacture at the manufacturing location is easily performed instead of at a remote location. Then, it utilizes the manufacturing plant's vacant overhead air space, absorbs surges of work in process storage near the manufacturing operations, keeps the plant aisles clean and safe and free from clutter, minimizes labor cost, etc. The apparatus is relatively simple, considering the number of complex operations performed, and has low maintenance.

The remainder of the specification will describe the invention in generally the following manner. There will be described frames F, H, V, E and J and their component parts; the drives for and movements of frames H, V, E, and J by motors HM, VM, EM, and JM; and the power circuits and the arrangement of their electrical components. The movement of a load W received by the apparatus for storage will be described with this movement being from position P1 to position P2, P3, P2, P1, P4, P5, P6 where the load is stored in left hand panel FAL. Then, movement of the empty carrier K will be described from position P6 to position P5 and P4, and back to position P1. Then, the empty carrier K will be returned to position P6 to withdraw load W from storage in frame F and return it back to position P3 for discharge from the apparatus. The same operation will be described for storing and removing a load from position P7 in FIG. 2 in right hand panel FAR. Then, the invention will be described as to the effect of manual control of the movements of the component frames of the carrier, safety over travel feature for the carrier, safety feature to prevent damage by moving the carrier with a load into a loaded opening in the storage frame, and thermal overloads on the electrical components thereof. Then, there will be more general comments on advantages and the specific features of the invention.

The reference numerals have been picked to relate to similarity of functions of the different components of the apparatus. In general, the letters and the reference numerals refer as follows: B for motor brake or load storage frame bay; C for motor starter coil, solenoid coil for valve control, center position, or relay coil; D for direction of travel, down direction, or down position; E for laterally movable frame E or component parts, driving motor and component parts for moving this frame between the positions; or the position of this frame; F for load storing frame, its component parts, forward direction, or fast speed of a motor; H for horizontal frame H or component parts, driving motor and component parts driven thereby, the position of this frame, or horizontal direction; I for the in direction; J for load supporting frame J or component parts, driving motor and component parts driven thereby, or the position of this frame; K for load carrier, and for advancing or returning travel sequences; L for power line or storage frame level, or left direction or position; LC for latching relay latching coil; LR for latching relay; LS for automatically actuated limit switch; LST for limit switch trip; M for motor, motor driven components for moving a carrier frame, or manual returning sequence of the frames; N for counter circuit component in FIGS. 23H or 24V or for the counter therein; O for the out direction; OL for overload relay component; P for carrier or load position; R for right direction or position, reverse direction, or relay; S for slow motor speeds, or manually or automatically operated switches; T for transformer or terminals connecting component electrical diagrams on different drawing sheets; U for the up direction or up position; UC for latching relay unlatching coil; V for vertical direction, vertically movable frame V or component parts, driving motor and component parts driven thereby, or the position of this frame; W for load or weight; Y for fluid control valves; and Z for load carrier travel zone or miscellaneous components. The numbers following the dash in each reference number relate to the number of the relay or switch contact, component of one of the frames, and/or component part driven by the motor causing motion of a carrier frame.

To avoid repetition, the described movement of carrier K between the positions has been schematically shown in FIG. 1 as "Travel Sequence No. 1K, 2K, 3K, or 4K." Each sequence is once completely defined hereinafter as to the movement of the frames of carrier K between the positions, and as to the circuits formed and broken and the actions of the switches required for this movement. Then, each sequence is subsequently referred to by number.

*Frames F, H, V, E and J and Their Component Parts*

In FIGS. 5–24V, load storage frame F, horizontally movable frame H, vertically movable frame V, laterally movable frame E and load support frame J are generally designated by F, H, V, E and J respectively with the respective components of these frames designated, whenever possible, by F, H, V, E and J followed by a hyphen and a number, for example load support member F–3.

Figure 4:
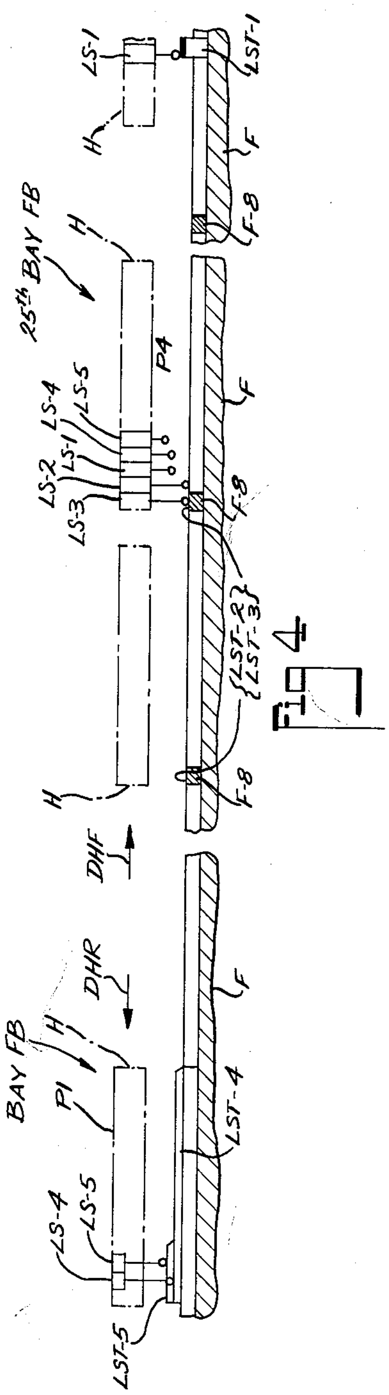
FIG. 4 is a schematic view of the invention taken generally along the line 4—4 in FIG. 1.
Figure 5:
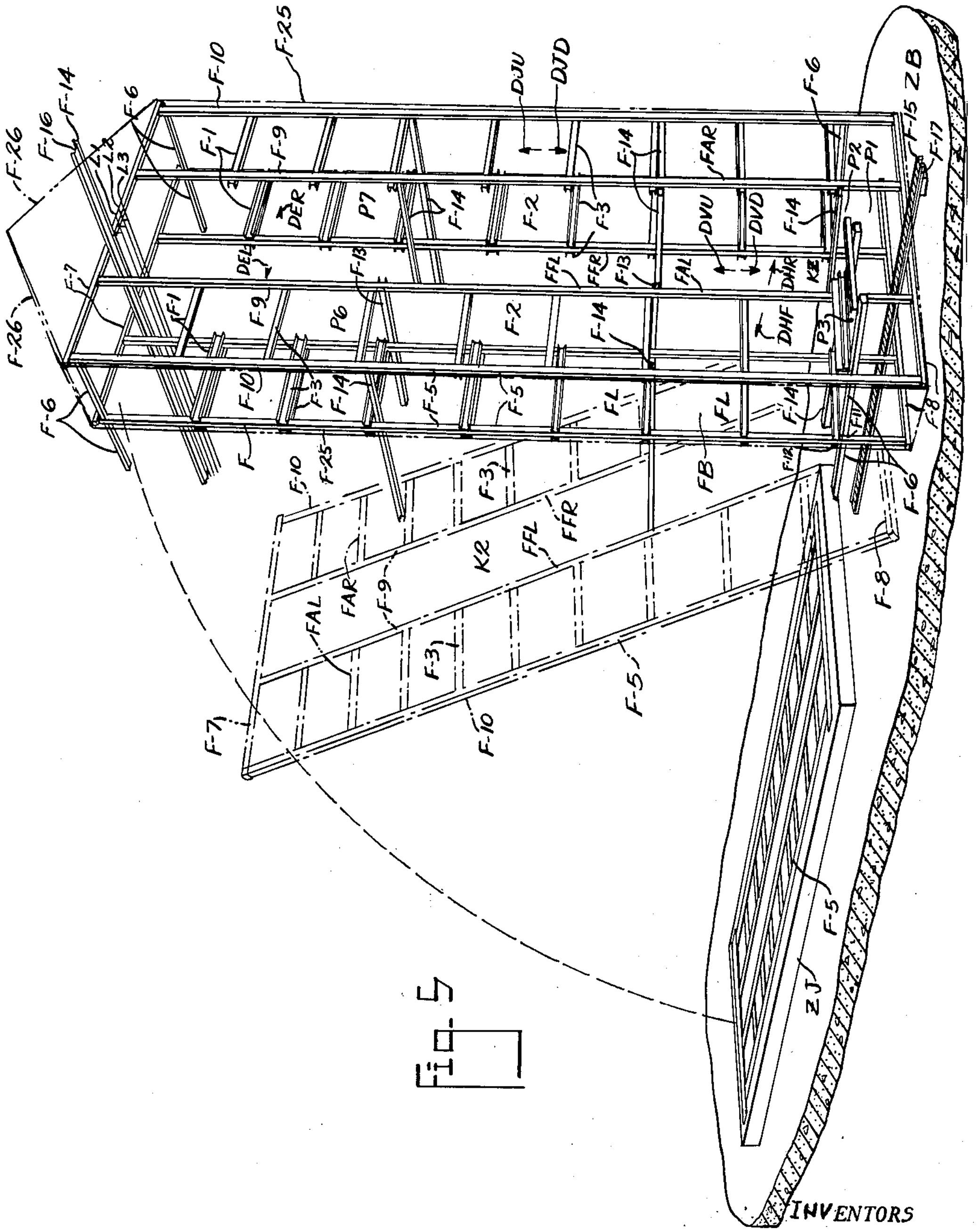
FIG. 5 is a perspective view of a portion of the load storage frame, a horizontal jig for assembling transverse frame sections of this load storage frame, and the dotted line path of travel each section follows during erection.

Load storage frame F is shown in FIGS. 1, 2, 3, 4, 5, 6, 7, 7A, 7B, 9, 12 and 13. This frame F has left workface portion FFL and right workface portion FFR arranged in two parallel planes in FIG. 5 with load carrier travel zone KZ therebetween. Each face portion has horizontally and vertically arranged load storage frame openings F–2 therein formed by the structural members thereof and load support members F–3 forming load support surfaces F–1 at and extending outwardly from each face and opening. Storage frame F may be of any vertically height or horizontal extent but only a portion thereof is shown in FIG. 5 for purposes of illustration and description of the method of constructing and erecting frame F and the structure thereof.

A suitable method of constructing frame F is as follows. First, pour cement base ZB with a level and planar top surface for receiving the storage frame F. Second, weld together in horizontal jig ZJ the load support members F–3 and other structural members to form identical, separate and horizontally oriented transverse frame sections F–5. Each of these transverse frame sections F–5 has an inner rectangular shape defining travel zone KZ and being the approximate cross sectional shape of this zone to establish uniform zone width, an outer rectangular shape forming the outer boundaries of the load support surfaces F–1, two vertically extending inner structural members F–9 defining the workface portions FFL and FFR of the left and right panels FAL and FAR respectively to establish a uniform width to zone KZ, two parallel outer structural members F–10, and structural members F–9 and F–10 welded to opposite ends of the load support members F–3 and welded at top and bottom to top and bottom structural members F–7 and F–8 so as to form the inner rectangular shape with members F–9 an dthe outer rectangular shape with members F–10 considered with member F–7 and F–8. It is preferred that the component members of transverse frame section F–5 be welded together in jig ZJ so that the shape thereof will be fixed; however, any suitable method of attachment could be used if not all of the advantages of the present invention are desired. Third, swing these completed sections F–5 by a pivoting action on bottom member F–8 sequentially in a clockwise direction in FIG. 10, as shown by the diagonally extending section F–5, along the dot-dash line of movement from horizontal orientation in jig ZJ to vertical position for assembly with the remainder of frame F on base ZB. Fourth, connect sequentially spacing members F–6 by bolt and nut units F–11 in FIG. 7A at opposite ends of adjacent members F–6 to adjacent member F–10 of section F–5 to space these sections F–5 horizontally apart as identical frame sections F–5, as shown by the two erected frame sections F–5 on the right in FIG. 5, equally spaced along and extending generally transversely to zone KZ to form the finished load storing frame F having workface portion FFL and FFR, openings F–2, a load support surface F–1 at each opening, and travel zone KZ with this zone being of substantially uniform width along its length. Since the pitch, or horizontal spacing along zone KZ, between corresponding surfaces on transverse frame sections F–5 in the erected frame F must be accurately maintained to avoid cumulative error along the length of zone KZ, one or more shims F–12 in FIG. 7A may be inserted between one or both ends of each horizontal spacing member F–6 and associated member F–10 during assembly to maintain accuracy of horizontal spacing between bays FB and of opening F–2 if members F–6 and F–10 are not maintained to suitable size tolerances. Fifth, after all transverse frame sections F–5 have been assembled in the erected frame F, there may be suitably assembled to sections F–5 by welding, a nut and bolt connection, or otherwise attaching the following members of frame F shown as protruding beyond the ends thereof in FIG. 5: the frame members forming load receiving or discharging position P3, upper and lower gear rack members F–14 and F–15, upper and lower rail members F–16 and F–17 for supporting frame H during horizontal travel, eight reinforcing members F–14 and two reinforcing members F–13 with members F–13 also serving as side guide members F–13 and with each of these members F–13 and F–14 secured to a member F–9 or F–10 by a bracket F–13A in FIG. 7B having two horizontal bolts in each member to maintain sections F–5 equally spaced apart along the length of zone KZ, and overhead power lines L1, L2 and L3.

Each support member F–3 has in FIGS. 3 and 14 a load support surface F–3A, and a laterally extending guide way F–3B with a surface L-shape in transverse section comprising a horizontally extending frame guide surface F–3D and a vertical surface F–3C.

Note, that the rigid shape of each section F–5 maintains width and shape of zone KZ, of each frame opening F–2, of load support surface F–1, and of support guide surface F–3C and F–3D for frame E in frame F.

Although the illustrated construction of frame F is the stronger and the preferred construction, it should be readily apparent that alternate constructions come within the scope of the present invention. For example, first, if suitable modification is made, outer structural members F–10 may be eliminated to provide a weaker but otherwise satisfactory construction in some instances with load support members F–3 being supported in cantilever fashion from structural members F–9. Second, eliminating the portion of member F–7 or F–8 extending across zone KZ may be done, and especially if the bottom of frame F is firmly imbedded in a base, such as base ZB.

A building to house the apparatus may be constructed at minimum cost. Frame members F–7, F–8 and F–10 in FIGS. 5 and 7 form in framework outline a right parallelopiped. This framework may serve as the structural framework for a building to house the apparatus by having secured suitable weather resistant covering material, such as paneling or siding F–25 and roofing F–26 shown in dot-dash lines in FIG. 5, over the exterior of frame F and across travel zone KZ. Then, frame panels F–5 in FIG. 5 and cement base ZB are respectively the structural framework and floor for the building.

Frame H in FIGS. 2, 6, 8 and 9 includes interconnected frame members including base H–2 having secured and upwardly extending therefrom mast H–1 comprising two parallel channels or mast sections H–1A and H–1B connected together at their upper ends by connecting member H–1C; and vertical gear racks H–3A and H–3B secured respectively to mast sections H–1A and H–1B.

Frame V in FIGS. 8, 9, 13 and 14 includes interconnected frame members including two U-shaped channel members V–3 arranged as mirror images with each having a laterally extending guide way V–3B with a vertical guide surface V–3C and a horizontal guide surface V–3D thereon, and including two U-shaped channel members V–5 in FIG. 14.

Frames E and J include respectively two U-shaped channel members E–5 in FIG. 14 and load support surface J–3 in FIG. 13 for carrying load W.

Frame J includes two guide blocks J–5 and two guide blocks J–6 in FIGS. 14 and 15 with pin J–7 secured to and extending between blocks J–5.

*Horizontal Driving Movement of Frame H by Motor HM*

Means is provided for moving horizontally movable frame H of load carrier K horizontally relative to load storage frame F in opposite horizontal forward and reverse directions DHF and DHR between positions P1 and P4 into alignment with or away from any preselected load bay FB.

In FIGS. 6, 7, 8, 9 and 13, many drive components for driving frame H of carrier K by motor HM are designated by the reference numeral HM followed by a hyphen and a number, for example, drive belt HM–1.

Figure 21:
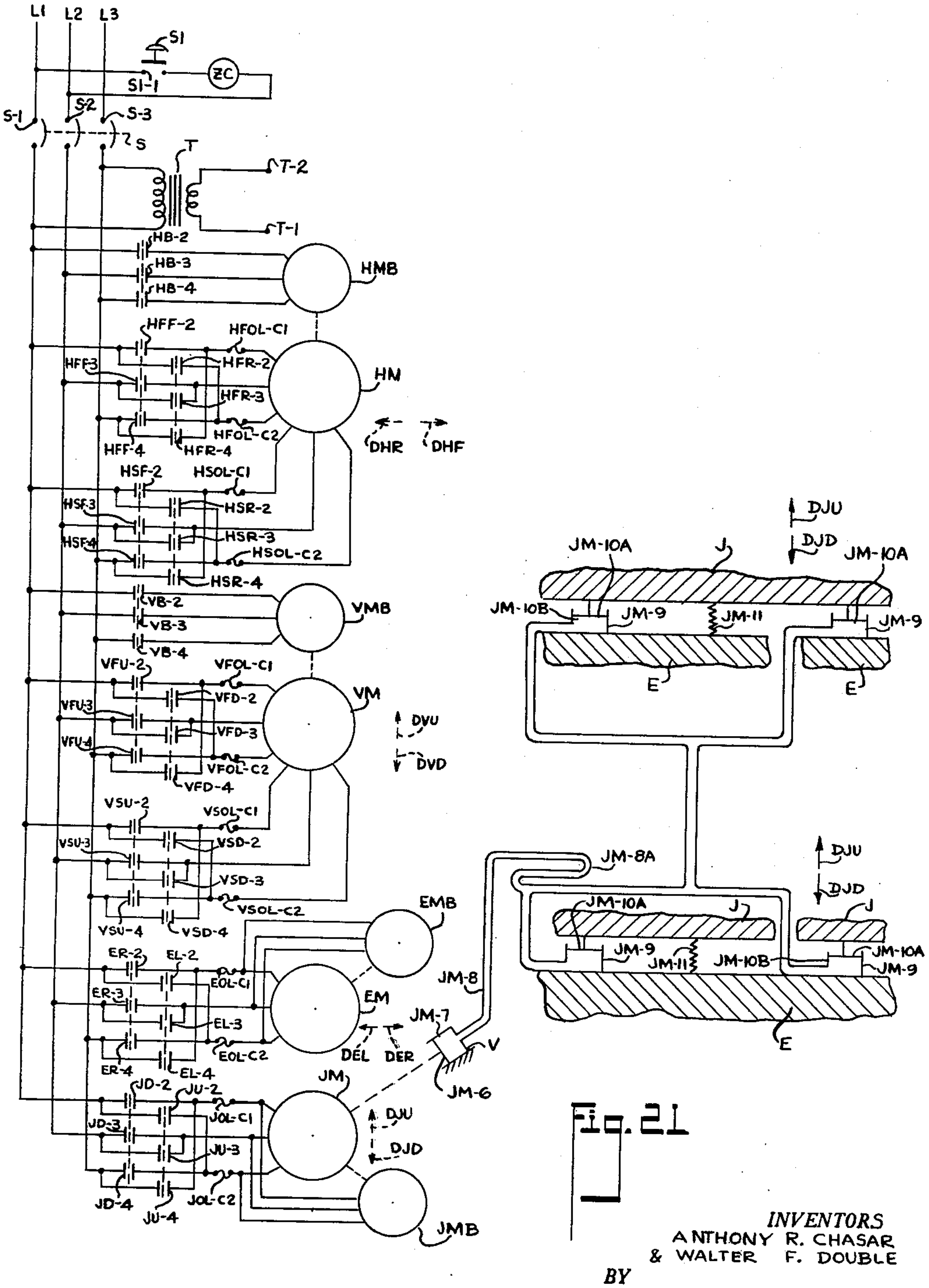
FIG. 21 is an electrical diagram of main power lines, driving motors, motor brakes, and hydraulic flow diagram for moving and controlling the frames of the load carrier.

Motor HM is a two speed, reversible electric motor secured to frame H. Motor HM and brake HMB in FIG. 21 are both contained within a common housing in FIG. 6, 8 and 13.

As motor HM rotates, it drives drive belt HM–1, of the timing belt type with teeth provided to assure synchronization and to prevent slip; speed reducer HM–2 on frame H; and speed reducer output shaft HM–3 of speed reducer HM–2. The frame H is driven at the upper end of mast H–1 from shaft HM–3 in FIGS. 6 and 7 through lower universal joint HM–5, center shaft HM–4, upper universal joint HM–5 and upper driven shaft HM–6. Shaft HM–3 has on its lower end and shaft HM–6 has on its upper end drive pinions or gears HM–8 rotatably carried by top and bottom ends of mast H–1 meshing with upper and lower gear racks F–14 and F–15 respectively on frame F at the top and bottom of zone KZ to drive frame H horizontally in direction DHF or DHR with these shafts HM–3 and HM–6 each rotatably mounted in bearing blocks HM–7 on frame H. The frame H also has rotatably mounted thereon on the upper and lower ends thereof idler pinions HM–9 in FIGS. 6, 7 and 9 each rotatable about a vertical axis parallel to the axis of rotation of shafts HM–3 and HM–6. Each of these pinions HM–8 and HM–9 has a back up roller HM–10 rotatably secured to frame H and rolling on the opposite side of its rail member F–16 or F–17 in FIGS. 7 and 9 to maintain the pinion gear in driving relationship with the respective rack F–14 or F–15. The frame H also has mounted on brackets on each mast section H–1A or H–1B two vertically spaced apart guide rollers HM–11 traveling in channel members F–13 to minimize lateral sway of mast H–1. The weight of frame H is supported by two support rollers HM–12 rotatably secured to frame H and rolling on lower rail F–17.

It should now be apparent that rotation of reversible motor HM in one direction will move frame H in direction DHF and in the opposite direction will move frame H in direction DHR.

*Vertical Driving Movement of Frame V by Motor VM*

Means is provided for moving vertically movable frame V of load carrier K vertically relative to load storage frame F and horizontally movable frame H in opposite vertical up and down directions DVU and DVD between positions P1 and P2 or P4 and P5 into alignment with the preselected level FL at a load support surface F–1.

In FIGS. 6, 7, 8, 9 and 13, many drive components driving frame V of carrier K by motor VM are designated by the reference numeral VM followed by a hyphen and a number, for example, drive belt VM–1.

Motor VM is a two speed, reversible electric motor. Motor VM and brake VMB in FIG. 21 are both contained within a common housing in FIGS. 8 and 9.

As motor VM on frame V rotates, it drives a speed reducer VM–2, mounted on frame V, by a drive belt VM–1 of the timing type. Hollow output sleeve VM–3 in FIG. 8 of speed reducer VM–2 has telescopically mounted therein live shaft VM–4 keyed thereto to permit relative axial movement of shaft VM–4 in sleeve VM–3 for assembly purposes with the left end of this shaft VM–4 in FIG. 8 rotatably mounted in outboard bearing VM–7 on frame V. Pinion gears VM–5 and VM–6 are secured to opposite ends of this line shaft VM–4 and coact respectively with parallel, vertical racks H–3B and H–3A on mast H–1 to drive frame V upwardly in direction DVU on forward rotation of motor VM and downwardly in direction DVD on reverse rotation of motor VM.

Figures 9, 10, 11:
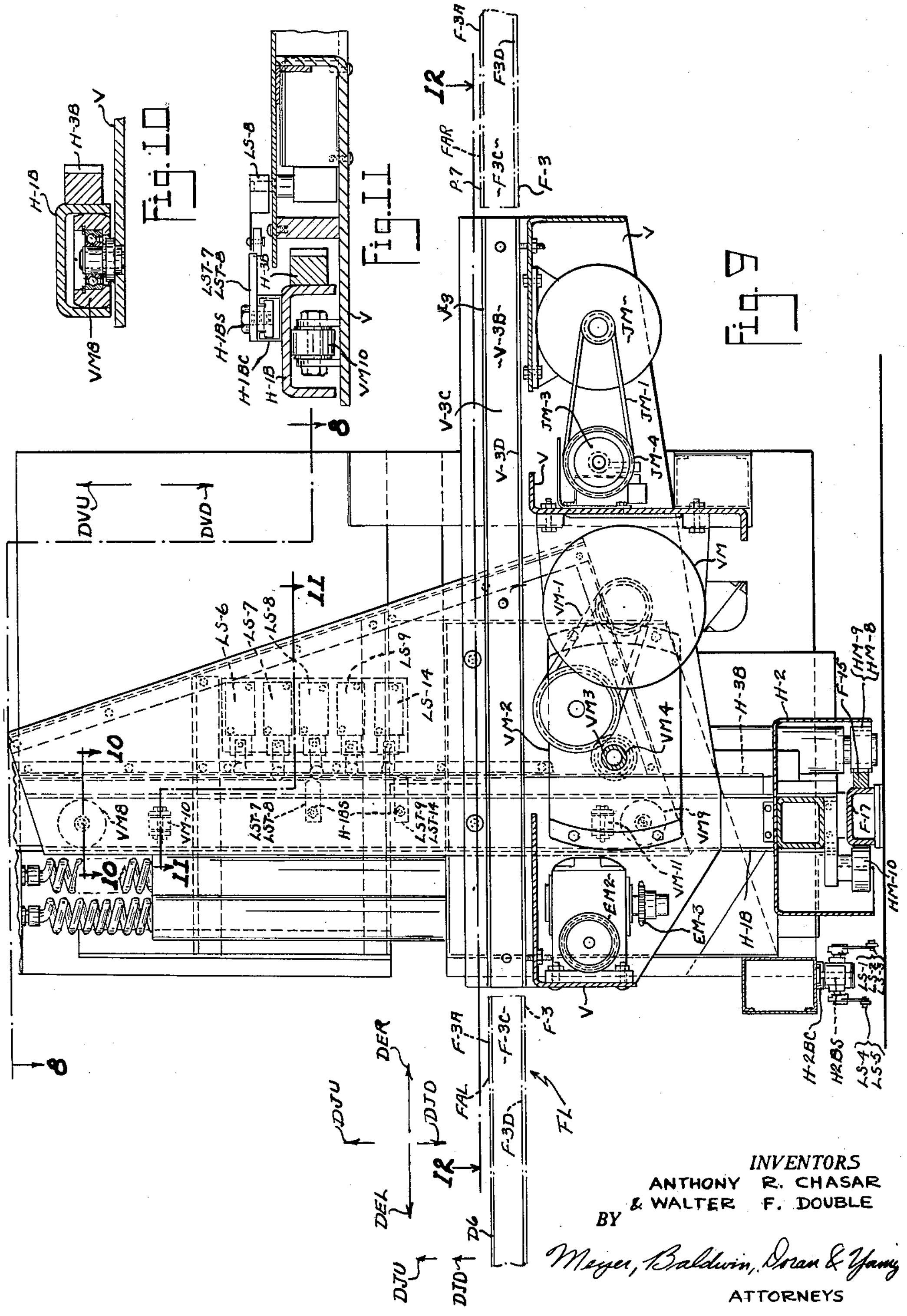
FIG. 9 is a vertical sectional view of the load carrier taken generally along the line 9—9 in FIG. 8 with the vertically movable frame moved up to a storage opening level.
FIG. 10 is a horizontal sectional view taken generally along the line 10—10 in FIG. 9.
FIG. 11 is a horizontal sectional view taken generally along the line 11—11 in FIG. 9 through the load carrier.

Frame V is rotatably supported and guided on mast H–1 during vertical movement. At its upper end, pairs of rollers VM–8 and VM–10 are rotatably mounted on frame V, and at its lower end, pairs of rollers VM–9 and VM–11 are rotatably mounted on frame V. Each of the two rollers VM–8 and of the two rollers VM–9 engage one of two opposite, parallel, inside channel surfaces of U-shape channel frame member H–1A or H–1B, as shown in FIGS. 6, 8, 9, 10 and 13, and each of the two rollers VM–10 and of the two rollers VM–11 engage the connecting surface at the bottom of the channel in U-shaped frame member H–1A or H–1B, as shown in FIGS. 6, 11 and 13.

It should now be apparent that rotation of reversible motor VM in one direction will move frame V in direction DVU and in the opposite direction will move frame V in direction DVD.

*Lateral Driving Movement of Frame E by Motor EM*

Means is provided for moving laterally movable frame E of load carrier K laterally relative to load storage frame F and vertically movable frame V in opposite lateral left and right directions DEL and DER between centered or in and left out or right out positions PEC and PEL or PER in alignment with load support surface F–1 in out position PEL or PER at load transfer position P3, P6 or P7 for permitting transfer of load W relative to this load support surface between frames J and F.

Figure 7A:
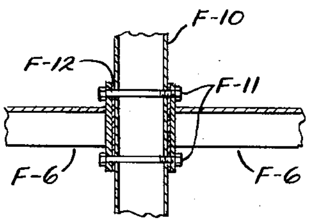
FIG. 7A is a vertical sectional view taken along the line 7A—7A in FIG. 7.
Figure 7B:
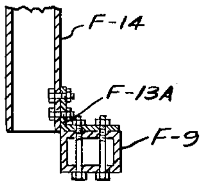
FIG. 7B is a horizontal sectional view taken generally along the line 7B—7B in FIG. 7.
Figure 7:
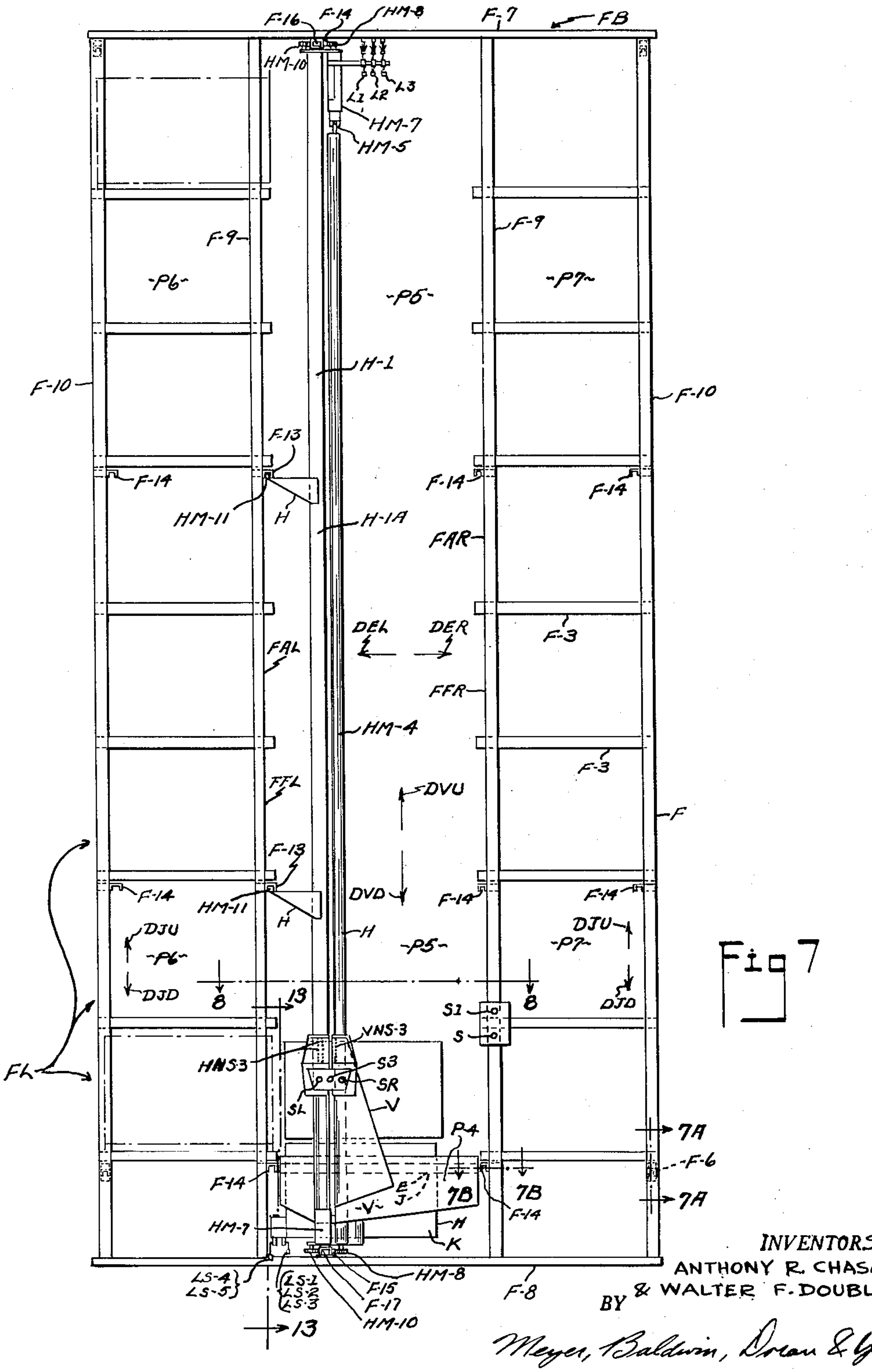
FIG. 7 is a vertical view of the load carrier and load storage frame taken generally along the line 7—7 in FIG. 1.

In FIGS. 8, 9, 12, 13 and 14, many drive components for driving frame E in FIGS. 6 and 7 of carrier K by motor EM are designated by the reference numeral EM followed by a hyphen and a number, for example, driving belt EM–1.

Motor EM is a single speed, reversible electric motor. Motor EM and brake EMB in FIG. 21 are both contained within a common housing in FIG. 8.

As motor EM, mounted on frame V, rotates, it drives worm gear type speed reducer EM–2 in FIGS. 8 and 9 on frame V by a driving belt EM–1 of the timing type. Speed reducer EM–2 drives shaft EM–4, rotatably mounted on frame V, by a belt EM–3A driven by an output sheave EM–3 on speed reducer EM–2. Idler sprocket EM–6 in FIGS. 8, 12 and 14 is rotatably mounted on frame V and driving sprocket EM–5 in FIGS. 8, 12 and 13 is secured to shaft EM–4 rotatably mounted on frame V with a flexible means, such as sprocket chain EM–7, folded twice back upon itself in S-shape, trained around these sprockets in the manner illustrated, and connected by opposite end portions EM–7A and EM–7B to frame E so these opposite end portions of this chain EM–7 move with frame E while sprockets EM–5 and EM–6, or other suitable wheel means, rotate about vertical parallel axes on frame V.

Frame E is suitably guided in travel between positions PEC, PEL and PER. Frame E has twelve rollers EM–8 in FIGS. 12, 13 and 14 rotatably mounted on frame E for rotation about parallel and horizontal axes to support frame E in the proper vertical position and guide it in its lateral or horizontal direction of movement between parallel members V–3 of frame V and parallel members F–3 of frame F on respective horizontal surfaces V–3D and F–3D. Four rollers EM–9 in FIGS. 12, 13 and 14 are rotatably secured to frame E for rotation about four vertical and parallel axes to restrict lateral movement of frame E in direction DHF and DHR during the travel of frame E in opposite horizontal directions DEL and DER with these rollers EM–9 adapted to bear against the connecting vertical surfaces V–3C and F–3C of the U-shape channels V–3 and F–3 of frames V and F respectively. Rollers EM–8 travel on and are supported by channel type frame member F–3 when in storage frame F and travel on and are supported by channel members V–3 when on frame V.

It should now be apparent that rotation of reversible motor EM in one direction will move frame E in direction DEL and in the opposite direction will move frame E in direction DER.

*Vertical Driving Movement of Frame J by Motor JM*

Means is provided for moving load support frame J of load carrier K vertically relative to load support surface F–1 on load storage frame F and relative to laterally movable frame E in opposite vertical up and down directions DJU and DJD between load supporting or up and load released or down positions PJU and PJD at a load support surface F–1 in out position PEL or PER of frame E at load transfer positions P3, P6 or P7 for transferring load W relative to this load support surface F–1 between frames J and F for picking up load W from or depositing load W on load support surface F–1 by load support surface J–3 on frame J in left or right panel FAL or FAR.

In FIGS. 8, 9, 12, 13, 14, 17, 18, 19, 20 and 21, many drive components for driving frame J in FIGS. 6 and 7 of carrier K by motor JM are designated by the reference numeral JM followed by a hyphen and a number, for example, driving belt JM–1.

Motor JM is a single speed, reversible electric motor. Motor JM and brake JMB in FIG. 21 are both contained within a common housing in FIGS. 8 and 9.

Figure 18:
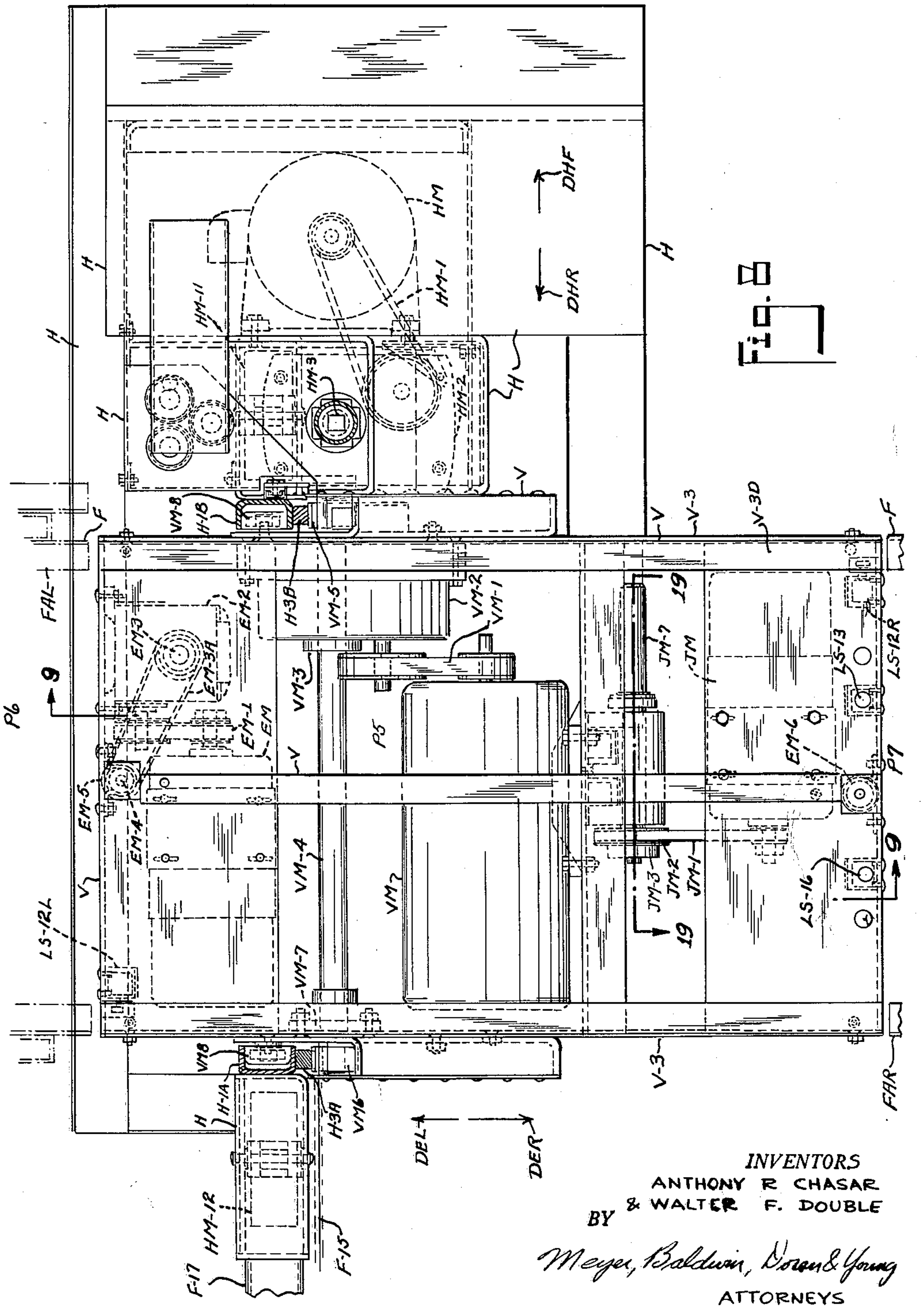
FIG. 18 is a top plan view taken generally along the line 18—18 in FIG. 17.
Figure 19:
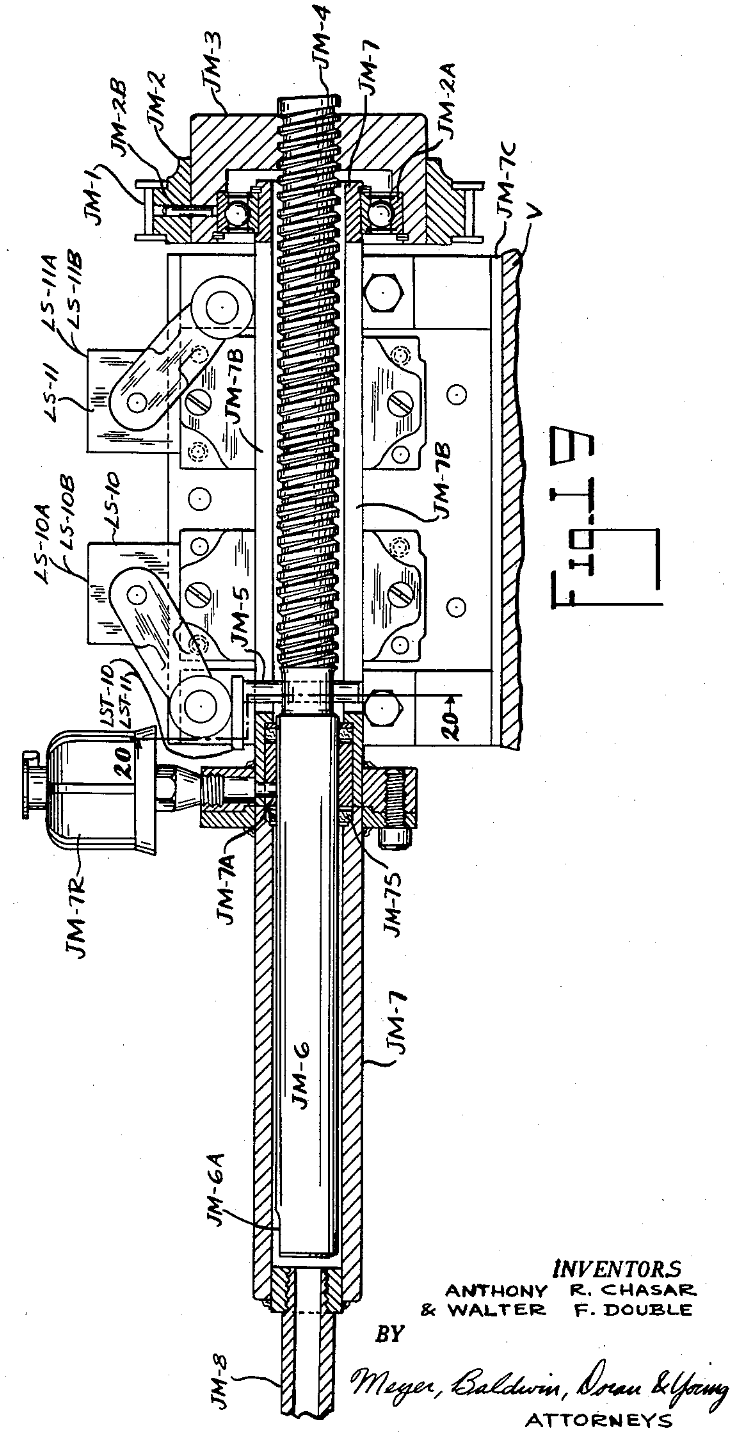
FIG. 19 is a vertical sectional view taken generally along the line 19—19 in FIG. 8.

As motor JM on frame V rotates, it drives in FIGS. 8, 9 and 19 rotatable lead screw nut JM–3, rotatably mounted on frame V, by a driving belt JM–1 of the timing type driving pulley JM–2 keyed against rotation on nut JM–3 by dowel pin JM–2B and rotatable on stationary cylinder JM–7 by bearing JM–2A secured to cylinder JM–7 by straddling retainer rings. Piston lead screw JM–4 is carried by plunger JM–6 with this lead screw JM–4 and plunger JM–6 telescopically movable within cylinder JM–7 by plunger JM–6 traveling in bronze sleeve bearing JM–7A of cylinder JM–7 and keyed against rotation with respect thereto by pin key JM–5, extending through screw JM–4, with its opposite ends traveling in parallel grooves JM–7B in the wall of cylinder JM–7 secured to frame V by mounting bracket JM–7C in FIG. 20. A flexible fluid line JM–8, having U-shaped portion JM–8A in FIGS. 12, 13, 14 and 21, connects the end of cylinder JM–7 in FIGS. 19 and 21 to each of the four single acting jack motors JM–9 in FIGS. 12, 17, 18 and 21 connected in parallel thereto, located at the four corners of frame J, and operatively connecting frames E and J.

Figure 17:
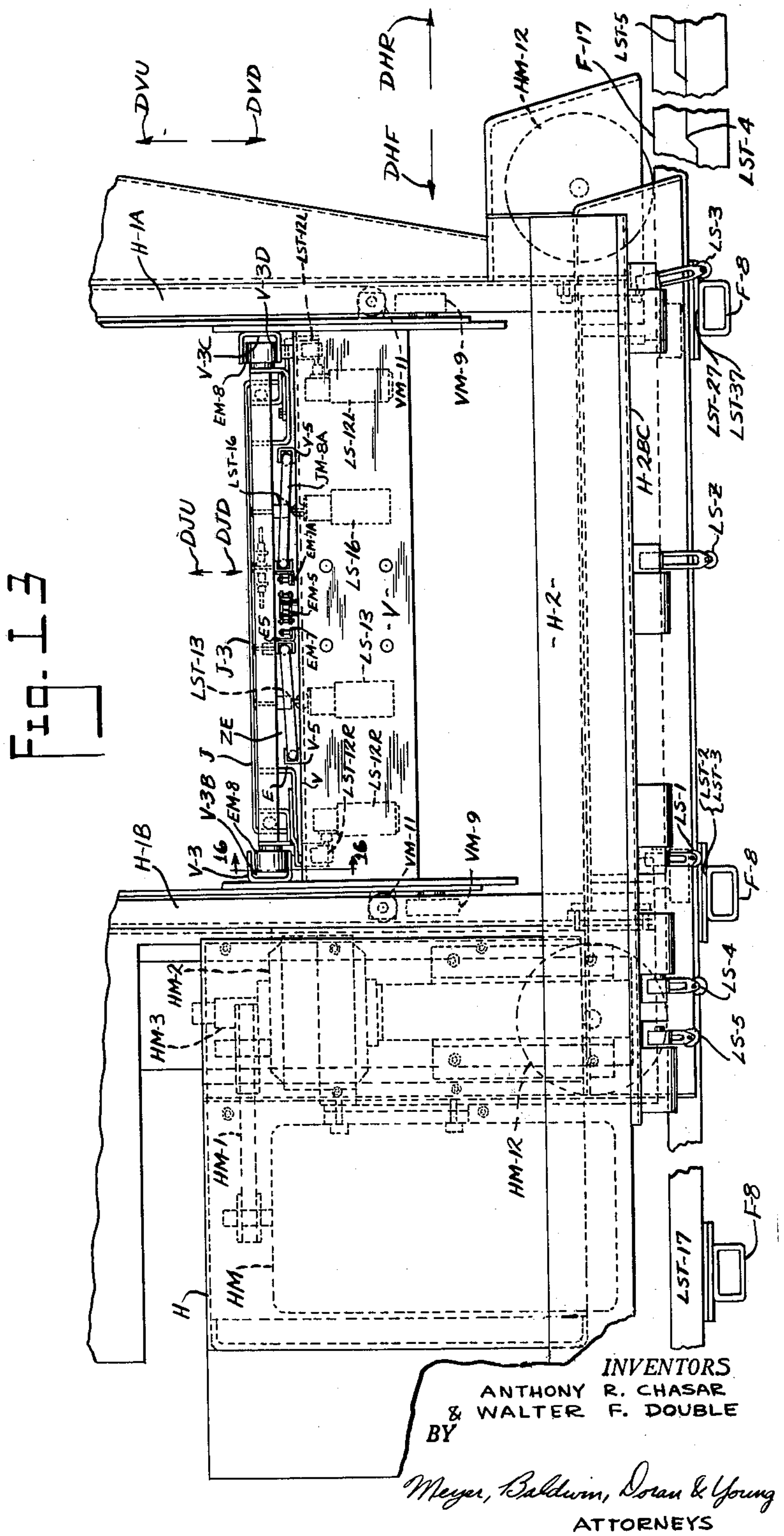
FIG. 17 is a vertical sectional view through the load carrier taken generally along the line 17—17 in FIG. 12.
Figure 18:
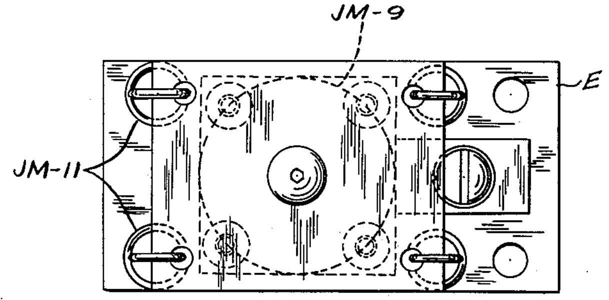
Figures 16, 17, 20:
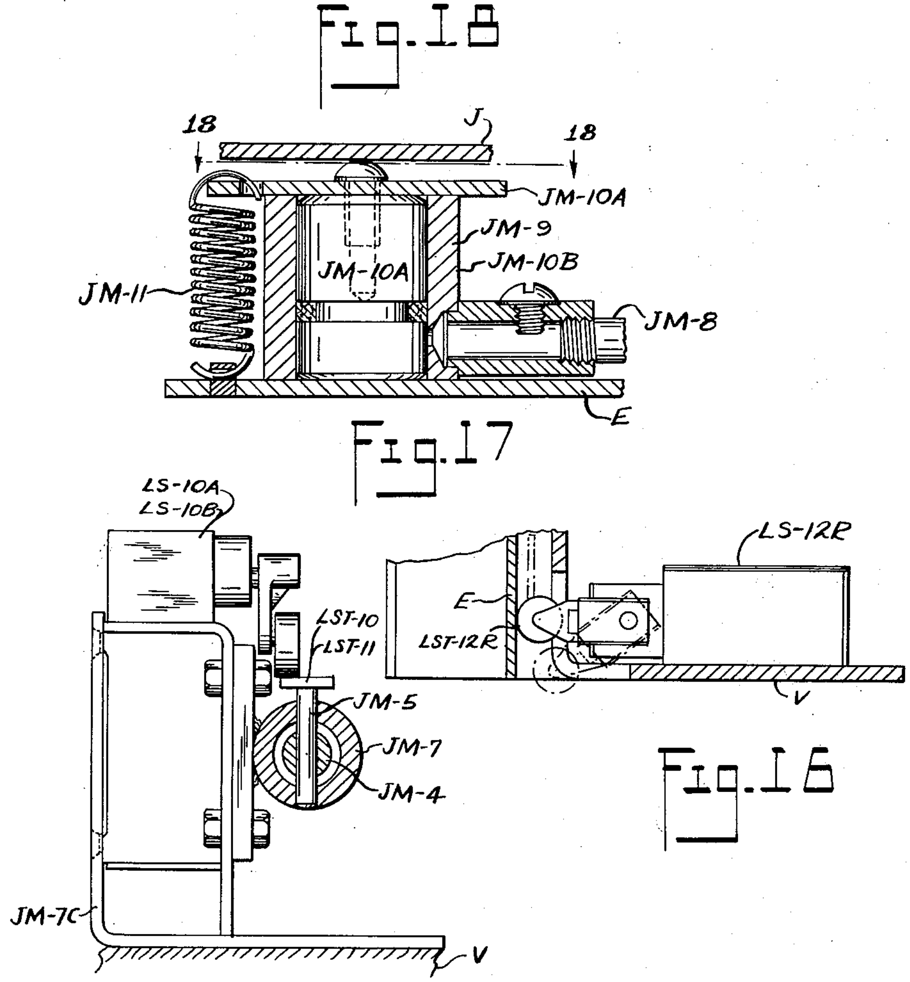
FIG. 16 is a vertical sectional view taken generally along the line 16—16 in FIG. 13 but with the laterally movable frame nearly fully extended in the solid line position and fully extended in the dot-dash line position into the right hand load storage frame panel to actuate the associated limit switch.
FIG. 20 is a vertical view taken generally along the line 20—20 in FIG. 19.

As motor JM rotates in the direction for moving frame J up in direction DJU, it advances piston JM–6 toward the left in FIG. 19 to force fluid from cylinder JM–7 into the lower end in FIG. 17 of jack cylinders JM–10B of each jack motor JM–9 in FIG. 12 to raise along a generally vertical axis plunger JM–10A therein of each of these jack motors JM–9 to thus raise frame J, with which these plungers engage in FIG. 17, from position PJD to position PJU determined by the bottom of screw E–6 at the right of FIG. 14, and at each of the four corners of frame E in FIG. 12, bearing against frame J. Screw E–6 has a screw driver slot in its top end reached through hole J–4 in frame J for vertically adjusting position PJU and screw E–6 threaded into a hole in frame portion E–7 of frame E.

As motor JM rotates in the opposite direction to move frame J in down direction DJD, four extension springs JM–11, connecting frame E and each piston JM–10A in FIGS. 17 and 18, pull piston JM–10A downwardly to permit gravity to lower frame J as piston JM–6 is moved toward the right in FIG. 19 by motor JM to withdraw the fluid from each of the four single acting jack motor JM–9.

When piston JM–6 is in its right hand position in FIG. 19, reservoir JM–7R will replace any fluid lost in cylinder JM–7 due to leakage or will permit the fluid in cylinder JM–7 to adjust its volume to compensate for temperature change. When piston JM–6 is in this right hand position, fluid may travel between cylinder JM–7 and reservoir JM–7R through cutout JM–6A in piston JM–6 and through the bore of seal JM–7S. As piston JM–6 moves toward the left ant cutout JM–6A moves past seal JM–7S to move frame J in direction DJU, this seal will engage the cylindrical periphery of piston JM–6 to cut off flow between cylinder JM–7 and reservoir JM–7R.

It should now be apparent that rotation of reversible motor JM in one direction will move frame J in direction DJU and in the opposite direction will move frame J in direction DJD.

*Some Features of Frames E and J*

During movement of frame E in directions DEL and DER relative to frame V, it is desirable that electric power conduit portion ZE in FIGS. 12, 13 and 14 and 22B and hydraulic power conduit portion JM–8A in FIGS. 12, 13, 14 and 21 be protected against damage during this movement while they connect power component motor JM–9 and power component switch LS–15 respectively on frames E and J and other power components on frame V. Two pairs of U-shaped channels V–5, E–5 and V–5, E–5 in FIG. 14 extend parallel to each other with open ends of the U-shapes facing each other in each pair and lying in a generally horizontal plane extending in the directions DEL and DER of motion of laterally movable frame E. Channels V–5 are carried by frame V and the channels E–5 by laterally movable frame E. These power conduits have flexible U-shape portions ZE and JM–8A lying in said generally horizontal plane with the legs of these U-shape portions lying in these channels, so that these flexible portions will remain captured in this generally horizontal plane by said channels in minimum vertical space while permitting movement of laterally movable frame E between in position PEC and out position PEL or PER.

Frames E and J, and the parts carried thereby, take up minimum vertical space in frame F in position PEL or PER and maximum space is reserved for loads W for many reasons.

First, a major portion of frames E and J is located below load support surfaces F–3A in position PEL or PER. Load storage frame F has two parallel U-shape members F–3 in FIGS. 6 and 14 located in a horizontal plane on opposite sides of frame E and having the open mouth of each U-shape facing the laterally movable frame E in the out position PEL or PER. Load support surface F–3A for load W and guide surfaces F–3D for frame E being respectively the top surfaces of the upper and lower legs of the U-shape members F–3. Load storage frame F has horizontally extending guide surface F–3D located at a level spaced below load support surface F–3A. Guide means, such as rollers EM–8 on frame E, engaging guide surface F–3D during travel between positions PEC, PEL and PER with at least a portion of laterally movable frame E and load support frame J located in FIG. 14 on the level of the vertical space between these guide and support surfaces F–3D and F–3A to provide a compact construction.

Second, all four fluid driven motors JM–9 are at least partially located in out position PEL or PER on this same level of the vertical space between said guide and support surfaces F–3D and F–3A.

Third, one can therefore use lower height supporting legs on load W, or even no legs with a planar bottom surface on load W, and less vertical space between loads W in frame F is required for operation of frames E and J. Support surfaces W–2 and W–3 in FIG. 14 on the bottom of load W may be generally coplanar because load support surface F–3A on load storage frame F engaging support surface W–2 on load W and the load support surface J–3 on load support frame J engaging support surface W–3 on load W are generally coplanar in out position PEL or PER during at least a portion of the movement of load support frame J between its load-supporting and released positions PJU and PJD.

*Power Circuits and Arrangement of Electrical Components*

Suitable control means is provided for controlling the movement of the frames H, V, E and J of carrier K for transferring load W from one load support surface F–1 at one load transfer position to another selected support surface F–1 at another load transfer position with suitable sequential movement of the frames with the movement being, for example, from position P3 to position P6 or from position P6 to position P3.

Figure 22A:
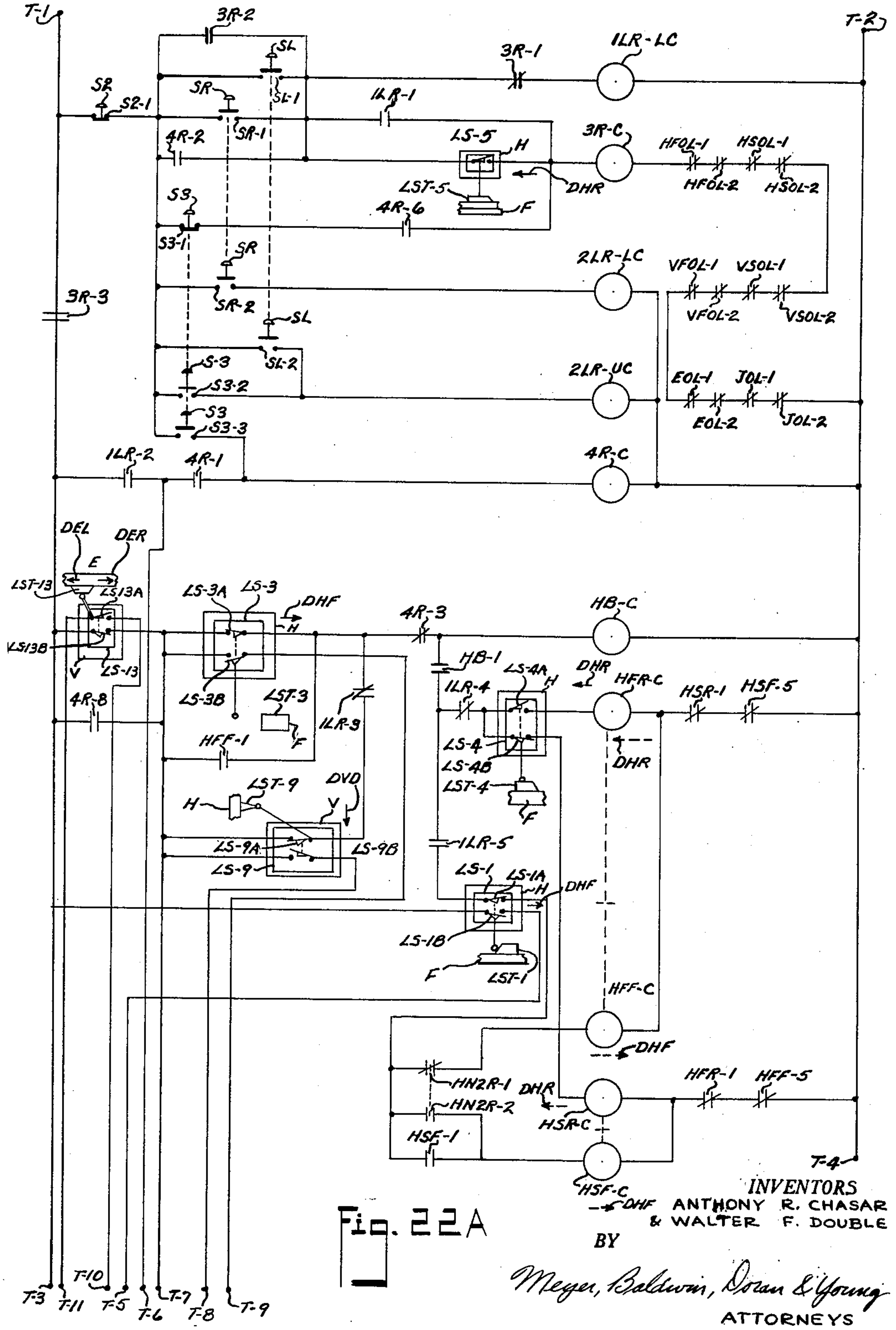
FIGS. 22A and 22B are respectively upper and lower component parts of the main electrical control diagram with the schematically shown limit switches in FIGS. 2, 3 and 4 shown schematically therein.
Figure 22B:
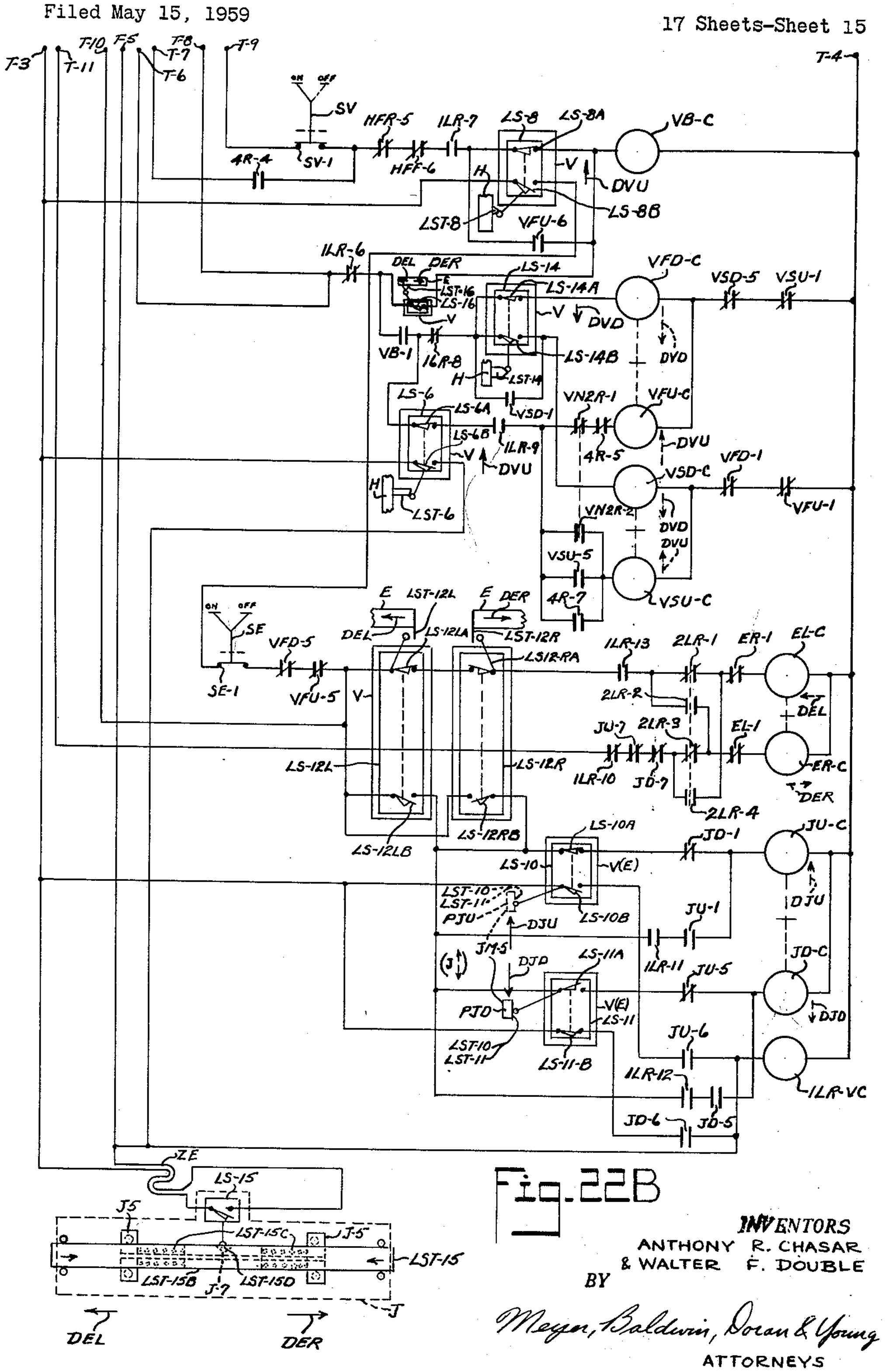
Figure 23H:
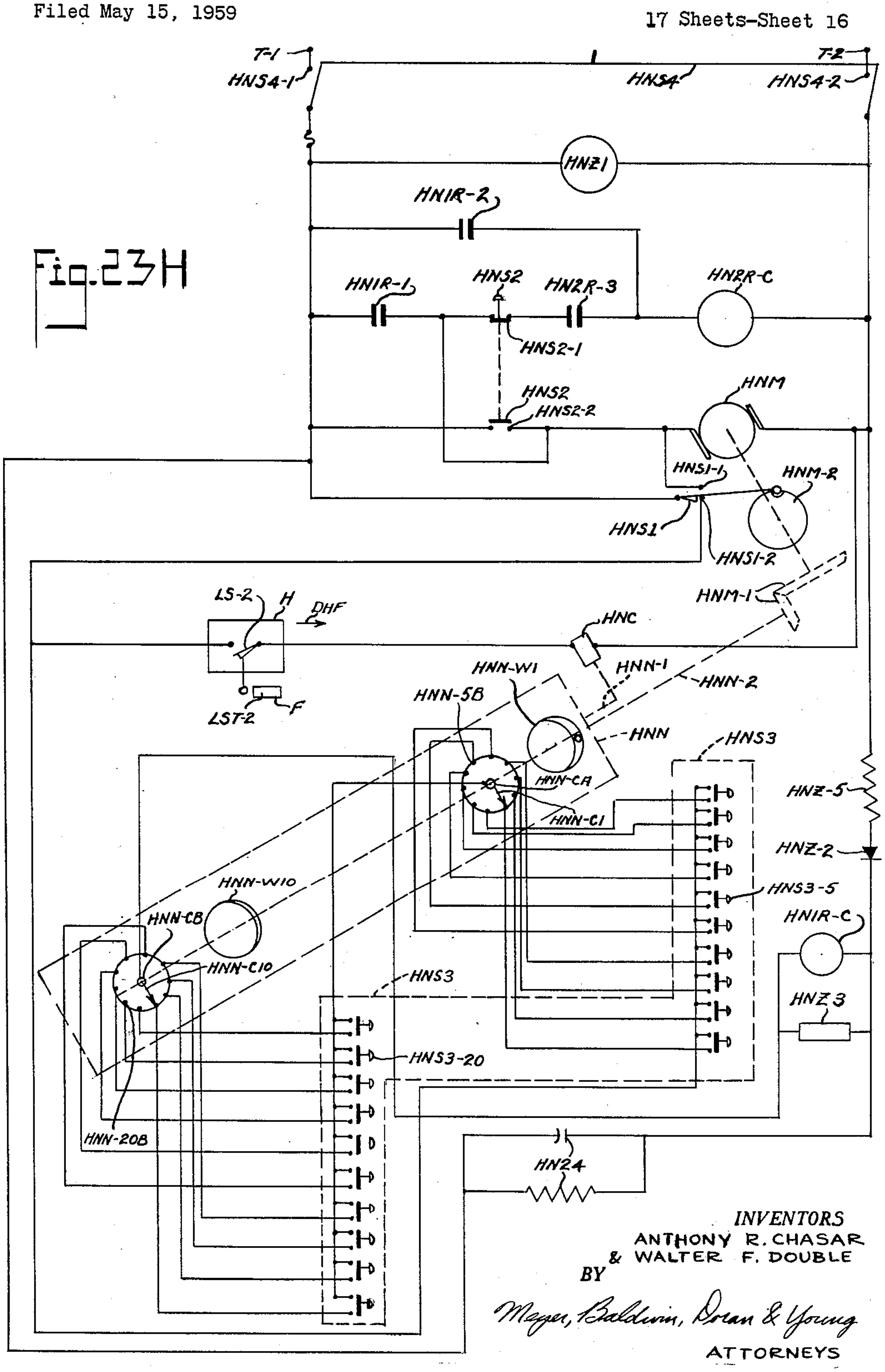
FIGS. 23H and 24V are respectively electrical diagrams of the horizontal and vertical counter circuits.
Figure 24V:
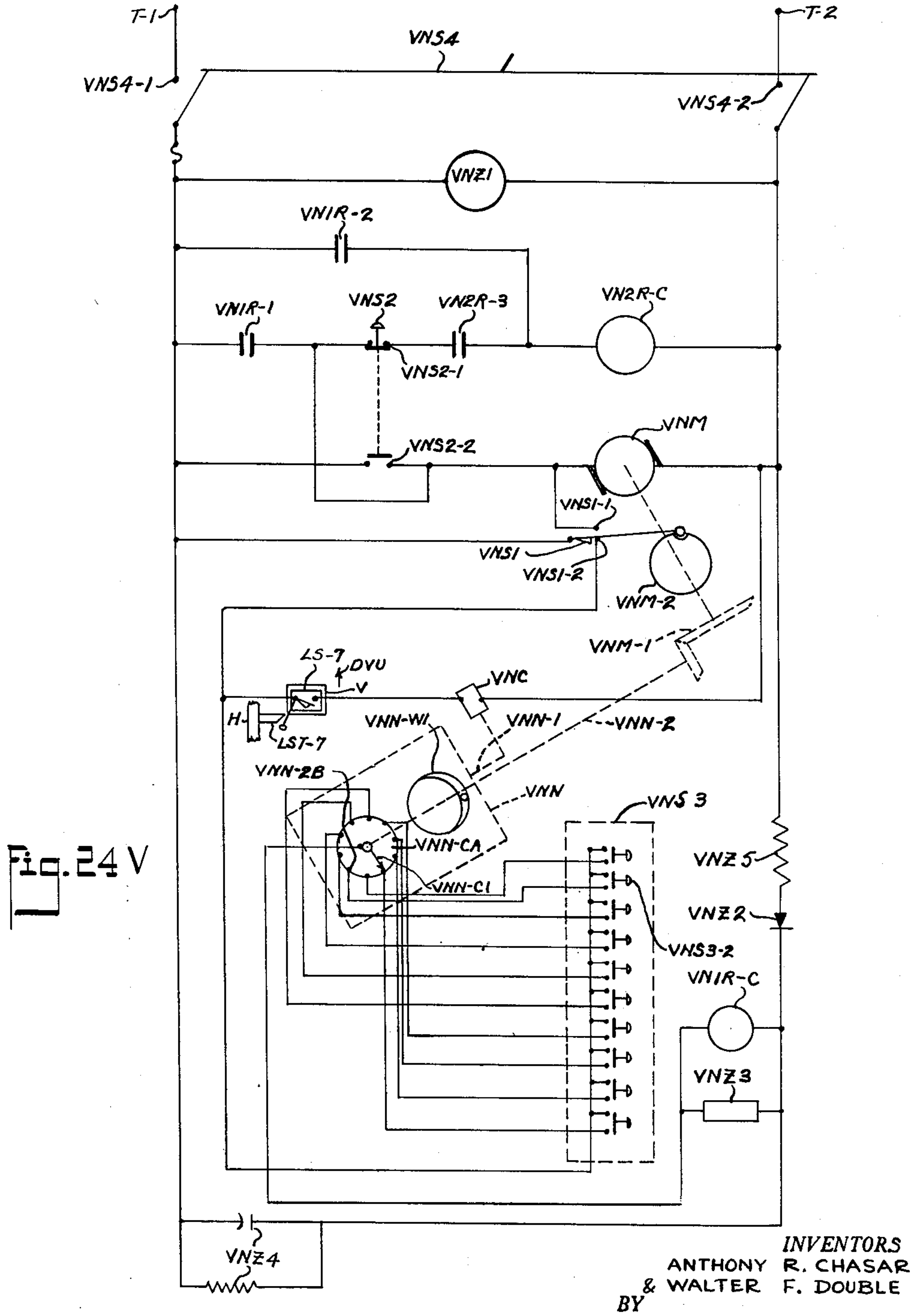

The complete electrical and hydraulic flow diagram includes a main electrical power circuit in FIG. 21, a hydraulic flow diagram in FIG. 21, component top and bottom parts of a main electrical control diagram in FIGS. 22A and 22B, and component parts of electrical diagrams in FIGS. 23H and 24V respectively of the horizontal and vertical counter circuit components. The component diagrams in the different drawing figures are tied together by common terminals T–1 and T–2 in FIGS. 21, 22A, 23H and 24V and by terminals T–3, T–4, T–5, T–6, T–7, T–8, T–9, T–10 and T–11 in FIGS. 22A and 22B.

In this complete electrical diagram, the drawings have coils and contacts controlled by each coil. Main start relay coil 3R–C controls contacts 3R–1, 2 and 3; pick-up discharge relay coil 4R–C controls contacts 4R–1, 2, 3, 4, 5, 6, 7 and 8; relay coil HN1R–C controls contacts HN1R–1 and 2; relay coil HN2R–C controls contacts HN2R–1, 2 and 3; relay coil VN1R–C controls contacts VN1R–1 and 2; relay coil VN2R–C controls contacts VN2R–1, 2 and 3; brake relay coil HB–C controls contacts HB–1, 2, 3 and 4; starter coil HFF–C controls contacts HFF–1, 2, 3, 4, 5 and 6; starter coil HFR–C controls contacts HFR–1, 2, 3, 4 and 5; starter coil HSF–C controls contacts HSF–1, 2, 3, 4 and 5; starter coil HSR–C controls contacts HSR–1, 2, 3 and 4; brake coil VB–C controls contacts VB–1, 2, 3 and 4; starter coil VFD–C controls contacts VFD–1, 2, 3, 4 and 5; starter coil VFU–C controls contacts VFU–1, 2, 3, 4, 5 and 6; starter coil VSU–C controls contacts VSU–1, 2, 3, 4 and 5; starter coil EL–C controls contacts EL–1, 2, 3, and 4; starter coil ER–C controls contacts ER–1, 2, 3 and 4; starter coil JD–C controls contacts JD–1, 2, 3, 4, 5, 6 and 7; starter coil JU–C controls contacts JU–1, 2, 3, 4, 5, 6 and 7. Thermal overload circuit breaker coils HFOL–C1, HFOL–C2, HSOL–C1, HSOL–C2, VFOL–C1, VFOL–C2, VSOL–C1, VSOL–C2, EOL–C1, EOL–C2, JOL–C1 and JOL–C2 control respectively the thermal overload contacts HFOL–1, HFOL–2, HSOL – 1, HSOL – 2, VFOL – 1, VFOL – 2, VSOL – 1, VSOL–2, EOL–1, EOL–2, JOL–1, and JOL–2. Each of these contacts is illustrated in its normal or unactuated position assumed when its controlling coil is unenergized or the thermal overload coil is not over heated. When a relay coil is energized or a thermal overload coil is over heated, its controlled contacts move to the opposite or actuated position until de-energization takes place or the overload is corrected so that its controlled contacts move back to the normal or illustrated position.

Latching relays are also provided. Latching relay latching coil 1LR–LC and latching relay unlatching coil 1LR–UC control associated contacts 1LR–1, 2, 3, 4, 5, 6, 7, 8, 9, 10, 11, 12 and 13; and latching relay latching coil 2LR–LC and latching relay unlatching coil 2LR–UC control contacts 2LR–1, 2, 3, and 4. These contacts are illustrated in the drawings in their normal, unactuated and unlatched position. When a latching coil is energized, it moves its armature to move its controlled contacts to the actuated or opposite position to that illustrated in the drawings, and the latch of the unlatching coil is spring loaded to move at right angles to the latching coil armature into engagement with a notch in the latching coil armature to lock its controlled contacts in actuated position even after the latching coil is deenergized. However, when the unlatching coil is energized (while the latching coil is not energized), it pulls the latch from the armature of the latching coil so that its controlled contacts can move back to their normal or illustrated position when the armature of the latching coil returns to its original position.

Each motor and its controlling starter coil has shown closely associated therewith on the drawings a dotted line arrow indicating the direction of carrier frame movement, corresponding to the direction of movement in FIG. 1, caused by energization thereof. Motor HM for horizontally moving frame H in direction DHF or DHR moves frame H at fast speed in reverse direction DHR by energizing starter coil HFR–C, at fast speed in the forward direction DHF by energizing starter coil HFF–C, at slow speed in the reverse direction by energizing starter coil HSR–C, and at slow speed in the forward direction by energizing starter coil HSF–C. Motor VM for vertically moving frame V in direction DVD or DVU moves frame V at fast speed in the downward direction DVD by energizing starter coil VFD–C, at fast speed in the upward direction DVU by energizing starter coil VFU–C, at slow speed in the downward direction by energizing starter coil VSD–C, and at slow speed in the upward direction by energizing starter coil VSU–C. Motor EM for laterally moving frame E in direction DEL or DER moves frame E in the leftward direction DEL by energizing starter coil EL–C and in the rightward direction DER by energizing starter coil ER–C; and motor JM for vertically moving frame J in direction DJD or DJU moves frame J in the downward direction DJD by energizing starter coil JD–C and in the upward direction DJU by energizing starter coil JU–C.

The motor starter coils are interlocked mechanically, as shown by the vertical dotted connecting lines, to prevent simultaneous engagement of fast speed starter coils or of slow speed starter coils for motors HM and VM, or of the starter coils for motors EM or JM, and are interlocked electrically to prevent simultaneous engagement of both the fast and slow speed starter coils by contacts HSR–1, HSF–5, HFR–1, HFF–5, VSD–5, VSU–1, VFD–1, and VFU–1, each opened upon energization of its controlling coil, to prevent simultaneous engagement of both fast and slow speed starter coils for a particular motor.

In the electrical drawings, the limit switches LS–1 having switches LS–1A and LS–1B; LS–2; LS–3 having switches LS–3A and LS–3B; LS–4 having switches LS–4A and LS–4B; LS–5; LS–6 having switches LS–6A and LS–6B; LS–7; LS–8 having switches LS–8A and LS–8B; LS–9 having switches LS–9A and LS–9B; LS–10 having switches LS–10A and LS–10B; LS–11 having switches LS–11A and LS–11B; LS–12L having switches LS–12LA and LS–12LB; LS–12R having switches LS–12RA and LS–12RB; LS–13 having switches LS–13A and LS–13B; LS–14 having switches LS–14A and LS–14B; LS–15; and LS–16 and their respective trips having corresponding LST numbers, are shown schematically in FIGS. 2, 3, 4, 22A, 22B, 23H and 24V on the frame H, V, E, J or F on which they are carried. The direction of relative movement of each of the movable frames H, V, E and J for individually actuating each of these switches by its trip is shown in these figures of the drawings as a solid line arrow and has a reference number to correspond with the direction of movement shown in FIG. 1. Each of these switches having A and B component switches, such as switch LS–3, have these component switches mechanically interlocked, as shown by the dotted lines so that both components are simultaneously moved in the same direction by the common trip, such as trip LST–3. Trips LST–1, LST–2, LST–3, LST–4 and LST–5 are carried on frame F in FIGS. 4 and 13 respectively in FIG. 13 on the leftmost tie member F–8, as the top trip surfaces LST–2 and LST–3 of the other tie members F–8 at each bay FB, and as trips LST–4 and LST–5 by frame members F–9; switches LS–1, LS–2, LS–3, LS–4, and LS–5 are carried by frame H in FIGS. 4 and 13; trips LST–6, LST–7, LST–8, LST–9 and LST–14 are carried by mast H 1 of frame H in FIGS. 2 and 9; switches LS–6, LS–7, LS–8, LS–9, LS–12L, LS–12R, LS–13, LS–14 and LS–16 are carried by frame V in FIGS. 2, 9, 11, 12 and 13; trips LST–12L, LST–12R, and LST–13 are carried by frame E in FIGS. 2, 12, 13 and 14; and switch LS–15 is carried by frame J and trip LST–15 is slidably carried by frame J in FIGS. 2, 14 and 15. The general location of these limit switches and their trips is shown in FIGS. 2, 3, 4, 22A, 22B, 23H and 24V in a schematic manner on their associated frames except for switches LS–10 having switches LS–10A and LS–10B, and switch LS–11 having switches LS–11A and LS–11B carried by frame V. These last mentioned switches are shown on their equivalent frames in parenthesis in these drawing figures and they will be similarly oriented when FIG. 19 is turned with its top edge downwardly so as to correspond with these switches in FIGS. 3 and 22B. For example, even though switch LS–10 and its trip LST–10 are both on frame V in FIG. 19 (trip LST–10 is movably mounted on frame V), they are illustrated in FIGS. 3 and 22B as if they were on their equivalent frames E and J since movement of frame J relative to frame E causes trip LST–10 to move relative to and to actuate switch LS–10.

Some of the aforementioned limit switches and their trips are adjustable to permit proper set up of the apparatus. In FIGS. 2, 9 and 11, trips LST–6, LST–7, LST–8, LST–9, and LST–14 are each vertically adjustable along the length of mast section H–1B by loosening and tightening its associated lock screw H–1BS for movement along the length of common channel H–1BC on mast section H–1B in FIGS. 9 and 11 while switches LS–6, LS–7, LS–8, LS–9 and LS–14 are fixed in FIGS. 2 and 9 to frame V. In FIGS. 4, 9 and 13 limit switches LS–1, LS–2, LS–3, LS–4 and LS–5 each have an adjustable nut in horizontally extended C-shaped channel member H–2BC on base H–2 of frame H and a tightening screw H–2BS to permit longitudinal adjustment in channel H–2BC while their associated trips are carried in non-adjustable relationship by frame tie members F–8 on frame F.

Since some of the limit switches need be actuated during movement only in one direction, and it is preferred that they pivot and not be actuated in the reverse direction so as to not mix up the counter mechanism, as will be more apparent hereinafter, each is preferably a one way actuatable limit switch. Limit switches LS–2 and LS–3 in FIGS. 4 and 13 are actuated only during movement of frame H in direction DHF. In FIGS. 2 and 9, limit switches LS–7 and LS–8 are actuated only during movement in direction DVU.

The manually actuatable control elements or buttons are located for convenient control. Switch buttons S and S1 in FIG. 7 are always located at control position P1, switch buttons S2, S3, SL, SR, SV, SE, HNS3 and VNS3 are carried by carrier K and are in control position P1 when carrier K is in this position for easy control thereof by the operator.

Although the electrical components in these drawings might be arranged among the frames in any suitable manner, it has been found convenient, and especially economical of the amount of wiring required, to have the electrical components arranged in a certain manner at a preferred location to provide many advantages disclosed herein. Power lines L1, L2 and L3 are supported over head along the length of travel zone KZ by frame members F–7, circuit breaker coil ZC, and switches S and S1 are located in FIGS. 7 and 21 on frame F at position P1 for positive control by the operator of the apparatus at all times. Frame H carries thereon, or in the control box carried thereby, latching relay coils 1LR–LC and 1LR–UC; relay coils 3R–C and 4R–C; coils HB–C, HFF–C, HFR–C, HSF–C, and HSR–C and their controlled contacts; motor HM and its brake HMB; coils HFOL–C1 and HSOL–C1 with their controlled contacts; all of the horizontal counter circuit components in FIG. 23H including its switch buttons HNS3 in FIG. 7; and switch buttons S2, S3, SL and SR, some of which are shown in FIG. 7. Frame V carries thereon, or in the control box carried thereby, coils VB–C, VFD–C, VFU–C, VSD–C, VSU–C, EL–C, ER–C, JD–C, and JU–C and their controlled contacts; counter circuit components in FIG. 24V including its switch buttons VNS3 in FIG. 7; switch buttons SV and SE; motors VM and JM; their brakes VMB and JMB; and coils VFOL–C1, VFOL–C2, VSOL–C1, VSOL–C2, EOL–C1, EOL–C2, JOL–C1, and JOL–C2 and their controlled contacts.

The electrical components are shown in FIGS. 21, 22A, 22B, 23H and 24V of the drawings with all these limit switches and other switches and coils having their contacts in the position with all coils deenergized with their controlled contacts in normal and unlatched position; and wherein empty carrier K is in control, reference or start position P1 with no load W thereon and frame J is in its down position PJD so that all components appear in proper position as the cycle of operation is begun to be described.

The circuits are energized as follows: Circuit No. 1 is formed in FIG. 21 from line L1 through closed contacts S–1 and S–3 of switch S, and control circuit transformer T to line L3. Lines L1, L2 and L3 extend horizontally along the top of frame F in FIGS. 5 and 7 to provide power to the electrical components in FIGS. 21, 22A, 22B, 23H and 24V when main switch S is closed. The whole system is deenergized and the first circuit is broken by pressing stop button S1 to form circuit No. 2 in FIG. 21 from line L1 through closed contact S1–1 of stop button S1, circuit breaker coil ZC to trip out a conventional circuit breaker in lines L1, L2 and L3 above the location of switch S in FIG. 21 to deenergize lines L1, L2 and L3 in FIG. 21 below switch S, and line L2. Releasing switch button S1, breaks circuit No. 2 to reestablish energization when the disconnect switch handle of this conventional circuit breaker is moved to on position after the circuit breaker is reset.

*Picking Up Load W for Storing—(1) Empty Load Carrier K traveling in the Feed Out Direction DO From Position P1 Through Position P2 to Position P3 to Pick Up Load W Thereat*

Automatic means is provided for moving empty carrier K in direction DO from position P1 to position P3 into alignment with preselected load support surface F–1 at position P3 for picking up load W from load support surface F–1 in left panel FAL by sequentially having vertically movable frame V moved in up direction DVU from position P1 to position P2, laterally movable frame E moved in lateral left direction DEL from position PEC to position PEL, and load support frame J moved in vertical up direction DJU from position PJD to position PJU to pick up load W from load support surface F–1 at position P3.

The action hereinafter described is defined as "Advancing Travel Sequence No. 1 K" schematically shown in FIG. 1. This sequence includes the movement of the frames of carrier K from position P1 to position P3, and includes the circuits formed and broken and the action of the switches required for this purpose. The only circuit now formed is circuit No. 1 energizing transformer T in FIG. 21.

Pushing pick-up-discharge switch button S3 at position P1 in FIG. 7 forms many circuits to move carrier K from positions P1 to P3. Since position P3 is on the left, carrier K must service left frame panel FAL. This action is assured by forming circuit No. 3 from terminals T–1 in FIGS. 21 and 22A through closed contact S2–1 of stop button switch S2, closed contact S3–2 of switch S3; relay unlatching coil 2LR–UC, and terminals T–2 in FIGS. 22A and 21. Energizing coil 2LR–UC will move all contacts controlled thereby to illustrated or unactuated position so that left panel FAL will be serviced. Next, the pick-up-discharge relay coil 4R–C is energized to move carrier K through the load pick-up-discharge cycle. This is accomplished by forming circuit No. 5 from terminal T–1 in FIG. 22A through closed contact S2–1 of stop switch S2, closed switch contact S3–3 of switch S3, coil 4R–C, and terminal T–2. Latching relay latching coil 1LR–LC is energized by forming circuit No. 6 from terminal T–1 in FIG. 22A through closed contact S2–1 of stop button switch S2, normally open contact 4R–2 now closed by energized coil 4R–C, normally closed contact 3R–1, latching relay latching coil 1LR–LC, and terminal T–2. Main start relay coil 3R–C is energized by circuit No. 8 formed from terminal T–1 in FIG. 22A through closed contact S2–1 of stop button switch S2; normally open contact 4R–2 now closed by energized coil 4R–C; normally open contact 1LR–1 closed by energized coil 1LR–LC; coil 3R–C; closed overload contacts HFOL–1, HFOL–2, HSOL–1, HSOL–2, VSOL–2, VSOL–1, VFOL–2, VFOL–1, EOL–1, EOL–2, JOL–1 and JOL–2, and terminal T–2. Although circuit No. 6 is broken after coil 3R–C has been energized to open contact 3R–1, all contacts controlled by latching relay coil 1LR–LC remain in actuated position until their unlatching coil 1LR–UC in FIG. 22B is energized later in the cycle. The pick-up-discharge relay coil 4R–C is kept energized by holding circuit No. 9 formed from terminal T–1 in FIG. 22A through normally open contact 3R–3 now closed by energized coil 3R–C, normally open contact 1LR–2 closed by energized latching coil 1LR–LC, normally open contact 4R–1 closed by energized coil 4R–C, coil 4R–C, and terminal T–2. Now, switch S3 may be released to break circuits Nos. 3 and 5. Note that energizing coil 4R–C opens contact 4R–3 in FIG. 22A so that frame H of carrier K cannot travel horizontally because coils HB–C, HFR–C, HFF–C, HSR–C and HSF–C cannot be energized. After switch S3 is released, coil 3R–C is kept energized by maintaining circuit No. 10 formed after coil 4R–C has been energized with this circuit No. 10 extending from terminal T–1 in FIG. 22A through closed contact S2–1 of stop switch S2; closed pick-up-discharge switch contact S3–1; normally open contact 4R–6 now closed by energized coil 4R–C; coil 3R–C; closed overload contacts HFOL–1, HFOL–2, HSOL–1, HSOL–2, VSOL–2, VSOL–1, VFOL–2, VFOL–1, EOL–1, EOL–2, JOL–1 and JOL–2; and terminal T–2.

Vertically movable frame V is moved by motor VM in vertical up direction DVU at slow speed from position P1 to position P2 and then is stopped at position P2. Circuit No. 12 is formed to cause disengagement of brake VMB in FIG. 21 with this circuit extending from terminal T–1 in FIG. 22A through normally open contact 3R–3 now closed by energizing coil 3R–3, switch LS–13B closed by trip LST–13 on frame E in center position PEC, terminals T–7 in FIG. 22A to FIG. 22B, normally open contact 4R–4 in FIG. 22B now closed by energized relay coil 4R–C, normally closed contacts HFR–5 and HFF–6, normally open contact 1LR–7 closed by energized latching coil 1LR–LC, normally closed switch LS–8A (opened when frame V is in position P2), brake relay coil VB–C, terminals T–4 in FIG. 22B to FIG. 22A, and terminal T–2 in FIG. 22A. Energizing brake relay coil VB–C forms circuit No. 13 in FIG. 21 by closing contacts VB–2, VB–3 and VB–4 to energize and disengage brake VMB. Energizing coil VB–C closes normally open contact VB–1 to start frame V moving at slow speed vertically upwardly in direction DVU by setting up circuit No. 15 formed from terminal T–1 in FIG. 22A through closed switch LS–8A in the manner described for circuit No. 12 and then through normally open switch LS–16 held closed by trip LST–16 on frame E in position PEC, normally open contact VB–1 now closed by energized coil VB–C, normally closed switch LS–6A, normally open contact 1LR–9 closed by energized latching coil 1LR–LC, normally open contact 4R–7 now closed by energized coil 4R–C, vertical slow speed up motor starter coil VSU–C, and normally closed contacts VFD–1 and CFU–1, terminals T–4 in FIG. 22B to FIG. 22A, and terminal T–2 in FIG. 22A. This forms circuit No. 16 in FIG. 21 to energize motor VM for moving frame V in direction DVU at slow speed with circuit No. 16 formed from lines L1, L2 and L3 through normally open contacts VSU–2, VSU–3 and VSU–4, now closed by energized coil VSU–C, and thermal overload coils VSOL–C1 and VSOL–C2 to motor VM. When the upwardly moving frame V reaches position P2, the upward movement of frame V in direction DVU is stopped when trip LST–8 opens switch LS–8A in FIG. 22B. Opening switch LS–8A by trip LST–8 with frame V in position P2 breaks circuits Nos. 12 and 15 to respectively break circuits Nos. 13 and 16 to engage brake VMB and to stop motor VM.

Laterally movable frame E is moved by motor EM in lateral left direction DEL from in position PEC at position P2 to left out position PEL at position P3. Closing switch LS–8B by trip LST–8 when frame V is in position P2 starts movement of frame E by forming circuit No. 17 from terminal T–1 in FIG. 22A through normally open contact 3R–3 now closed by energized coil 3R–C; terminals T–3 in FIGS. 22A to 22B; closed switch LS–8B in FIG. 22B; normally closed contacts SE–1 of switch SE, VFD–5 and VFU–5; normally closed switches LS–12LA and LS–12RA (closed as long as frame E is not in position PEL or PER); normally open contact 1LR–13 closed by energized latching coil 1LR–LC; normally closed contact 2LR–1 closed since circuit No. 3 was formed to energize coil 2LR–UC; normally closed contact ER–1; coil EL–C; terminals T–4 in FIG. 22B to FIG. 22A; and terminal T–2 in FIG. 22A. Energizing coil EL–C forms circuit No. 19 in FIG. 21 from lines L1, L2 and L3 through normally open contacts EL–2, EL–3 and EL–4, now closed by energized coil EL–C, and thermal overload coils EO1–C1 and EOL–C2 to energize and disengage brake EMB and to energize motor EM to advance frame E in direction DEL under load W at position P3. When the frame E has reached the outer end of its travel at positions PEL and P3, normally closed switch LS–12LA in FIG. 22B is opened by trip LST–12L on frame E to break circuit No. 17 to deenergize coil EL–C to break circuit No. 19 so as to stop motor EM and to engage brake EMB to stop motion of frame E in direction DEL in position PEL.

The description of "Advancing Travel Sequence No. 1K" schematically shown in FIG. 1 has now been completed.

Empty load support frame J is moved by motor JM in vertical up direction DJU from load released position PJD to load supporting position PJU to pick up load W from load support surface F–1 at position P3. Frame J is raised into load contact by forming circuit No. 20 from terminal T–1 in FIG. 22A along the path of circuit No. 17 through normally closed contact VFU–5 and then through normally open switch LS–12LB now held closed by trip LST–12L on frame E in position PEL, normally closed switch LS–10A (closed while frame J is not in position PJU), normally closed contact JD–1, coil JU–C, terminals T–4 in FIG. 22B to FIG. 22A, and terminal T–2 in FIG. 22A. Energizing coil JU–C forms circuit No. 22 in FIG. 21 to energize motor JM and disengage brake JMB with this circuit extending from lines L1, L2 and L3 through normally open contacts JU–2, JU–3 and JU–4, closed by energized coil JU–C, and thermal overload coils JOL–C1 and JOL–C2 to motor JM and brake JMB. Motor JM moves frame J in direction DJU to position PJU to lift load W off support surface F–1 onto frame J. When frame J approaches up position PJU, normally closed switch LS–10A is opened by trip LST–10 to break circuit No. 20 but coil JU–C is kept energized until the beginning of the return motion to position P1 by a parallel, maintaining circuit No. 23 formed from terminal T–1 in FIG. 22A through closed switch LS–12LB along the same path as circuit No. 20 and then through normally open contact 1LR–11 closed by energized latching coil 1LR–LC, normally open contact JU–1 now closed by energized coil JU–C, coil JU–C, terminals T–4 in FIG. 22B to FIG. 22A, and terminal T–2 in FIG. 22A. Circuit No. 23 was formed to be sure unlatching coil 1LR–UC has firmly unlatched its controlled contacts by circuit No. 24 to be described hereinafter before coil JU–C is deenergized to stop motor JM.

*Picking Up Load W for Storing—(2) Load Carrier K Traveling in the Feed in Direction DI Carrying Load W From Position P3 Through Position P2 to Position P1*

Automatic means is provided for moving load W on carrier K in direction DI from position P3 to position P1 by sequentially having laterally movable frame E moved in lateral right direction DER from position PEL to position PEC, and vertically movable frame V moved in direction DVD from position P2 to position P1.

Unlatching coil 1LR–UC in FIG. 22B is energized to withdraw by frame J load W from frame F at position P3 back onto frame V at position P2 and then lower frame V to position P1. When frame J has reached position PJU, normally open switch LS–10B is closed by trip LST–10 to form circuit No. 24 from terminal T–1 in FIG. 22A through normally open contact 3R–3 now closed by energized coil 3R–C, terminals T–3 in FIGS. 22A to 22B, normally open switch LS–10B in FIG. 22B now closed by trip LST–10 by frame J approaching position PJU, normally open contact JU–6 closed by energized coil JU–C, unlatching coil 1LR–C, terminals T–4 in FIG. 22B to FIG. 22A, and terminal T–2 in FIG. 22A. Energizing coil 1LR–UC opens contact 1LR–11 to break circuit No. 23 so as: (1) to deenergize coil JU–C to break circuit No. 22 to stop motor JM when frame J reaches position PJU and (2) to break circuit No. 24 by opening contact JU–6. When unlatching coil 1LR–UC is energized, all contacts 1LR–1 to 1LR–13 are returned to their illustrated, unactuated and normal position to return load W and carrier K to position P1. When unlatching coil 1LR–UC is energized, it breaks circuit No. 8 used for energizing coil 3R–C by opening the normally open contact 1LR–1, but coil 3R–C is kept energized by maintaining circuit No. 10 earlier formed. Opening contact 1LR–2 breaks circuit No. 9 maintaining pick-up-discharge relay coil 4R–C energized but circuit No. 26 had been formed, when frame V moved out of position P1, to maintain coil 4R–C energized with circuit No. 26 extending from terminal T–1 in FIG. 22A through normally open contact 3R–3 closed by energized coil 3R–C, normally open contact 4R–8 closed by energized coil 4R–C, normally closed switch LS–9B held open by trip LST–9 on frame H with frame V at position P1 but now closed since frame V is above position P1, terminals T–8 in FIG. 22A to FIG. 22B, terminals T–6 in FIG. 22B to FIG. 22A, normally open contact 4R–1 now closed by energized coil 4R–C, coil 4R–C, and terminal T–2.

The action hereinafter described is defined as "Returning Travel Sequence No. 2K" schematically shown in FIG. 1. This sequence includes the movement of the frames of carrier K from position P3 to position P1, and includes the circuits formed and broken and the action of the switches required for this purpose. Now, all circuits have been broken except circuit No. 1 energizing transformer T in FIG. 21, circuit No. 26 energizing coil 4R–C in FIG. 22A, and circuit No. 10 energizing coil 3R–C in FIG. 22A; and energized coil 1LR–UC has unlatched its controlled contacts so they are now in the illustrated position.

Laterally movable frame E is moved by motor EM in lateral right direction DER from left out position PEL at position P3 to in position PEC at position P2. The frame E and load W carried thereby are moved out of frame F onto the center of frame V in position P2 by circuit No. 27 formed from terminal T–1 in FIG. 22A through normally open contact 3R–3 now closed by energized coil 3R–C; terminals T–3 in FIGS. 22A and 22B; normally open switch LS–8B in FIG. 22B held closed by trip LST–8 on frame H at position P2 at level FL; closed contact SE–1 of switch SE; normally closed contacts VFD–5 and VFU–5; terminals T–10 in FIG. 22B to FIG. 22A; normally closed switch LS–13A in FIG. 22A closed since frame E is in position PEL; terminals T–11 in FIG. 22A to FIG. 22B; normally closed contacts 1LR–10, JU–7, JD–7, 2LR–3 and EL–1 in FIG. 22B; coil ER–C; terminals T–4 in FIG. 22B to FIG. 22A; and terminal T–2 in FIG. 22A. Energizing coil ER–C energizes motor EM and disengages brake EMB to move the frame E and load W out of frame F by circuit No. 29 in FIG. 21 formed from lines L1, L2 and L3 through normally open contacts ER–2, ER–3 and ER–4, now closed by energized coil ER–C, and thermal overload coils EOL–C1 and EOL–C2 to motor EM and brake EMB. When the frame E has reached positions PEC and P2, switch LS–13A is opened by trip LST–13 on frame E to break circuit No. 27 to deenergize coil ER–C and thus break circuit No. 29 to deenergize and to engage brake EMB and to deenergize motor EM.

Vertically movable frame V is moved by motor VM in vertical down direction DVD at fast speed and then at slow speed from position P2 to position P1 and then is stopped at position P1. Frame V is moved in direction DVD from position P2 to position P1 in the following sequential steps: (1) energizing motor VM for causing fast speed travel of frame V in direction DVD from position P2 to an approach position before position P1, (2) energizing motor VM for causing slow speed travel of frame V in direction DVD from this approach position to position P1, and (3) stopping motor VM and frame V in position P1.

Fast vertical travel by frame V from position P2 to the approach position before position P1 now occurs. When the frame E reaches the center position PEC, normally open switches LS–13B and LS–16 are closed by trips LST–13 and LST–16 on frame E. Closing switches LS–13B and LS–16 form circuit No. 30 to disengage brake VMB and to energize motor VM for high speed downward motion. Closing switches LS–13B and LS–16 forms circuit No. 30 extending from terminal T–1 in FIG. 22A through normally open contact 3R–3 now closed by energized coil 3R–C, normally open switch LS–13B held closed by trip LST–13 on frame E in its center position PEC, normally closed switch LS–9B (held open only when frame V is in position P1 or P4), terminals T–8 in FIG. 22A to FIG. 22B, normally closed contact 1LR–6 in FIG. 22B, normally open switch LS–16 on frame V held open by trip LST–16 on frame E in position PEC, brake coil VB–C, terminals T–4 in FIG. 22B to FIG. 22A, and terminal T–2 in FIG. 22A. Energizing coil VB–C reforms circuit No. 13 to energize and disengage brake VMB. Energizing coil VB–C forms circuit No. 31 extending from terminal T–1 in FIG. 22A through normally closed contact 1LR–6 in the manner recited for circuit No. 30 and then through normally open contact VB–1 now closed by energized coil VB–C, normally closed contact 1LR–8, normally closed switch LS–14A, high speed down motor starter coil VFD–C, normally closed contacts VSD–5 and VSU–1, terminals T–4 in FIG. 22B to FIG. 22A, and terminal T–2 in FIG. 22A. Energizing coil VFD–C forms circuit No. 33 in FIG. 21 to energize motor VM with this circuit extending from lines L1, L2 and L3 through normally open contacts VFD–2, VFD–3 and VFD–4, now closed by energized coil VFD–C, and thermal overload coils VFOL–C1 and VFOL–C2 to motor VM.

As frame V reaches the approach position before the position P1, motor VM has its fast speed drive disengaged and its slow speed vertical drive engaged at the approach position before position P1. When frame V approaches it starting position P1, normally closed switch LS–14A is opened by trip LST–14 on frame H to break circuit No. 31 to deenergize coil VFD–C to break circuit No. 33 to deenergize the high speed motor VM. However, opening switch LS–14A by trip LST–14 closes switch LS–14B to form circuit No. 34 to energize the motor VM for slow speed downward movement. Circuit No. 34 extends from terminal T–1 in FIG. 22A through normally closed contact 1LR–8 along the same path as circuit No. 31 and then through normally open switch LS–14B now closed by trip LST–14 since frame V is approaching position P1, vertical low speed down starter coil VSD–C, normally closed contacts VFD–1 and VFU–1, terminals T–4 in FIG. 22B to FIG. 22A, and terminal T–2 in FIG. 22A. As frame V moves downwardly in direction DVD and switch LS–14B opens to break circuit No. 34, coil VSD–C is kept energized by holding circuit No. 36 formed along the same path as circuit No. 34 but through normally open contact VSD–1 now closed by energized coil VSD–C instead of through parallel switch LS–14B. Energizing coil VSD–C forms circuit No. 37 in FIG. 21 to energize motor VM with this circuit extending from lines L1, L2 and L3 through normally open contacts VSD–2, VSD–3 and VSD–4, now closed by energized coil VSD–C, and thermal overload coils VSOL–C1 and VSOL–C2 to motor VM.

As frame V reaches position P1, motor VM and frame V stop. When frame V reaches position P1, trip LST–9 on frame H opens normally closed switch LS–9B. Opening switch LS–9B breaks circuit No. 36 to deenergize coil VSD–C to break circuit No. 37 to deenergize and stop motor VM and break circuits No. 30 to deenergize coil VB–C to break circuit No. 13 to re-engage brake VMB to stop frame V at position P1.

Coils 3R–C and 4R–C are deenergized. When switch LS–9B opens, coils 4R–C and 3R–C are deenergized because opening switch LS–9B by trip LST–9 breaks circuit No. 26 holding coil 4R–C energized. When coil 4R–C is deenergized, it breaks circuit No. 10 by opening normally open contact 4R–6 so as to deenergize coil 3R–C.

The description of "Returning Travel Sequence No. 2K" schematically shown in FIG. 1 has now been completed.

Now, all frames of carrier K are in position P1, all circuits are deenergized except circuit No. 1 to transformer T in FIG. 21, and all contacts are in their normal and illustrated position. Carrier K is in control position P1 so as to be easily viewed by the operator at this position and to receive further travel instructions from the operator.

*Storing Load W in Left Panel FAL—(1) Load Carrier K Traveling in the Feed in Direction DI Carrying Load W Horizontally in Direction DHF From Position P1 to Position P4*

Automatic means is provided for moving load W and load carrier K horizontally relative to load storage frame F in horizontal forward direction DHF and along feed in direction DI from position P1 to position P4 into alignment with a preselected load storage bay FB at load transfer position P4 by having horizontally movable frame H moved in forward direction DHF from position P1 to position P4.

The control means includes manually actuatable elements, such as push button switches HNS3 and VNS3, in FIGS. 23H and 24V, and button switches SL, S3 and SR located at an manually actuatable at reference or control position P1 in FIG. 7 for controlling thereat all movements of the frames H, V, E and J of carrier K and for preselecting at position P1 load transfer positions P3, P4, P5, P6 and P7 and for controlling the movement of frames H, V, E and J thereto. The control means includes manually actuatable control elements NHS3 and VNS3 actuatable to correspond with the horizontal and vertical locations of load transfer positions P4 and P5. The load carrier K is moved to and stopped at selected load transfer positions P4 and P5 in response to earlier actuation of the control elements HNS3 and VNS3 corresponding to the horizontal and vertical locations of this load transfer position P5 while load carrier K is at a control position P1 spaced from positions P4 and P5.

Now, the operator preselects position P5 in a particular bay FB and level FL for storing in frame F the load W on carrier K by pushing the key push switches HNS3 and VNS3 respectively. Assume for purposes of illustration and description that the operator desires to store load W is a preselected twenty-fifth bay FB at a preselected second level FL. Then, the operator would push the button HNS3–20 in the ten series and button HNS3–5 in the unit series of the push key switch HNS3 in FIGS. 7 and 23H to select the twenty-fifth bay FB and would push button VNS3–2 in the unit series of the push key switch VNS3 in FIGS. 7 and 24V to select the second level FL.

The operator must also determine whether he wants to store load W in the right or left hand panel FAR or FAL of rack F. The control means includes manually actuatable control elements, such as buttons SL and SR in FIG. 7, corresponding to the left and right side panels FAL and FAR. Laterally movable frame E is moved from in position PEC to out position PEL or PER relative to and into position P6 or P7 in one of said side panels PEL or PER in response to sequentially actuating the control element SL or SR corresponding to the side panel FAL or FAR when carrier K is at control position P1 spaced from the selected load transfer position P5 or P7 and then carrier K is moved automatically to selected load transfer position P6 or P7. This use for button SL for servicing position P3, instead of position P6 which will now be described, has been earlier described during pick up of load W at position P3.

For purposes of illustration and description, let us assume that the operator presses the start left switch button SL to store load W in the left hand panel FAL.

After the start left button SL has been pushed, some circuits are set up. Latching relay latching coil 1LR–LC is energized by circuit No. 38 formed from transformer terminals T–1 in FIGS. 21 and 22A through closed contact S2–1 of stop button switch S2, closed contact SL–1 of start left switch button SL, normally closed contact 3R–1, latching relay latching coil 1LR–LC, and transformer terminals T–2 in FIGS. 22A and 21 to energize coil 1LR–LC. Energizing coil 1LR–LC forms circuit No. 40 from terminal T–1 in FIG. 22A through closed contact SL–1 of switch SL along the path of circuit No. 38 and then through normally open contact 1LR–1 closed by energized coil 1LR–LC; main start relay coil 3R–C; closed overload contacts HFOL–1, HFOL–2, HSOL–1, HSOL–2, VSOL–2, VSOL–1, VFOL–2, VFOL–1, EOL–1, EOL–2, JOL–1 and JOL–2; and terminal T–2. Pushing start left button switch SL also forms circuit No. 41 to energize latching relay unlatching coil 2LR–UC with circuit No. 41 formed from terminal T–1 in FIG. 22A through the closed contacts S2–1 of stop button switch S2, the closed contacts SL–2 of start left button switch SL, latching relay unlatching coil 2LR–UC, and terminal T–2. Energizing coil 2LR–UC will move all its controlled contacts to illustrated or unactuated position so that left panel FAL will be serviced by frame E.

After the start left button switch SL is released, circuits Nos. 38, 40 and 41 are broken, but main start relay coil 3R–C is kept energized by maintaining circuit No. 43 formed from terminal T–1 in FIG. 22A through closed contact S2–1, normally open contact 3R–2 now closed by energized coil 3R–C; normally open contact 1LR–1 closed when latching coil 1LR–LC was energized; coil 3R–C; closed overload contacts HFOL–1, HFOL–2, HSOL–1, HSOL–2, VSOL–2, VSOL–1, VFOL–2, VFOL–1, EOL–1, EOL–2, JOL–1 and JOL–2; and terminal T–2. Although circuit No. 38 is broken after energized coil 3R–C opens contact 3R–1 to deenergize latching coil 1LR–LC, all contacts controlled by coil 1LR–LC remain locked in the actuated position until unlatching coil 1LR–UC in FIG. 22B is energized later in the cycle.

The action hereinafter described is defined as "Advancing Travel Sequence No. 3K" schematically shown in FIG. 1. This sequence includes the movement of the frames of carrier K from position P1 to position P5, and includes the circuits formed and broken and the action of the switches required for this purpose. The only circuits now formed are circuit No. 1 energizing transformer T in FIG. 21, and circuit No. 43 energizing coil 3R–C in FIG. 22A; and coil 1LR–LC has latched all of its controlled contacts in their actuated position.

Horizontally movable frame H is moved by motor HM in horizontally forward direction DHF at fast speed and then at slow speed from position P1 to position P4 and then is stopped at position P4 at the preselected twenty-fifth bay FB. Frame H is moved in direction DHF from position P1 to position P4 in the following sequential steps: (1) energizing motor HM for causing fast speed travel of frame H in direction DHF from position P1 to an approach position before position P4, (2) counting bays FB approached by frame H on counter HNN in FIG. 23H until preselected twenty-fifth bay FB is approached with frame H in this approach position, (3) energizing motor HM for causing slow speed travel of frame H in direction DHF from this approach position to position P4, and (4) stopping motor HM and frame H at preselected twenty-fifth bay FB in position P4.

Fast horizontal travel by frame H from position P1 to the approach position before position P4 now occurs. After coil 3R–C has been energized, brake coil HB–C is energized by circuit No. 44 formed from terminal T–1 in FIG. 22A through normally open contact 3R–3 now closed by energized coil 3R–C, normally open switch LS–13B held closed by trip LST–13 on frame E in position PEC, normally closed switch LS–3A (only opened by trip LST–3 on each frame tie member F–8 when frame H is hereinafter aligned sequentially with a bay FB), normally closed contact 4R–3, coil HB–C and terminal T–2. Energizing coil HB–C energizes coil HFF–C by forming circuit No. 45 from terminal T–1 in FIG. 22A through normally closed contact 4R–3 along the path followed by circuit No. 44 and then through normally open contact HB–1 now closed by energized coil HB–C, normally open contact 1LR–5 previously closed by energized latching coil 1LR–LC, normally closed switch LS–1A, normally closed contact HN2R–1, fast speed coil HFF–C, normally closed contacts HSR–1 and HSF–5, and terminal T–2. When circuit No. 44 was formed and coil HB–C was energized, circuit No. 47 was formed in FIG. 21 to disengage brake HMB with this circuit extending from lines L1, L2 and L3 through normally open contacts HB–2, HB–3 and HB–4 now closed by energized relay coil HB–C to brake HMB. When the coil HFF–C is energized by circuit No. 45, circuit No. 48 is formed in FIG. 21 to energize motor HM for causing forward fast horizontal travel of frame H with circuit No. 48 in FIG. 21 extending from lines L1, L2 and L3 through normally open contacts HFF–2, HFF–3 and HFF–4, now closed by energized coil HFF–C, and thermal overload coils HFOL–C1 and C2 to motor HM.

As frame H travels in direction DHF, other circuits are formed. Switch LS–5 returns to its normally closed position (having been held open by trip LST–5 on frame F in starting position P1) since frame H is no longer in starting position P1 and maintaining circuit No. 50 in FIG. 22A has been formed to keep coil 3R–C energized with this circuit following the same path as circuit No. 43 but with the current flowing through normally closed switch LS–5 (closed since not held open by trip LST–5 at position P1), instead of through normally open contact 1LR–1 closed by energized coil 1LR–C and arranged in parallel with switch LS–5. Since travel of frame H in direction DHF causes switch LS–3A to be opened at each bay FB by trips LST–3 on frame tie members F–8 in FIG. 4, circuits Nos. 51 and 52 are formed to maintain coils HFF–C and HB–C energized after each opening of switch LS–3A will break circuits Nos. 45 and 44 respectively. Energizing coil HFF–C forms circuit No. 51 to maintain coil HFF–C energized with circuit No. 51 being the same as circuit No. 45 except extending through normally open contact HFF–1 now closed by energized coil HFF–C instead of through switch LS–3A with which it is arranged in parallel. After coil HFF–C has been energized, circuit No. 52 is formed to lock in brake coil HB–C when switch LS–3A is opened by trip LST–3 during travel of frame H with circuit No. 52 extending from terminal T–1 in FIG. 22A through normally open contact 3R–3 now closed by energized coil 3R–C, closed switch LS–13B held closed by trip LST–13 on frame E, normally open contact HFF–1 now closed by energized coil HFF–C, normally closed contact 4R–3, coil HB–C, and terminal T–2. The opening of switch LS–3A by trip LST–3 at each bay FB will not break these circuits.

The moving frame H travels down zone KZ at fast speed to count bays FB and then at slow speed and then is stopped at the preselected twenty-fifth bay FB at position P4. This action takes place in two steps. First, bays FB are counted as frame H approaches each bay FB at fast speed, and second, frame H is slowed down and stopped at position P4.

Counting bays FB approached by frame H on counter HNN until the preselected twenty-fifth bay FB is approached now occurs. As frame H travels down zone KZ, trips LST–2 on frame tie members F–8, arranged one at each bay FB in FIGS. 4 and 23H, closes normally open switch LS–2 momentarily so that the continued horizontal travel of frame H in direction DHF creates a pulsing action in switch LS–2 and in circuit No. 54 formed by the closing thereof. This circuit No. 54 is formed from terminals T–1 in FIGS. 21 and 23H through closed contact HNS4–1 of switch HNS4, normally closed reset switch contact HNS1–2, closed switch LS–2, solenoid HNC, closed contact HNS4–2 of switch HNS4, and terminals T–2 in FIGS. 23H and 21 since toggle switch HNS4 is normally closed. Counter HNN is of any suitable type, such as the one disclosed in U.S. Patent No. 2,799,740 granted July 16, 1957 to F. T. Blackman with respective units and tens number wheels HNN–W1 and HNN–W10 adapted to be driven through drive shaft HNN–1 thereof in the same manner as number wheels 13 by drive shaft 22 disclosed in lines 9–28, column 2, page 1 of this patent. This drive shaft HNN–1 is stepped along to advance units number wheel HNN–W1 one number thereon for each pulse by solenoid HNC of any suitable type drive, such as the solenoid and pawl and ratchet wheel counter drive disclosed in U.S. Patent No. 2,540,808 granted February 6, 1951 to H. N. Bliss. Counter HNN has contact points HNN–C1 and HNN–C10 driven by respective number wheels HNN–W1 and HNN–W10 to sequentially engage any of ten circularly arranged contacts for each of these number wheels, such as contacts HNN–5B and HNN–20B, and to engage circular grounding strips HNN–CA and HNN–CB connected in series with the push key switches, such as switches HNS3–5 and HNS3–20 earlier pushed at position P1 in FIG. 7 to select the bay FB of positions P4 and P5, of switch HNS3 in the same manner as disclosed in the aforesaid Blackman patent in lines 31–45 and line 65, column 3 to line 8, column 4 by his contact points 37 and 38, grounding strip 46, and contacts 50 to 59.

When frame H has traveled down zone KZ far enough to approach the twenty-fifth bay FB and the solenoid HNC has been pulsed twenty-five times to indicate the twenty-fifth bay FB by twenty-five opening and closing cycles of switch LS–2, the correct count has been reached and new circuits are formed. Then, circuit No. 55 is formed from terminal T–1 in FIG. 23H through closed contact HNS4–1, normally closed reset switch contact HNS1–2, closed push key switch contact HNS3–5, counter wheel contact HNN–5B, contact points HNN–C1, counter wheel common grounding strip HNN–CA, closed push key switch contact HNS3–20, counter wheel contact HNN–20B, contact points HNN–C10, counter wheel common grounding strip HNN–CB, relay coil HN1R–C, rectifier HNZ2 to provide D.-C. current to this circuit, suitable resistance HNZ5, closed contact HNS4–2 and terminal T–2. Filter network HNZ4 is arranged in parallel with a portion of circuit No. 55 to smooth out the ripple in the rectifier A.-C. current. Arc suppressor HNZ3 is in parallel with coil HN1R–C. Energizing relay coil HN1R–C forms circuit No. 57 to energize relay coil HN2R–C for purposes to be described hereinafter with circuit No. 57 extending from terminal T–1 in FIG. 23H through closed contact HNS4–1, normally open contact HN1R–2 now closed by energized coil HN1R–C, relay coil HN2R–C, closed contact HNS4–2, and terminal T–2.

The operation begins to automatically reset counter HNN by reset motor HNM. Energizing coil HN1R–C energizes and starts reset motor HNM by forming circuit No. 58 from terminal T–1 in FIG. 23H through closed contact HNS4–1, normally open contact HN1R–1 now closed by energized coil HN1R–C, reset motor HNM, closed contact HNS4–2, and terminal T–2. As reset motor HNM begins to rotate, motor HNM rotates its cam HNM–2 to move reset switch HNS1 to open normally closed contact HNS1–2 and to close normally open contact HNS1–1 for the time duration of the rotation of the cam by reset motor HNM. Closing reset switch contact HNS1–1 forms circuit No. 59 to energize reset motor HNM with circuit No. 59 formed from terminal T–1 in FIG. 23H through closed contact HNS4–1, closed contact HNS1–1, reset motor HNM, closed contact HNS4–2, and terminal T–2.

Motor HNM must continue to operate until circuit No. 59 is formed. Since opening contact HNS1–2 breaks circuit No. 55 energizing coil HN1R–C to open contact HN1R–1 to break circuit No. 58 to deenergize motor HNM, suitable means is provided to keep motor HNM energized by preventing breaking of circuit No. 58 until after circuit No. 59 has been formed. Contacts HN1R–1 and HN1R–2 controlled by relay coil HN1R–C have a time delayed return to illustrated open position after this coil is deenergized because this relay coil HN1R–C is of the conventional time delay type with a slug on the core to impede flux drop off and to thus temporarily prevent opening of the relay coil contacts controlled by this coil after these contacts have been closed by energizing the time delay relay coil HN1R–C.

Also, coil HN2R–C must remain energized after circuit No. 57 is broken. Circuit No. 61 is formed by closed contact HNS2–1 to maintain coil HN2R–C energized after contact HN1R–2 opens to break circuit No. 57 after the time delay. Circuit No. 61 is formed from terminal T–1 in FIG. 23H through closed contact HNS4–1, reset switch closed contact HNS1–1, closed switch contact HNS2–1 of reset switch HNS2, normally open contact HN2R–3 now closed by energized coil HN2R–C, relay coil HN2R–C, closed contact HNS4–2, and terminal T–2.

The operation of automatically resetting counter HNN by reset motor HNM continues. When the cam HNM–2 driven by reset motor HNM completes its cycle, reset switch contact HNS1–2 is again closed to ready the circuit for the next operation and reset switch contact HNS1–1 is opened to break circuits Nos. 59 and 61 with the reset motor HNM having maintained the reset switch contact HNS1–1 closed for approximately two seconds.

Reset motor HNM also resets counter HNN. Reset motor HNM, during its rotation, also returns number wheels HNN–W1 and HNN–W10 of counter HNN back to zero by driving reset counter shaft HNN–2 through bevel gears HNM–1 with this resetting action delayed sufficiently so that switch contact HNS1–1 has closed a brief period after reset motor HNM has begun its rotation. Then, deenergizing coil HN1R–C by rotation of contact points HNN–C1 and HNN–C10 by shaft HNN–2 will not deenergize coil HN1R–C so as to break circuits Nos. 57 and 58 to deenergize coil HN2R–C and motor HNM until after circuits Nos. 59 and 61 have been formed by closing contact HNS1–1. After resetting of counter HNN begins, circuit No. 55 is broken if it did not break by opening contact HNS1–2; and, after the time delay, circuits Nos. 57 and 58 are broken, if they have not been broken. Rotation of counter reset shaft HNN–2 returns all number wheels HNN–W1 and HNN–W10 to zero in any suitable manner, such as by rotation of the reset shaft in line 69, column 1 to line 8, column 2 of Blackman patent, No. 2,799,740, by means of any suitable reset mechanism, such as disclosed in line 47, column 1 to line 7, column 2 of U.S. Patent No. 2,342,325, granted February 22, 1944 to H. N. Bliss.

As frame H approaches at position P4 preselected twenty-fifth bay FB, motor HM has sequentially its fast speed forward drive disengaged, its slow speed forward drive engaged, and its slow speed forward drive disengaged, and motor HM is stopped when frame H reaches position P4. This action takes place during the resetting of counter HNN by motor HNM by circuit No. 59.

As frame H reaches the approach position before position P4, motor HM has its fast speed forward drive disengaged and its slow speed horizontal forward drive engaged at this approach position. When coil HN2R–C was energized by forming circuit No. 57, its normally closed contact HN2R–1 in FIG. 22A was opened to break circuits Nos. 45 and 51 to deenergize coil HFF–C: (1) to break circuit No. 48 to deenergize the high speed drive by motor HM, and (2) to break circuits Nos. 51 and 52 by opening normally open contact HFF–1. The fast forward travel of motor HM is deenergized by deenergizing starter coil HFF–C because energizing coil HN2R–C opens normally closed contact HN2R–1 to break circuits Nos. 45 and 51. When coil HFF–C is deenergized, normally open contact HFF–1 is opened to that holding circuits Nos. 51 and 52 cannot be reestablished. Now, motor HM is energized for slow speed forward travel. Circuit No. 65 is formed by energized coil HN2R–C with circuit No. 65 extending from terminal T–1 in FIG. 22A through normally open contact 3R–3 now closed by energized coil 3R–C, switch LS–13B closed by trip LST–13 on frame E in position PEC, normally closed switch LS–3A, normally closed contact 4R–3, normally open contact HB–1 held closed by energized coil HB–C, normally open contact 1LR–5 closed when latching coil 1LR–LC was energized, normally closed switch LS–1A, normally open contact HN2–2 closed by energized coil HN2R–C, horizontal low speed starter coil HSF–C, normally closed contacts HFR–1 and HFF–5, and terminal T–2.

As frame H travels toward position P4, switch LS–2 is opened by disengaging from trip LST–2 to break circuit No. 54. Since it may be necessary to hold in coil HSF–C after coil HN2R–C has been deenergized by reset motor HNM completing its cycle so as to open contact HNS1–1 and to break circuit No. 61 energizing coil HN2R–C, maintaining circuit No. 66 is formed in the same manner as circuit No. 65 but through normally open contact HSF–1, now closed by energized coil HSF–C, and located in parallel with the normally open contact HN2R–2. When coil HSF–C is energized, circuit No. 45 cannot reform to also engage the high speed starter coil HFF–C because normally closed contact HSF–5 in that circuit has been opened by energized coil HSF–C. Energizing coil HSF–C energizes motor HM for slow speed horizontal forward travel by forming circuit No. 68 in FIG. 21 from power lines L1, L2 and L3 through normally open contacts HSF–2, HSF–3 and HSF–4, now closed by energized coil HSF–C, and thermal overload coils HSOL–C1 and HSOL–C2 to motor HM.

As frame H reaches position P4, motor HM and frame H are stopped at the preselected twenty-fifth bay FB in position P4. As the frame H reaches the preselected twenty-fifth bay FB, normally closed switch LS–3A is opened by trip LST–3 on frame F in FIGS. 4 and 22A: (1) to break circuit No. 44 should also break 52 to deenergize coil HB–C to thus break circuit No. 47 to deenergize and reengage brake HMB, and (2) to break circuits Nos. 65 and 66 to deenergize coil HSF–C to thus break circuit No. 68 to deenergize and stop motor HM so as to stop frame H at position P4. Deenergized coil HB–C opens the normally open contact HB–1 to prevent reforming circuit No. 65 or 66.

*Storing Load W in Left Panel FAL—(2) Load Carrier K Traveling in the Feed in Direction DI Carrying Load W Vertically in Direction DVU From Position P4 to Position P5 and Laterally in Direction DEL to Deposit Load W at Position P6*

Automatic means is provided for moving load W and load carrier K in feed in direction DI from position P4 to position P5, to position P6 into alignment with preselected load support surface F–1 at load transfer position P6 for depositing load W on this load support surface F–1 in left panel FAL by sequentially having vertically movable frame V moved in up direction DVU from position P4 to position P5, laterally movable frame E moved in lateral left direction DEL from position PEC to position PEL, and load support frame J moved in vertical down direction DJD from position PJU to position PJD to deposit load W on load support surface F–1 at position P6.

Vertically movable frame V is moved by motor VM in vertical up direction DVU at fast speed and then at slow speed from position P4 to position P5 and then is stopped at position P5 at the preselected second level FL. Frame V is moved in direction DVU from position P4 to position P5 in the following sequential steps: (1) energizing motor VM for causing fast speed travel of frame V in direction DVU from position P4 to an approach position before position P5, (2) counting the levels FL approached by frame V on counter VNN in FIG. 24V until the preselected second level FL is nearly reached with frame V in this approach position, (3) energizing motor VM for causing slow speed travel of frame V in direction DVU from this approach position to position P5, and (4) stopping motor VM and frame V at the preselected second level FL in position P5.

Fast vertical travel by frame V from position P4 to the approach position before position P5 now occurs. When frame H is at the preselected bay FB, preselected as the twenty-fifth bay, normally open switch LS–3B will be closed by trip LST–3 on frame F with frame H in position P4. This switch closing forms circuit No. 69 from terminal T–1 in FIG. 22A through normally open contact 3R–3 now closed by energized coil 3R–C, normally open switch LS–13B held closed by trip LST–13 on frame E in center position PEC, normally open switch LS–3B now closed by trip LST–3 with frame H in position P4, terminals T–9 in FIG. 22A to FIG. 22B, normally closed contact SV–1 in FIG. 22B of switch SV, normally closed contacts HFR–5 and HFF–6, normally open contact 1LR–7 closed when latching coil 1LR–LC was energized, normally closed switch LS–8A, brake coil VB–C, terminals T–4 in FIG. 22B to FIG. 22A, and terminal T–2 in FIG. 21A. Energizing coil VB–C reforms circuit No. 13 to energize and thus disengage brake VMB in FIG. 21. Fast speed up drive by motor VM is caused by energizing vertical fast speed up starter coil VFU–C by forming circuit No. 71 from terminal T–1 in FIG. 22A through closed switch LS–8A in FIG. 22B by the same path followed by circuit No. 69 and then through normally open switch LS–16 held closed by trip LST–16 on frame E in position PEC, normally open contact VB–1 now closed by energized coil VB–C, normally closed switch LS–6A, normally open contact 1LR–9 closed by energized latching coil 1LR–LC, normally closed contacts VN2R–1 and 4R–5, vertical fast speed up starter coil VFU–C, normally closed contacts VSD–5 and VSU–1, terminals T–4 in FIG. 22B to FIG. 22A, and terminal T–2 in FIG. 22A. Energizing starter coil VFU–C energizes motor VM for fast vertical upward travel by forming circuit No. 72 in FIG. 21 from lines L1, L2 and L3 through normally open contacts VFU–2, VFU–3 and VFU–4, now closed by energized coil VFU–C, and thermal overload coils VFOL–C1 and VFOL–C2 to motor VM.

As frame V travels in direction DVU, other circuits are formed. Since switch LS–8A is opened and closed at each level FL by trips LST–8 on frame H during upward travel of frame V in direction DVU to break circuits Nos. 69 and 71, it is necessary to maintain the energization of coils VB–C and VFU–C by forming circuits Nos. 73 and 75 in FIGS. 22A and 22B corresponding respectively with circuits Nos. 69 and 71 but through holding contact VFU–6 normally opened but now closed by energized coil VFU–C with this contact VFU–6 arranged in parallel with switch LS–8A in circuits Nos. 69 and 71.

Upward movement of frame V provides a safety feature. Note that control position P1 is lower than load transfer position P5 so that control elements or buttons VNS3 carried by said vertically movable frame V, although they are manually actuated in control position P1, move upwardly out of the control position P1 as the frame V moves upwardly to load transfer position P5. Hence, this provides a safety feature so that these buttons VNS3 move up with frame V out of the control of the operator.

Counting levels FL approached by frame V on counter VNN in FIG. 24V until the preselected second level FL is approached now occurs. As frame V travels upwardly in zone KZ, trips LST–7 on frame H at each level FL in FIGS. 2 and 24V closes normally open switch LS–7 momentarily so that the continued upward travel of frame V in direction DVU creates a pulsing action in switch LS–7 and in circuit No. 76 formed by the closing thereof. This circuit No. 76 is formed from terminals T–1 in FIGS. 21 and 24V through closed contact VNS4–1 of switch VNS4, normally closed reset switch contact VNS1–2 of switch VNS1, closed switch LS–7, solenoid VNC, closed contact VNS4–2 of switch VNS4, and terminals T–2 in FIGS. 24V and 21 since toggle switch VNS4 is normally closed. Counter VNN is of any suitable type, such as the one disclosed in U.S. Patent No. 2,799,740 granted July 16, 1957 to F. T. Blackman with units number wheel VNN–W1 adapted to be driven through drive shaft VNN–1 thereof in the same manner as number wheel 13 by drive shaft 22 disclosed in lines 9–28, column 2, page 1 of this patent. This drive shaft VNN–1 is stepped along to advance units number wheel VNN–W1 one number thereon for each pulse by solenoid VNC of any suitable type drive, such as the solenoid and pawl and ratchet wheel counter drive disclosed in U.S. Patent No. 2,540,808 granted February 6, 1951 to H. N. Bliss. Counter VNN has contact points VNN–C1 driven by number wheel VNN–W1 to sequentially engage any of ten circularly arranged contacts for this number wheel, such as contact VNN–2B, and to engage circular grounding strip VNN–CA connected in series with the push key switches, such as switch VNS3–2, earlier pushed at position P1 in FIG. 7 to select the level FL of position P5, of switch VNS3 in the same manner as disclosed in the aforesaid Blackman patent in lines 31–45 and line 65, column 3 to line 8, column 4 by his contact points 37 and 38, grounding strip 46, and contacts 50 to 59.

When the frame V has traveled upwardly along zone KZ far enough to approach the second level FL and the solenoid VNC has been pulsed two times to indicate the second level FL by two opening and closing cycles of switch LS–7, the correct count has been reached and new circuits are formed. Circuit No. 78 is formed from terminal T–1 in FIG. 24V through closed contact VNS4–1, normally closed reset switch contact VNS1–2, closed push key switch contact VNS3–2, counter wheel contact VNN–2B, contact points VNN–C1, counter wheel common grounding strip VNN–CA, coil VN1R–C, rectifier VNZ2 to provide D.-C. current to this circuit, suitable resistance VNZ5, closed contact VNS4–2, and terminal T–2. The filter network VNZ4 is arranged in parallel with a portion of circuit No. 78 to smooth out the ripple in the rectified A.-C. current. Arc suppressor VNZ3 is in parallel with coil VN1R–C. Energizing relay coil VN1R–C forms circuit No. 79 to energize relay coil VN2R–C for purposes to be described hereinafter with this circuit No. 79 extending from terminal T–1 in FIG. 24V through closed contact VNS4–1, normally open contact VN1R–2 now closed by energized coil VN1R–C, relay coil VN2R–C, closed contact VNS4–2, and terminal T–2.

The operation begins to automatically reset counter VNN by reset motor VNM. Energizing coil VN1R–C energizes and starts reset motor VNM by forming circuit No. 80 from terminal T–1 in FIG. 24V through closed contact VNS4–1, normally open contact VN1R–1 now closed by energized coil VN1R–C, reset motor VNM, closed contact VNS4–2, and terminal T–2. As reset motor VNM begins to rotate, motor VNM rotates its cam VNM–2 to move reset switch VNS1 to open normally closed contact VNS1–2 and to close normally open contact VNS1–1 for the time duration of the rotation of the cam by reset motor VNM. Closing reset switch contact VNS1–1 forms circuit No. 82 to energize reset motor VNM with circuit No. 82 formed from terminal T–1 in FIG. 24V through closed contact VNS4–1, closed contact VNS1–1, reset motor VNM, closed contact VNS4–2, and terminal T–2.

Motor VNM must continue to operate until circuit No. 82 is formed. Since opening contact VNS1–2 breaks circuit No. 78 energizing coil VN1R–C to open contact VN1R–1 to break circuit No. 80 to deenergize motor VNM, suitable means is provided to keep motor VNM energized by preventing breaking of circuit No. 80 until after circuit No. 82 has been formed. Contacts VN1R–1 and VN1R–2 controlled by relay coil VN1R–C have time delayed return to the illustrated open position after this coil is deenergized because this relay coil VN1R–C is of the conventional time delay type with a slug in the core to impede flux drop off and to thus temporarily prevent opening of the relay coil contacts controlled by this coil after these contacts have been closed by energizing the time delay relay coil VN1R–C.

Also, coil VN2R–C must remain energized after circuit No. 79 is broken. Circuit No. 83 is formed by closed contact VNS2–1 to maintain coil VN2R–C energized after contact VN1R–2 opens to break circuit No. 79 after the time delay. This circuit No. 83 is formed from terminal T–1 in FIG. 24V through closed contact VNS4–1, reset switch closed contact VNS1–1, closed switch contact VNS2–1 of reset switch VNS2, normally open contact VN2R–3 now closed by energized coil VN2R–C, relay coil VN2R–C, closed contact VNS4–2, and terminal T–2.

The operation of automatically resetting counter VNN by reset motor VNM continues. When the cam VNM–2 driven by reset motor VNM completes its cycle, reset switch contact VNS1–2 is again closed to ready the circuit for the next operation and reset switch contact VNS1–1 is opened to break circuits Nos. 82 and 83 with the reset motor VNM having maintained the reset switch contact VNS1–1 closed for approximately two seconds.

Reset motor VNM also resets counter VNN. Reset motor VNM during its rotation, also returns number wheel VNN–W1 of counter VNN back to zero by driving reset counter shaft VNN–2 through bevel gears VNM–1 with this resetting action delayed sufficiently so that switch contact VNS1–1 has closed a brief period after reset motor VNM has begun its rotation. Then, deenergizing coil VN1R–C by rotation of contact points VNN–C1 by shaft VNN–2 will not deenergize coil VN1R–C so as to break circuits Nos. 79 and 80 to deenergize coil VN2R–C and reset motor VNM until after circuits Nos. 82 and 83 have been formed by closing contact VNS1–1. After resetting of counter VNN begins, circuit No. 78 is broken, if it has not been broken by opening contact VNS1–2; and after the time delay, circuits Nos. 79 and 80 are broken, if they have not been earlier broken. Rotation of counter reset shaft VNN–2 returns number wheel VNN–W1 to zero in any suitable manner, such as by rotation of the reset shaft in line 69, column 1 to line 8, column 2 of the Blackman patent, No. 2,799,740, by means of any suitable reset mechanism, such as that disclosed in line 47, column 1 to line 7, column 2 of U.S. Patent No. 2,342,325, granted February 22, 1944 to H. N. Bliss.

As frame V approaches at position P5 the preselected second level FL, motor VM has sequentially its fast speed upward drive disengaged, its slow speed upward drive engaged, and its slow speed upward drive disengaged, and motor VM is stopped when frame V reaches the second level FL at position P5. This action takes place during the resetting of the counter VNN by motor VNM energized by circuit No. 82. When coil VN2R–C was energized by forming circuit No. 79, its normally closed contact VN2R–1 in FIG. 22B was opened to break circuits Nos. 71 and 75 to deenergize coil VFU–C: (1) to break circuit No. 72 to deenergize the fast speed drive by motor VM, and (2) to break circuits Nos. 73 and 75 by opening normally open contact VFU–6.

As frame V reaches the approach position before the preselected second level FL in position P5, motor VM has its fast speed drive disengaged and its slow speed vertical drive engaged at the approach position before position P5. When coil VFU–C is deenergized, the maintaining contact VFU–6 in circuits Nos. 73 and 75 is moved to its normal open position to break these circuits. However, coil VB–C is maintained energized by circuit No. 69 reformed through switch LS–8A now closed since it has not yet engaged and been opened by trip LST–8 at the second level FL. Now, the fast traveling and vertically up moving frame V begins moving at the slow vertical up speed. When coil VN2R–C was energized, it changed the vertical speed from fast to slow by opening normally closed contact VN2R–1 to break circuit No. 71 energizing starter coil VFU–C to break high speed circuit No. 72 to motor VM, and then by closing normally open contacts VN2R–2 forming circuit No. 87 to energize vertical slow speed up starter coil VSU–C with circuit No. 87 extending from terminal T–1 in FIG. 22A through normally open but now closed contact 1LR–9 in FIG. 22B in the same manner as circuit No. 71 and then through normally open but now closed contact VN2R–2 now closed by energized coil VN2R–C, vertical slow speed up starter coil VSU–C, normally closed contacts VFD–1 and VFU–1, terminals T–4 in FIG. 22B to FIG. 22A, and terminal T–2 in FIG. 22A. After reset motor VNM completes its timing cycle and deenergizes coil VN2R–C by breaking circuit No. 83, coil VSU–C is maintained energized by locking circuit No. 89 following the same path as circuit No. 87 but through normally open contact VSU–5 now closed by energized coil VSU–C instead of the parallel path through the normally open contact VN2R–2. When coil VSU–C is energized, circuit No. 16 is reformed to energize motor VM to cause slow upward movement of frame V until frame V arrives at the proper level FL, preselected as the second level FL.

As frame V travels upwardly toward position P5, switch LS–7 is opened to break circuit No. 76.

As frame V reaches position P5, motor VM and frame V are stopped at the preselected second level FL in position P5. When the switch LS–8A is opened by trip LST–8 with frame V at position P5, circuits Nos. 69, 87 and 89 are broken: (1) to deenergize coil VB–C to break circuit No. 13 to thus deenergize and engage brake VMB and (2) to deenergize starter coil VSU–C to break circuit No. 16 to deenergize and stop the slow upward movement caused by motor VM.

The description of "Advancing Travel Sequence No. 3K" schematically shown in FIG. 1 has now been completed.

Laterally movable frame E is moved by motor EM in lateral left direction DEL from in position PEC at position P5 to left out position PEL at position P6. The load W is inserted into the preselected opening F–2 at the twenty-fifth bay FB and second level FL and deposited on the supporting surface F–1 on members F–3. Frame E is inserted into the preselected opening F–1 by reforming circuit No. 17 for energizing coil EL–C since normally open switch LS–8B in FIG. 22B is now closed by trip LST–8 with frame V at the preselected level FL, and since normally closed contact 2LR–1 was closed when circuit No. 41 previously energized unlatching coil 2LR–UC. Energizing coil EL–C reforms circuit No. 19 to energize brake EMB to disengage this brake and to energize motor EM to move frame E in direction DEL. When the frame E reaches position PEL at the end of its travel, normally closed switch LS–12LA is opened by trip LST–12L on frame E to break circuit No. 17 to deenergize coil EL–C to break circuit No. 19 to stop travel of frame E in position PEL.

Load support frame J is moved by motor JM in vertical down direction DJD from load supporting position PJU to load released position PJD to deposit load W on load support surface F–1 at position P6. As will be recalled, frame J is in the up position PJU after raising load W off the load support surface F–1 at the loading position P3 and has remained in this up position PJU throughout its travel. Therefore, switch LS–10A is open and switch LS–10B is closed by trip LST–10, and switch LS–11A is closed and switch LS–11B is open in their normal positions free of trip LST–11. Now, when switch LS–12LA is opened by trip LS–12L on frame E to stop the movement of frame E in position PEL, switch LS–12LB is closed to form circuit No. 92 to lower frame J and thus deposit the load W on load support surface F–1 of frame F in position P6. This circuit No. 92 extends from terminal T–1 in FIG. 22A through normally closed contact VFU–5 along the same path as circuit No. 17 and then through normally open switch LS–12LB in FIG. 22B held closed by trip LST–12L on frame E in position PEL, closed switch LS–11A, normally closed contact JU–5, coil JD–C, terminals T–4 in FIGS. 22B to FIG 22A, and terminal T–2 in FIG. 22A. When coil JD–C has been energized, motor JM is energized to move frame J down in direction DJD and brake JMB is energized to disengage this brake by forming circuit No. 93 in FIG. 21 extending from power lines L1, L2 and L3 through normally open contacts JD–2, JD–3 and JD–4, now closed by energized coil JD–C, and thermal overload coils JOL–C1 and JOL–C2 to motor JM. Motor JM moves frame J in direction DJD to position PJD to deposit load W onto support surface F–1 from frame J. When frame J approaches down position PJD, normally closed switch LS–11A is opened by trip LST–11 to break circuit No. 92 but coil JD–C is kept energized until the beginning of the return motion to position P1 by a parallel, maintaining circuit No. 94 formed from terminal T–1 in FIG. 22A through closed switch LS–12LB in FIG. 22B along the path followed by circuit No. 92 and then through normally open contact 1LR–12 previously closed by energized coil 1LR–LC, normally open contact JD–5 now closed by energized coil JD–C, coil JD–C, and terminals T–4 in FIG. 22B to FIG. 22A to terminal T–2 in FIG. 22A to lock in coil JD–C. Circuit No. 94 was formed to be sure unlatching coil 1LR–UC has unlatched its controlled contacts by forming circuit No. 96 to be described hereinafter before coil JD–C is deenergized to stop motor JM.

*Returning Empty Load Carrier K—Load Carrier K Traveling in the Feed Out Direction DO From Position P6 Through Positions P5 and P4 to Position P1*

Automatic means is provided for moving empty load carrier K in feed out direction DO from load transfer position P6 to position P1 by sequentially having laterally movable frame E moved in lateral right direction DER from position PEL at position P6 to position PEC, vertically movable frame V moved in down direction DVD from position P5 to position P4, and horizontally movable frame H moved in reverse direction DHR from position P4 to position P1.

Empty carrier K is automatically returned back to control position P1 in a plurality of steps. This return motion is begun by forming circuit No. 96 to energize unlatching coil 1LR–UC with circuit No. 96 extending from terminal T–1 in FIG. 22A through normally open contact 3R–3 now closed by energized coil 3R–C, terminals T–3 in FIGS. 22A to FIG. 22B, switch LS–11B in FIG. 22B closed by trip LST–11 since frame J is approaching position PJD, normally open contact JD–6 closed by the energized coil JD–C, unlatching coil 1LR–UC, terminals T–4 in FIG. 22B to FIG. 22A, and terminal T–2 in FIG. 22A. Energizing coil 1LR–UC opens contact 1LR–12 to break circuit No. 94 so as : (1) to deenergize coil JD–C to break circuit No. 93 to stop motor JM when frame J reaches position PJD and (2) to break circuit No. 96 to deenergize coil 1LR–UC by opening contact JD–6. When unlatching coil 1LR–UC is energized, all of the contacts controlled thereby are returned to their normal and illustrated position to return empty carrier K to starting position P1. After unlatching coil 1LR–UC is energized by circuit No. 96, contact 1LR–1 is returned to its normal open position to break circuit No. 43 for maintaining coil 3R–C energized but coil 3R–C is kept energized by circuit No. 50 formed after frame H left position P1.

Laterally movable frame E is moved by motor EM in lateral right direction DER from left out position PEL at position P6 to in position PEC at position P5 by reforming circuit No. 27 to energize coil ER–C, and circuit No. 29 to energize motor EM and to energize and disengage brake EMB. When the frame E has reached positions PEC and P5, switch LS–13A is opened by trip LST–13 on frame E to break circuit No. 27 to deenergize coil ER–C and thus break circuit No. 29 to deenergize and to engage brake EMB and to deenergize motor EM.

The action hereinafter described is defined as "Returning Travel Sequence No. 4K" schematically shown in FIG. 1. This sequence includes the movement of the frames of carrier K from position P5 to position P1, and includes the circuits formed and broken and the action of the switches required for this purpose. Now, all circuits have been broken except circuit No. 1 energizing transformer T in FIG. 21, and circuit No. 50 energizing coil 3R–C in FIG. 22A; and energized coil 1LR–UC has unlatched its controlled contacts so that they are now in the illustrated position.

Vertically movable frame V is moved by motor VM in vertical down direction DVD at fast speed and then at slow speed from position P5 to position P4 and then is stopped at position P4.

Fast vertical travel by frame V from position P5 to the approach position before position P4 now occurs. When frame E reaches center position PEC, open switch LS–13B is closed by trip LST–13 on frame E. This action reforms circuit No. 30 to energize coil VB–C, circuit No. 13 to energize and disengage brake VMB, circuit No. 31 to energize coil VFD–C, and circuit No. 33 to energize motor VM.

As frame V reaches the approach position before the position P4, motor VM has its fast speed drive disengaged and its slow speed vertical drive engaged at the approach position before position P4. When frame V approaches position P4, normally closed switch LS–14A is opened by trip LST–14 on frame H to break circuit No. 31 to deenergize coil VFD–C to break circuit No. 33 to deenergize the high speed motor VM. However, opening switch LS–14A by trip LST–14 closes switch LS–14B to reform circuit No. 34 to energize the motor VM for slow speed downward movement. Then, there is reformed circuit No. 36 to hold energized coil VSD–C after switch LS–14B is opened to break circuit No. 34, and circuit No. 37 to energize motor VM.

As frame V reaches position P4, motor VM and frame V are stopped in position P4. When frame V reaches position P4 at the bottom of its travel, normally closed switch LS–9B is opened by trip LST–9 on frame H at position P4. As switch LS–9B opens, it breaks circuit No. 36 to deenergize coil VSD–C to break circuit No. 37 to deenergize and stop motor VM and breaks circuit No. 30 to deenergize coil VB–C to break circuit No. 13 to reengage brake VMB to stop frame V at position P4.

As frame V moves in direction DVD, limit switches LS–7 and LS–8 are not actuated because of the pivotal mount of their actuating arms so as to not mix up the counter VNN by reforming circuit No. 76.

Horizontally movable frame H is moved by motor HM in horizontally reverse direction DHR at fast speed and then at slow speed from position P4 to position P1 and then is stopped at position P1. Frame H is moved in direction DHR from position P4 to position P1 in the following sequential steps: (1) energizing motor HM for causing fast speed travel of frame H in direction DHR from position P4 to an approach position before position P1, (2) energizing motor HM for causing slow speed travel of frame H in direction DHR from this approach position to position P1, and (3) stopping motor HM and frame H in position P1.

Fast horizontal travel by frame H from position P4 to the approach position before position P1 now occurs. As switch LS–9B is opened by trip LST–9 with frame V in position P4, switch LS–9A closes. Then, circuit No. 97 is formed from terminal T–1 in FIG. 22A through normally open contact 3R–3 now closed by energized coil 3R–C, normally open switch LS–13B held closed by trip LST–13 on frame E in center position PEC, normally open switch LS–9A now held closed by trip LST–9, normally closed contact 1LR–3, normally closed contact 4R–3, energized brake coil HB–C, and terminal T–2. Energizing coil HB–C reforms circuit No. 47 in FIG. 21 to energize and thus disengage brake HMB. Circuit No. 99 to energize coil HFR–C is formed from terminal T–1 in FIG. 22A along the path followed by circuit No. 97 through normally closed contact 4R–3 and then through normally open contact HB–1 now closed by energized coil HB–C, normally closed contact 1LR–4, normally closed switch LS–4A (held open only in position P1), horizontal high speed reverse starter coil HFR–C, normally closed contacts HSR–1 and HSF–5, and terminal T–2. Energizing coil HFR–C forms circuit No. 100 in FIG. 21 from power lines L1, L2 and L3 through normally open contacts HFR–2, HFR–3 and HFR–4, now closed by energized coil HFR–C, and thermal overload coils HFOL–C1 and HFOL–C2 to motor HM to energize motor HM for fast travel in reverse or return direction DHR.

As frame H approaches the approach position before the position P1, motor HM has its fast speed drive disengaged and its slow speed horizontal drive engaged at the approach position before position P1. As frame H horizontally approaches this approach position, switch LS–4A is held open by trip LST–4 on frame F in FIGS. 4 and 13 to break circuit No. 99 to deenergize starter coil HFR–C and thus break circuit No. 100 to deenergize the high speed travel by motor HM. This action also closes the normally open switch LS–4B to form circuit No. 101 to energize slow speed travel with circuit No. 101 formed from terminal T–1 in FIG. 22A through normally open contact 3R–3 now closed by energized coil 3R–C, normally open switch LS–13B held closed by trip LST–13 on frame E in position PEC, normally open switch LS–9A held closed by trip LST–9, normally closed contacts 1LR–3 and 4R–3, normally open contact HB–1 now closed by energized coil HB–C, normally closed contact 1LR–4, normally open switch LS–4B now held closed by trip LST–4, horizontal slow speed starter coil HSR–C, normally closed contacts HFR–1 and HFF–5, and terminal T–2. Energizing starter coil HSR–C forms circuit No. 103 in FIG. 21 from lines L1, L2 and L3 through normally open starter contacts HSR–2, HSR–3 and HSR–4, now closed by energized coil HSR–C, and thermal overload coils HSOL–C1 and HSOL–C2 to motor HM to move frame H and carrier K at slow speed in direction DHR back to starting position P1.

As carrier K moves in direction DHR, limit switches LS–2 and LS–3 are not actuated because of the pivotal mount of their actuating arms so as to not mix up the counter HNN by reforming circuit No. 54.

As frame H reaches position P1, motor HM and frame H are stopped in position P1. Normally closed switch LS–5 is opened by trip LST–5 on frame F in starting position P1 in FIGS. 4 and 13 to thus break circuit No. 50 to deenergize coil 3R–C and open normally open contact 3R–3 to break circuits Nos. 97 and 101 to break respectively circuits Nos. 47 and 103 to deenergize and engage brake HMB and to deenergize motor HM and stop travel movement of frame H in position P1.

The description of "Returning Travel Sequence No. 4K" has now been completed as shown schematically in FIG. 1.

Now, all frames of carrier K are in position P1, all circuits are deenergized except circuit No. 1 to transformer T in FIG. 21, and all contacts are in their normal and illustrated positions. Carrier K is in control position P1 so as to be easily viewed by the operator at this position and to receive further travel instructions from the operator.

Counter HNN in FIG. 23H can be manually reset at position P1. If the counter HNN, through inadvertence or some error, still has a number thereon and has not returned to zero when H has now returned to the starting position P1, manually pressing reset button switch HNS2 will restore it to zero by forming circuit No. 104 from terminal T–1 in FIG. 23H through closed contact HNS4–1, normally open but now closed reset switch contact HNS2–2, reset motor HNM, closed contact HNS4–2, and terminal T–2. After reset motor HNM has rotated far enough to close reset switch contact HNS1–1, reset button switch HNS2 may be released to break circuit No. 104 because holding circuit No. 106 has been formed from terminal T–1 in FIG. 23H through closed contact HNS4–1, closed switch contact HNS1–1, reset motor HNM, closed contact HNS4–2, and terminal T–2 to keep motor HNM energized. When reset motor HNM completes its rotation cycle, its cam HNM–2 will open reset switch contact HNS1–1 in the manner previously described to break circuit No. 106 and deenergize reset motor HNM.

Counter VNN in FIG. 24V can be manually reset at position P1. If the counter through inadvertence or some error, still has numbers thereon and has not returned to zero when carrier K has now returned to starting position P1, manually pressing reset button switch VNS2 will restore it to zero by forming circuit No. 107 from terminal T–1 in FIG. 24V through closed contact VNS4–1, normally open but now closed reset switch contact VNS2–2, reset motor VNM, closed contact VNS4–2, and terminal T–2. After reset motor VNM has rotated far enough to close reset switch contact VNS1–1, reset button switch VNS2 may be released to break circuit No. 107 because holding circuit No. 108 has been formed from terminal T–1 in FIG. 24V through closed contact VNS4–1, closed switch contact VNS1–1, reset motor VNM, closed contact VNS4–2, and terminal T–2 to keep motor VNM energized. When reset motor VNM completes its rotation cycle, its cam VNM–2 will open reset switch contact VNS1–1 in the manner previously described to break circuit No. 108 and deenergize reset motor VNM.

*Retrieving Load W in Left Panel FAL—(1) Empty Load Carrier K Traveling in the Feed in Direction DI From Position P1 Through Positions P4 and P5 to Position P6 to Pick Up Load W at Position P6 and (2) Load Carrier K Carrying Load W Traveling in the Feed Out Direction DO Carrying Load W From Position P6 Through Positions P5 and P4 to Position P1*

Automatic means is provided for moving empty load carrier K in feed in direction DI from position P1 to position P6, picking up load W at preselected position P6 in left panel FAL, and then moving in feed out direction DO from position P6 to position P1 by sequentially having horizontally movable frame H moved in forward direction DHF from position P1 to position P4, vertically movable frame V moved in up direction DVU from position P4 to position P5, laterally movable frame E moved in lateral left direction DEL from position PEC to position PEL, load support frame J moved in vertical up direction DJU from position PJD to position PJU to pick up load W from load support surface F–1 at position P6, laterally movable frame E moved in lateral right direction DER from position PEL at position P6 to position PEC, vertically movable frame V moved in down direction DVD from position P5 to position P4, and horizontally movable frame H moved in reverse direction DHR from position P4 to position P1.

If the operator desires to retrieve load W in position P6 earlier deposited in the twenty-fifth bay FB and second level FL, he presses in push key switches HNS3–20 and HNS3–5 to indicate the twenty-fifth bay FB and pushes in push key switch VNS3–2 to indicate the second level FL, as he did before.

Then, he must push the start left button switch SL until the first four next mentioned circuits are set up and then he may release this button switch as before to start the operation, so as to retrieve load W from left hand panel FAL in position P6. This action reforms circuit No. 38 to energize latching relay coil 1LR–LC, circuit No. 40 to energize main start relay coil 3R–C, circuit No. 41 to energize unlatching coil 2LR–UC, and circuit No. 43 to maintain energized coil 3R–C.

Since there has been formed, and still exist, the proper circuits (circuit No. 1 to energize transformer T, and circuit No. 43 to energize coil 3R–C) needed for the "Advancing Travel Sequence No. 3K," carrier K proceeds through this earlier defined "Advancing Travel Sequence No. 3K" with frame H traveling in direction DHF from position P1 to position P4 and with frame V traveling in direction DVU from position P4 to position P5.

In position P5, laterally movable frame E is moved by motor EM in lateral left direction DEL from in position PEC at position P5 to left out position PEL at position P6 by reforming circuit No. 17 to energize coil EL–C, and circuit No. 19 to energize and disengage brake EMB and to energize motor EM. When frame E reaches position PEL, switch LS–12LA is opened by trip LST–12L on frame E to break circuit No. 17 to deenergize coil EL–C to break circuit No. 19 to stop travel of frame E in position PEL.

Load support frame J is moved by motor JM in vertical up direction DJU from load released position PJD to load supporting position PJU to lift load W up off load support surface F–1 of frame F at position P6 by reforming circuit No. 20 by closing switch LS–12LB to energize coil JU–C, circuit No. 22 to energize brake JMB and motor JM, circuit No. 23 to maintain energized coil JU–C, and circuit No. 24 to energize unlatching coil 1LR–UC.

Laterally movable frame E is moved by motor EM in lateral right direction DER from left out position PEL at position P6 to in position PEC at position P5. When unlatching coil 1LR–UC is energized, contact 1LR–10 is returned to its normally closed position and switch LS–13A is closed in position PEL, so that circuit No. 27 reforms to energize coil ER–C to reform circuit No. 29 to energize motor EM and to energize and disengage brake EMB to move frame E from position PEL to position PEC. In position PEC, trip LST–13 opens switch LS–13A to break circuit No. 27 to de-energize coil ER–C to break circuit No. 29 to deenergize and stop motor EM and to de-energize and engage brake EMB to stop frame E in position PEC.

Frame V is moved in down direction DVD to position P4 and frame H is moved in reverse direction DHR to position P1. Since frames V and E are now in position P5, trip LST–13 on frame E closes switch LS–13B to reform circuits Nos. 30, 13, 31 and 33 to energize respectively coil VB–C, brake VMB, coil VFD–C and motor VM in "Returning Travel Sequence No. 4K." Since there has been earlier formed, and still exist, the proper circuits (circuit No. 1 to energize transformer T, and circuit No. 50 to energize coil 3R–C) needed for this sequence and since coil 1LR–UC has unlatched its controlled contacts, carrier K now proceeds from these circuits Nos. 30, 13, 31 and 33 through the remainder of this earlier defined "Returning Travel Sequence No. 4K" by having frame V travel in direction DVD and frame H travel in direction DHR back to position P1.

Now, all frames of carrier K are in position P1, all circuits are deenergized except circuit No. 1 to transformer T in FIG. 21, and all contacts are in their normal and illustrated positions. Carrier K is in control position P1 so as to be easily viewed by the operator at this position and to receive further travel instructions from the operator.

*Retrieving Load W—(3) Load Carrier K Traveling in the Feed Out Direction DO Carrying Load W from Position P1 through Position P2 to Position P3 to Deposit Load W at Position P3 and Load Carrier K Traveling in the Feed In Direction DI from Position P3 through Position P2 To Return to Position P1*

Automatic means is provided for moving load W and load carrier K in feed out direction DO from position P1 to position P3, depositing load W at position P3 in left panel FAL, and then moving in feed in direction DI from position P3 to position P1 by sequentially having vertically movable frame V moved in up direction DVU from position P1 to position P2, laterally movable frame E moved in lateral left direction DEL from position PEC to position PEL, load support frame J moved in vertical down direction DJD from position PJU to position PJD to deposit load W on load support surface F–1 at position P3, laterally movable frame E moved in lateral right direction DER from position PEL to position PEC, and vertically movable frame V moved in down direction DVD from position P2 to position P1.

Pushing switch button S3 causes carrier K to proceed through earlier defined "Advancing travel Sequence No. 1K" with frame V traveling in direction DVU from position P1 to position P2 and frame E traveling in direction DEL from position P2 to position P3.

In position P3, load support frame J is moved by motor JM in vertical down direction DJD from load supporting position PJU to load released position PJD to deposit load W on load support surface F–1 of frame F at position P3 by reforming circuit No. 92 by closing switch LS–12LB to energize coil JD–C, circuit No. 93 to energize motor JM, circuit No. 94 to maintain energized coil JD–C, and circuit No. 96 to energize unlatching coil 1LR–UC.

Frame E is moved in direction DER to position P2 and frame V is moved in down direction DVD to position P1. Since frame E is now in position P3, switch LS–13A is closed to reform circuit No. 27 to energize coil ER–C and circuit No. 29 to energize motor EM and brake EMB in "Returning Travel Sequence No. 2K." Since there has been earlier formed, and still exists, the proper circuits (circuit No. 1 to energize transformer T, circuit No. 26 to energize coil 4R–C, and circuit No. 10 to energize coil 3R–C) needed for this sequence and since coil 1LR–UC has unlatched its controlled contacts, carrier K now proceeds from these circuits Nos. 27 and 29 through the remainder of this earlier defined "Returning Travel Sequence No. 2K" by having frame E travel from position P3 in direction DER, and frame V travel in direction DVD back to position P1.

Now, all frames of carrier K are in position P1, all circuits are deenergized except circuit No. 1 to transformer T in FIG. 21, and all contacts are in their normal and illustrated positions. Carrier K is in control position P1, so as to be easily viewed by the operator at this position and to receive further travel instructions from the operator.

*Storing Load W in and Retrieving Load W from Right Panel FAR by Travel in Feed In Direction DI from Position P1 through Positions P4 and P5 to Position P7 To Store Load W in Position P7 and Then in Feed Out Direction DO Back to Position P1 during Both Storing and Retrieving Actions*

Automatic means is provided for moving load carrier K in (1) a storing action carrying load W in feed in direction DI and moving as an empty carrier in the feed out direction DO and in (2) a retrieving action moving as an empty carrier in the feed in direction DI and carrying load W in feed out direction DO with each of these actions having carrier K moving in feed in direction DI from position P1 to preselected position P7 in right panel FAR, depositing load W during the storing action or picking up load W during the retrieving action in position P7, and then moving in feed out direction DO from position P7 to position P1 by sequentially having in the storing action horizontally movable frame H carrying load W and moved in forward direction DHF from position P1 to position P4, vertically movable frame V moved in up direction DVU from position P4 to position P5, laterally movable frame E moved in lateral right direction DER in FIG. 2 from position PEC to position PER, load support frame J moved in vertical down direction DJD from position PJU to position PJD to deposit load W on load support surface F–1 at position P7, laterally movable frame E of empty carrier K moved in lateral left direction DEL from position PER to position PEC, vertically movable frame V moved in down direction DVD from position P5 to position P4, and horizontally movable frame H moved in reverse direction DHR from position P4 to position P1; and by sequentially having in the retrieving action horizontally movable frame H of empty carrier K moved in forward direction DHF from position P1 to position P4, vertically movable frame V moved in up direction DVU from position P4 to position P5, laterally movable frame E moved in lateral right direction DER from position PEC to position PER, load support frame J moved in vertical up direction DJU from position PJD to position PJU to pick up load W from load support surface F–1 at position P7, laterally movable frame E carrying load W and moved in lateral left direction DEL from position PER to position PEC, vertically movable frame V moved in down direction DVD from position P5 to position P4, and horizontally movable frame H moved in reverse direction DHR from position P4 to position P1.

If the operator again desires to store load W in the twenty-fifth bay FB and second level FL of position P5, he presses in push key switches HNS3–20 and HNS3–5 to indicate the twenty-fifth bay FB and pushes in push key switch VNS3–2 to indicate the second level FL, as he did before.

If the operator desires to store load W in the right hand panel FAR in position P7 in FIG. 2 instead of in left hand panel FAL in position P6, as he had previously done, the operator presses the start right switch button SR to store load W in right hand panel FAR.

After the start right button SR has been pushed, some circuits are set up. Latching relay latching coil 1LR–LC is energized by circuit No. 113 formed from transformer terminals T–1 in FIGS. 21 and 22A through closed contact S2–1 of stop button switch S2, closed contact SR–1 of start right switch button SR, normally closed contact 3R–1, latching relay latching coil 1LR–LC, and transformer terminals T–2 in FIGS. 22A and 21 to energize coil 1LR–LC. Energizing coil 1LR–LC forms circuit No. 114 from terminal T–1 in FIG. 22A through closed contact SR–1 of switch SR along the path of circuit No. 113 and then through normally open contact 1LR–1 closed by energized coil 1LR–LC; main start relay coil 3R–C; closed overload contacts HFOL–1, HFOL–2, HSOL–1, HSOL–2, VSOL–2, VSOL–1, VFOL–2, VFOL–1, EOL–1, EOL–2, JOL–1 and JOL–2; and terminal T–2. Pushing start right button switch SR also forms circuit No. 115 to energize latching relay latching coil 2LR–LC with circuit No. 115 formed from terminal T–1 in FIG. 22A through the closed contacts S2–1 of stop button switch S2, closed contact SR–2 of start right button switch SR, latching relay latching coil 2LR–LC, and terminal T–2. Energizing coil 2LR–LC will move all contacts controlled thereby to actuated position so that right panel FAR will be serviced by frame E.

After the start right button switch SR is released, circuits Nos. 113, 114 and 115 are broken, but main start relay coil 3R–C is kept energized by reforming maintaining circuit No. 43 by normally open contact 3R–2 now closed by energized coil 3R–C and by normally open contact 1LR–1 closed when latching coil 1LR–LC was energized. Although circuit Nos. 113, 114 and 115 are broken respectively after switch SR has been released and after the coil 3R–C has been energized to open contact 3R–1 to break circuit No. 113 so that latching coils 2LR–LC and 1LR–LC are deenergized, all contacts controlled by coil 2LR–LC remain locked in the actuated position until button switch SL is pushed to energize coil 2LR–UC when servicing panel FAL, and all contacts controlled by coil 1LR–LC remain locked in the actuated position until the unlatching coil 1LR–UC in FIG. 22B is energized later in the cycle.

Since there has been earlier formed, and still exist the proper circuits (circuit No. 1 to energize transformer T, and circuit No. 43 to energize coil 3R–C) needed for the "Advancing Travel Sequence No. 3K", carrier K proceeds through this earlier defined "Advancing Travel Sequence No. 3K" with frame H traveling in direction DHF from position P1 to position P4 and with frame V traveling in direction DVU from position P4 to position P5.

In position P5, laterally movable frame E is moved by motor EM in lateral right direction DER from in position PEC at position P5 to right out position PER at position P7. Closing switch LS–8B by trip LST–8 when frame V is in position P5 starts movement of frame E by forming circuit No. 118 from terminal T–1 in FIG. 22A through normally open contact 3R–3 now closed by energized coil 3R–C; terminals T–3 in FIGS. 22A to 22B; switch LS–8B in FIG. 22B closed by trip LST–8 at the second level FL; normally closed contacts SE–1 of switch SE, VFD–5 and VFU–5; normally closed switches LS–12LA and LS–12RA (closed as long as frame E is not in position PEL or PER); normally open contact 1LR–13 closed by energized latching coil 1LR–LC; contact 2LR–2 closed since circuit No. 115 was formed to energize coil 2LR–LC; normally closed contact EL–1; coil ER–C; terminals T–4 in FIG. 22B to FIG. 22A; and terminal T–2 in FIG. 22A. Energizing coil ER–C reforms circuit No. 29 in FIG. 21 to energize and disengage brake EMB and to energize motor EM to advance frame E in direction DER. When the frame E has reached the outer end of its travel at positions PER and P7, normally closed switch LS–12RA in FIG. 22B is opened by trip LST–12R on frame E to break circuit No. 118 to deenergize coil ER–C to break circuit No. 29 so as to stop motor EM and to engage brake EMB to stop motion of frame E in direction DER in position PER.

Load support frame J is moved by motor JM in vertical down direction DJD from load supporting position PJU to load release position PJD to deposit load W onto load support surface F–1 of frame F at position P7. Frame J is lowered to deposit the load by forming circuit No. 120 from terminal T–1 in FIG. 22A along the path of circuit No. 118 through normally closed contact VFU–5 and then through normally open switch LS–12RB now held closed by trip LST–12R on frame E in position PER, normally closed switch LS–11A (closed while frame J is not in position PJD), normally closed contact JU–5, coil JD–C, terminals T–4 in FIG. 22B to FIG. 22A, and terminal T–2 in FIG. 22A. Energizing coil JD–C reforms circuit No. 93 in FIG. 21 to energize motor JM and disengage brake JMB. Motor JM moves frame J in direction DJD to position PJD to deposit load W on support surface F–1 from frame J. When frame J approaches down position PJD, normally closed switch LS–11A is opened by trip LST–11 to break circuit No. 120 but coil JD–C is kept energized until the beginning of the return motion to position P1 by a parallel, maintaining circuit No. 121 formed from terminal T–1 in FIG. 22A through closed switch LS–12RB along the same path as circuit No. 120 and then through normally open contact 1LR–12 closed by energized latching coil 1LR–LC, normally open contact JD–5 now closed by energized coil JD–C, coil JD–C terminals T–4 in FIG. 22B to FIG. 22A, and terminal T–2 in FIG. 22A. Circuit No. 121 was formed to be sure unlatching coil 1LR–UC has firmly unlatched its controlled contacts by reforming circuit No. 96 before coil JD–C is deenergized to stop motor JM.

Empty carrier K is automatically returned back to control position P1 in a plurality of steps. This return motion is begun by reforming circuit No. 96 to energize unlatching coil 1LR–UC. Energizing coil 1LR–UC opens contact 1LR–12 to break circuit No. 121 so as: (1) to deenergize coil JD–C to break circuit No. 93 to stop motor JM when frame J reaches position PJD and (2) to break circuit No. 96 deenergize coil 1LR–UC by opening contact JD–6. When unlatching coil 1LR–UC is energized, all of the contacts controlled thereby are returned to their normal and illustrated position to return empty carrier K to starting position P1. After unlatching coil 1LR–UC is energized by circuit No. 96, contact 1LR–1 is returned to its normal open position to break circuit No. 43 for maintaining coil 3R–C energized but coil 3R–C is kept energized by circuit No. 50 formed after frame H left position P1.

Laterally movable frame E is moved by motor EM in lateral left direction DEL from right out position PER at position P7 to in position PEC at position P5. The empty frame E is moved out of frame F onto the center of frame V in position P2 by circuit No. 124 formed from terminal T–1 in FIG. 22A through normally open contact 3R–3 now closed by energized coil 3R–C; terminals T–3 in FIGS. 22A and 22B; normally open switch LS–8B in FIG. 22B held closed by trip LST–8 on frame H at position P5 at level FL; closed contact SE–1 of switch SE; normally closed contacts VFD–5 and VFU–5; terminals T–100 in FIG. 22B to FIG. 22A; normally closed switch LS–13A in FIG. 22A closed by trip LST–13 on frame E since frame E is in position PER; terminals T–11 in FIG. 22A to FIG. 22B; normally closed contacts 1LR–10 JU–7 and JD–7; contact 2LR–4 closed when latching coil 2LR–LC was energized by circuit No. 115; normally closed contact ER–1 in FIG. 22B; coil EL–C; terminals T–4 in FIG. 22B to FIG. 22A; and terminal T–2 in FIG. 22A. Energizing coil EL–C energizes motor EM and disengages brake EMB to move the frame E and load W out of frame F by reforming circuit No. 19 in FIG. 21. When the frame E has reached positions PEC and P5, switch LS–13A is opened by trip LST–13 on frame E to break circuit No. 124 to deenergize coil EL–C and thus break circuit No. 19 to deenergize and to engage brake EMB and to deenergize motor EM.

Frame V is moved in down direction DVD to position P4 and frame H is moved in reverse direction DHR to position P1. Since frames V and E are now in position P5, trip LST–13 on frame E closes switch LS–13B to reform circuits Nos. 30, 13, 31 and 33 to energize respectively coil VB–C, brake VMB, coil VFD–C and motor VM in "Returning Travel Sequence No. 4K." Since there has been earlier formed, and still exist, the proper circuits (circuit No. 1 to energize transformer T, and circuit No. 50 to energize coil 3R–C) needed for this sequence and since coil 1LR–UC unlatched its controlled contacts, carrier K now proceeds from these circuits Nos. 30, 13, 31 and 33 through the remainder of this earlier defined "Returning Travel Sequence No. 4K" by having frame V travel in direction DVD and frame H travel in direction DHR back to position P1.

Now, all frames of carrier K are in position P1, all circuits are deenergized except circuit No. 1 to transformer T in FIG. 21, and all contacts are in their normal and illustrated positions. Carrier K is in control position P1 so as to be easily viewed by the operator at this position and to receive further travel instructions from the operator.

If the operator desires to retrieve load W in position P7 earlier deposited in the twenty-fifth bay FB and second level FL; he presses in push key switches HNS3–20 and HNS3–5 to indicate the twenty-fifth bay FB and pushes in push key switch VNS3–2 to indicate the second level FL, as he did before. Then, he must push the start right button switch SR, until the first four next mentioned circuits are formed and then he may release this button switch as before to start the operation, so as to retrieve load W from right hand panel FAR in position P7. This action reforms circuit No. 113 to energize latching relay coil 1LR–LC, circuit No. 114 to energize main start relay coil 3R–C, circuit No. 115 to energize latching coil 2LR–LC, and circuit No. 43 to maintain energized coil 3R–C.

Since there has been formed, and still exist, the proper circuits (circuit No. 1 to energize transformer T, and circuit No. 43 to energize coil 3R–C) needed for the "Advancing Travel Sequence No. 3K," carrier K proceeds through this earlier defined "Advancing Travel Sequence No. 3K" with frame H traveling in direction DHR from position P1 to position P4 and with frame V traveling in direction DVU from position P4 to position P5.

In position P5, laterally movable frame E is moved by motor EM in lateral right direction DER from in position PEC at position P5 to right out position PER at position P7 by reforming circuit No. 118 by closing switch LS–8B to energize coil ER–C, and circuit No. 29 to energize and disengage brake EMB and to energize motor EM. When frame E reaches position PER, switch LS–12RA is opened by trip LST–12R on frame E to break circuit No. 118 to deenergize coil ER–C to break circuit No. 29 to deenergize motor EM to stop travel of frame E in position PEL.

Load support frame J is moved by motor JM in vertical up direction DJU from load released position PJD to load supporting position PJU to pick up load W from load support surface F–1 of frame F at position P7. Empty load support frame J is moved by motor JM in vertical up direction DJU from load released position PJD to load supporting position PJU to pick up load W from load support surface F–1 of frame F at position P7. Frame J is raised into load contact by forming circuit No. 127 from terminal T–1 in FIG. 22A along the path of circuit No. 118 through normally closed contact VFU–5 and then through normally open switch LS–12RB now held closed by trip LST–12R on frame E in position PER, normally closed switch LS–10A (closed while frame J is not in position PJU), normally closed contact JD–1, coil JU–C, terminals T–4 in FIG. 22B to FIG. 22A, and terminal T–2 in FIG. 22A. Energizing coil JU–C reforms circuit No. 22 in FIG. 21 to energize motor JM and disengage brake JMB. Motor JM moves frame J in direction DJU to position PJU to lift load W off support surface F–1 in position P7 onto frame J. When frame J approaches up position PJU, normally closed switch LS–10A is opened by trip LST–10 to break circuit No. 127 but coil JU–C is kept energized until the beginning of the return motion to position P1 by a parallel, maintaining circuit No. 128 formed from terminal T–1 in FIG. 22A through closed switch LS–12RB along the same path as circuit No. 127 and then through normally open contact 1LR–11 closed by energized latching coil 1LR–LC, normally open contact JU–1 now closed by energized coil JU–C, coil JU–C, terminals T–4 in FIG. 22B to FIG. 22A, and terminal T–2 in FIG. 22A. Circuit No. 128 was formed to be sure unlatching coil 1LR–UC has firmly unlatched its controlled contacts by reforming circuit No. 24 to energize coil 1LR–UC before coil JU–C is deenergized to stop motor JM.

Unlatching coil 1LR–UC in FIG. 22B is energized to withdraw by frame J the load W from frame F at position P7 back onto frame V at position P5 and then move it by frames V and H back to starting position P1. Reforming circuit No. 24 energizes coil 1LR–UC to open contact 1LR–11 to break circuit No. 128 so as: (1) to deenergize coil JU–C to break circuit No. 22 to stop motor JM when frame J reaches position PJU and (2) to break circuit No. 24 by opening contact JU–6. When unlatching relay coil 1LR–UC is energized, the contacts 1LR–1 to 1LR–13 are all returned to their illustrated, unactuated and normal position to return load W and carrier K to starting position P1.

Laterally movable frame E is moved by motor EM in lateral left direction DEL from right out position PER at position P7 to in position PEC at position P5. When unlatching coil 1LR–UC is energized, contact 1LR–10 is returned to its normally closed position and switch LS–13A is closed in position PER so that circuit No. 124 reforms to energize coil EL–C to reform circuit No. 19 to energize motor EM and to energize and disengage brake EMB to move frame E from position PER to position PEC. In position PEC, trip LST–13 opens switch LS–13A to break circuit No. 124 to deenergize coil EL–C to break circuit No. 19 to deenergize and stop motor EM and to deenergize and engage brake EMB to stop frame E in position PEC.

Frame V is moved in down direction DVD to position P4 and frame H is moved in reverse direction DHR to position P1. Since frames V and E are now in position P5, trip LST–13 on frame E closes switch LS–13B to reform circuits Nos. 30, 13, 31 and 33 to energize respectively coil VB–C, brake VMB, coil VFD–C and motor VM in "Returning Travel Sequence No. 4K." Since there has been earlier formed, and still exist, the proper circuits (circuit No. 1 to energize transformer T, and circuit No. 50 to energize coil 3R–C) needed for this sequence and since coil 1LR–UC has unlatched its controlled contacts, carrier K now proceeds from these circuits Nos. 30, 13, 31 and 33 through the remainder of this earlier defined "Returning Travel Sequence No. 4K" by having frame V travel in direction DVD and frame H travel in direction DHR back to position P1.

Now, all frames of carrier K are in position P1, all circuits are deenergized except circuit No. 1 to transformer T in FIG. 21, and all contacts are in their normal and illustrated positions. Carrier K is in control position P1 so as to be easily viewed by the operator at this position and to receive further travel instructions from the operator.

*Safety Overtravel Action—Horizontal Movement of Frame H in Direction DHF Through Position P4 Past Last Bay FB*

There is provided means responsive to overtravel of frame H of carrier K for stopping the carrier; and return means, automatically responsive to this overtravel for starting return movement, for moving frame H by return movement from its overtravel position back to reference position P1.

As horizontally movable frame H is being moved by motor HM in horizontally forward direction DHF away from position P1, earlier defined "Advancing Travel Sequence No. 3K" is occurring. If frame H is traveling at fast speed, there have been formed circuit No. 44 and/or 52 to energize brake coil HB–C, circuit No. 47 to energize brake HMB, circuit No. 45 and/or 51 to energize fast speed coil HFF–C, and circuit No. 48 to energize motor HM. If frame H is traveling at slow speed, there have been formed circuit No. 44 to energize brake coil HB–C, circuit No. 47 to energize brake HMB, circuit No. 65 and/or 66 to energize slow speed coil HSF–C, and circuit No. 68 to energize motor HM.

Whenever during the forward travel of frame H in direction DHF a dangerous condition occurs with frame H having a tendency to travel in direction DHF beyond the last bay FB, normally open switch LS–1B is closed by trip LST–1 on frame F to form circuit No. 131 to return carrier K immediately in direction DHR back to starting position P1. This circuit No. 131 is formed from terminal T–1 in FIG. 22A through normally open contact 3R–3 now closed by energized coil 3R–C; closed switch LS–1B in FIG. 22A; terminals T–5 in FIG. 22A to FIG. 22B; unlatching coil 1LR–UC in FIG. 22B; terminals T–4 in FIG. 22B to FIG. 22A; and terminal T–2 in FIG. 22A.

Travel of frame H in direction DHF is stopped. When switch LS–1B is closed by trip LST–1, unlatching coil 1LR–UC opens in FIG. 22A normally open contact 1LR–5 to brake circuits Nos. 45, 51, 65 and/or 66 to deenergize motor HM by breaking circuit No. 48 or 68 to stop the forward travel by motor HM.

However, brake HMB remains disengaged so movement of frame H may continue. If frame H had been traveling at fast speed in direction DHF so that circuit No. 51 was energizing coil HFF–C and brake coil HB–C was energized by circuit No. 52, deenergizing coil HFF–C would have opened normally open contact HFF–1 to break circuit No. 52 but brake coil HB–C would be maintained energized by circuit No. 97 now reformed by the closing of normally closed contact 1LR–3 in FIG. 22A since switch LS–9A is held closed by trip LST–9.

Motor HM is energized to move frame H in direction DHR. After this unlatching coil 1LR–UC is energized, normally closed contact 1LR–4 in FIG. 22A closes to reform circuit No. 99 to energize the high speed reverse coil HFR–C, because switch LS–4A is closed when not in position P1, to thus reform circuit No. 100 to energize motor HM for driving frame H in the horizontal reverse direction DHR at fast speed.

As the return travel starts in direction DHR and overtravel is corrected, circuit No. 131 is broken.

Frame H is moved in reverse direction DHR to position P1. Since there has been earlier formed, and still exist, the proper circuits (circuit No. 1 to energize transformer T, and circuit No. 50 to energize coil 3R–C) needed for "Returning Travel Sequence No. 4K" and since coil 1LR–UC has unlatched its controlled contacts, carrier K now proceeds from circuits Nos. 99 and 100 through the remainder of this earlier defined "Returning Travel Sequence No. 4K" by having frame H travel in direction DHR back to position P1.

Now, all frames of carrier K are in position P1, all circuits are deenergized except circuit No. 1 to transformer T in FIG. 21, and all contacts are in their normal and illustrated positions. Carrier K is in control position P1 so as to be easily viewed by the operator at this position and to receive further travel instructions from the operator.

*Safety Overtravel Action—Vertical Movement of Frame V in Direction DVU Through Position P5 Past Top Level FL*

There is provided means responsive to overtravel of frame V of carrier K for stopping the carrier; and return means, automatically responsive to this overtravel for starting return movement, for moving frames H and V by return movement from this overtravel position back to reference position P1.

As vertically movable frame V is being moved by motor VM in vertical up direction DVU away from position P4, earlier defined "Advancing Travel Sequence No. 3K" is occurring. If frame V is traveling at fast speed, there have been formed circuit No. 69 and/or 73 to energize brake coil VB–C, circuit No. 13 to energize brake VMB, circuit No. 71 and/or 75 to energize fast speed coil VFU–C, and circuit No. 72 to energize motor VM. If frame V is traveling at slow speed, there have been formed circuit No. 69 to energize brake coil VB–C, circuit No. 13 to energize brake VMB, circuit No. 87 and/or 89 to energize slow speed coil VSU–C, and circuit No. 16 to energize motor VM.

Whenever during upward travel of frame V in direction DVU, a dangerous condition occurs with frame V having a tendency to travel in direction DVU beyond the top most level FL, normally open switch LS–6B is closed by trip LST–6 on frame H in FIG. 22B to form circuit No. 132 to return carrier K immediately in directions DVD and DHR back to starting position P1. This circuit No. 132 is formed from terminal T–1 in FIG. 22A through normally open contact 3R–3 now closed by energized coil 3R–C; terminals T–3 in FIG. 22A to FIG. 22B; closed switch LS–6B in FIG. 22B; unlatching coil 1LR–UC; terminals T–4 in FIG. 22B to FIG. 22A; and terminal T–2 in FIG. 22A.

Travel of frame V in direction DVU is stopped by deenergizing motor VM and brake VMB. Energizing unlatching coil 1LR–UC opens normally open contact 1LR–7 in FIG. 22B to break circuits Nos. 69 and/or 73 to deenergize brake coil VB–C to break circuit No. 13 to deenergize brake VMB and to break circuits Nos. 71, 75, 87 and/or 89 to deenergize coil VFU–C or VSU–C to break circuit No. 16 or 72 to deenergize motor VM.

Motor VM and brake VMB were energized to move frame V in direction DVD at fast speed. Since frames V and E are now centered on frame H in a position equivalent to position P5, trip LST–13 on frame E holds switch LS–13B closed. Energizing unlatching coil 1LR–UC closes normally closed contact 1LR–6 to reform circuit No. 30 to energize brake coil VB–C to reform circuit No. 13 to energize brake VMB and to reform circuit No. 31 to energize vertical high speed down coil VFD–C to reform circuit No. 33 to energize motor VM.

As the return travel starts in direction DVD and overtravel is corrected, circuit No. 132 is broken.

Frame V is moved in down direction DVD to position P4 and frame H is moved in reverse direction DHR to position P1. Since there has been earlier formed, and still exist, the proper circuits (circuit No. 1 to energize transformer T, and circuit No. 50 to energize coil 3R–C) needed for "Returning Travel Sequence No. 4K" and since coil 1LR–UC has unlatched its controlled contacts, carrier K now proceeds from these circuits Nos. 30, 13, 31 and 33 through the remainder of this earlier defined "Returning Travel Sequence No. 4K" by having frame V travel in direction DVD and frame H travel in direction DHR back to position P1.

Now, all frames of carrier K are in position P1, all circuits are deenergized except circuit No. 1 to transformer T in FIG. 21, and all contacts are in their normal and illustrated positions. Carrier K is in control position P1 so as to be easily viewed by the operator at this position and to receive further travel instructions from the operator.

*Safety Jam Action—Moving Frames E and J in Direction DEL or DER With Its Carried Load W Onto a Load Carrying Surface F–1 in Frame F in Position P3, P6 or P7 With Frame J in Up Position PJU*

Means is provided responsive to a load W on a load support surface F–1 at any load transfer positions P3, P6 or P7 for stopping, before collision damage occurs, the travel of laterally movable frame E from in position PEC toward out position PEL or PER while load support frame J is in raised or load supporting position PJU and for automatically returning laterally movable frame E to in position PEC and moving frame V from load transfer position P2 or P5 back to reference position P1.

As previously described, laterally movable frame E may be moved in lateral left direction DEL or right direction DER from position PEC in position P2 or P5 to position PEL in position P3 or P6 or position PER in position P7 with load support frame J in vertical up position PJU to deposit load W, carried by frame J, on load support surface F–1 in frame F at position P3, P6 or P7.

When frame F has a load W stored on one of its load support surfaces F–1 therein and the apparatus attempts to move load W on frame J onto this same surface F–1 with frame J in up position PJU, interference would occur when frame J strikes the load W in frame F. However, before damage can occur, switch LS–15 in FIG. 22B is closed by trip LST–15 to start the return motion of carrier K back to position P1.

Switch LS–15 is mounted on frame J in FIGS. 12, 14, 15 and 22B, and is actuated by trip LST–15 having a long flat trip bar LST–15A with a block LST–15B, having notch LST–15D therein, secured half way between its ends with bar LST–15A endwise slidably mounted in frame J by four guide blocks J–5 and J–6 on frame J. Two centering springs LST–15C and block LST–15B are telescoped over pin J–7, secured at opposite ends to two blocks J–5, for endwise movement thereon so springs LST–15C resiliently urge block LST–15B and bar LST–15A to centered position so that switch LS–15 will be normally open. However, moving trip bar LST–15A in FIGS. 12 and 15 endwise in either direction, as will occur when frame J is moved in direction DEL or DER against a load W in frame F, will cause notch LST–15D to close switch LS–15 in FIG. 22B.

Whenever during the travel of frames E and J in direction DEL into position P3 or P6 or in direction DER into position P7 a dangerous condition occurs with frame J having a jamming action against a load W already in one of these positions in frame F, normally open switch LS–15 in FIG. 22B is closed by trip LST–15 on frame J to form circuit No. 134 to return all frames of carrier K immediately to starting position P1. This circuit No. 134 is formed from terminal T–1 in FIG. 22A through normally open contact 3R–3 now closed by energized coil 3R–C; terminals T–3 in FIG. 22A to FIG. 22B; closed switch LS–15 in FIG. 22B; unlatching coil 1LR–UC; terminals T–4 in FIG. 22B to FIG. 22A; and terminal T–2 in FIG. 22A.

If the frame E is moving in direction DEL toward position P6 in left panel FAL when it jams against a load W in frame F in position P6, earlier defined "Advancing Travel Sequence No. 3K" has finished and there have been reformed circuit No. 17 to energize coil EL–C, and circuit No. 19 to energize motor EM and brake EMB.

Travel of frame E in direction DEL is stopped. When unlatching coil 1LR–UC is energized by closing switch LS–15, normally open contact 1LR–13 in FIG. 22B is opened to break circuit No. 17 to deenergize coil EL–C to break circuit No. 19 to deenergize motor EM and brake EMB.

Motor EM is energized to move frame E in return travel in direction DER. When unlatching coil 1LR–UC is energized by closing switch LS–15, contact 1LR–10 is returned to its normally closed position so that circuit No. 27 reforms to energize coil ER–C to reform circuit No. 29 to energize motor EM and to energize and disengage brake EMB to move frame E in direction DER back to position PEC. In position PEC, trip LST–13 opens switch LS–13A to break circuit No. 27 to deenergize coil ER–C to break circuit No. 29 to deenergize and stop motor EM and to deenergize and engage brake EMB to stop frame E in position PEC.

If the frame E is moving in direction DER toward position P7 in right panel FAR when it jams against a load W in frame F in position P7, "Advancing Travel Sequence No. 3K" has ended and there have ben reformed circuit No. 118 to energize coil ER–C, and circuit No. 29 to energize motor EM and brake EMB.

Travel of frame E in direction DER is stopped. When switch LS–15 energizes coil 1LR–UC, normaly open contact 1LR–13 in FIG. 22B opens to break circuit No. 118 to deenergize coil ER–C to break circuit No. 29 to deenergize motor EM and brake EMB.

Motor EM is energized to move frame E in returning direction DEL. When switch LS–15 closes to energize unlaching coil 1LR–UC, contact 1LR–10 in FIG. 22B is returned to its normally closed position so that circuit No. 124 reforms to energize coil EL–C to reform circuit No. 19 to energize motor EM and to energize and disengage brake EMB to move frame E in direction DEL back to position PEC. In position PEC, trip LST–13 opens switch LS–13A to break circuit No. 124 to deenergize coil EL–C to break circuit No. 19 to deenergize and stop motor EM and to deenergize and engage brake EMB to stop frame E in position PEC.

As the aforedescribed return travel of frame E starts in direction DEL or DER and the contact with load W in frame F is broken, circuit No. 134 is broken.

Now, it should be apparent that frame E has returned to position PEC at position P5: (1) either after being returned in direction DER after advance toward position P6 was stopped or (2) after being returned in direction DEL after advance toward position P7 was stopped. In position P5, frame V is moved in down direction DVD to position P4 and frame H is moved in reverse direction DHR to position P1. Since frames V and E are now in position P5, trip LST–13 on frame E closes switch LS–13B to reform circuits Nos. 30, 13, 31 and 33 to energize respectively coil VB–C, brake VMB, coil VFD–C and motor VM in "Returning Travel Sequence No. 4K." Since there has been earlier formed, and still exist, the proper circuits (circuit No. 1 to energize transformer T, and circuit No. 50 to energize coil 3R–C) needed for this sequence and since coil 1LR–UC has unlatched its controlled contacts, carrier K now proceeds from these circuits Nos. 30,13, 31 and 33 through the remainder of this earlier defined "Returning Travel Sequence No. 4K" by having frame V travel in direction DVD and frame H travel in direction DHR back to position P1.

Now, all frames of carrier K are in position P1, all circuits are deenergized except circuit No. 1 to transformer T in FIG. 21, and all contacts are in their normal and illustrated positions. Carrier K is in control position P1 so as to be easily viewed by the operator at this position and to receive further travel instructions from the operator.

If frame E is moving in direction DEL toward position P3 in left panel FAL when it jams against a load W in frame F in position P3, earlier defined "Advancing Travel Sequence No. 1K" is occurring and there have been reformed circuit No. 17 to energize coil EL–C, and circuit No. 19 to energize motor EM and brake EMB.

Travel of frame E in direction DEL is stopped. When unlatching coil 1LR–UC is energized by closing switch LS–15, normally open contact 1LR–13 in FIG. 22B is opened to break circuit No. 17 to deenergize coil EL–C to break circuit No. 19 to deenergize coil EM and brake EMB.

Motor EM is energized to move frame E in direction DER, and frame V is moved in down direction DVD to position P1. When unlatching coil 1LR–UC is energized, contact 1LR–10 is returned to its normally closed position so that circuit No. 27 reforms to energize coil ER–C to reform circuit No. 29 to energize motor EM and to energize and disengage brake EMB to move frame E in direction DER toward position PEC in position P2. Since there has been earlier formed, and still exist, the proper circuits (circuit No. 1 to energize transformer T, circuit No. 26 to energize coil 4R–C, and circuit No. 10 to energize coil 3R–C) needed for "Returning Travel Sequence No. 2K" and since coil 1LR–UC has unlatched its controlled contacts, carrier K now proceeds from these circuits Nos. 27 and 29 through the remainder of this earlier defined "Returning Travel Sequence No. 2K" by having frame E travel to position P2 in direction DER and frame V travel in direction DVD back to position P1.

As the return travel of frame E starts in direction DER and the contact with load W in frame F is broken, circuit No. 134 is broken.

Now, all frames of carrier K are in position P1, all circuits are deenergized except circuit No. 1 to transformer T in FIG. 21, and all contacts are in their normal and illustrated positions. Carrier K is in control position P1 so as to be easily viewed by the operator at this position and to receive further travel instructions from the operator.

*Thermal Overloads*

The control means has some electrical components, including motors HM, VM, EM and JM. Means is provided responsive to thermal overloading of at least one of these electrical components for automatically stopping carrier K. A manually actuatable element, including switch button S3, SL or SR, is provided for automatically moving carrier K back to reference position P1 after this overload is corrected.

Thermal overload circuit breaker coils and contacts are provided for stopping the drive to carrier K upon over heating of any thermal overload coil in any motor energizing circuit. When any of the thermal overload contacts HFOL–1, HFOL–2, HSOL–1, HSOL–2, VFOL–1, VFOL–2, VSOL–1, VSOL–2, EOL–1, EOL–2, JOL–1 or JOL–2 in FIG. 22A is opened by thermal overloading any of thermal overload circuit breaker coils HFOL–C1, HFOL–C2, HSOL–C1, HSOL–C2, VFOL–C1, VFOL–C2, VSOL–C1, VSOL–C2, EOL–C1, EOL–C2, JOL–C1 or JOL–C2 in the power lines to the load carrying motor HM, VM, EM and JM in FIG. 21, movement of carrier K is stopped because opening any of these contacts will break energizing circuit Nos. 8, 10, 40, 43, 50 and/or 114 for coil 3R–C.

After the overload is corrected, movement of carrier K may be started by pushing the switch button S3, SL or SR, earlier pushed at the beginning of travel, to start the movement of carrier K. Pushing button S3 will reform circuit No. 3 to energize coil 2LR–UC, No. 5 to energize coil 4R–C, No. 6 to energize coil 1LR–LC, No. 8 to energize coil 3R–C, No. 9 to maintain energized coil 4R–C, No. 10 to maintain energized coil 3R–C, and/or No. 26 to maintain energized coil 4R–C so that coils 3R–C and 4R–C will be energized. Pushing button SL will reform circuit No. 38 to energize coil 1LR–LC, No. 40 to energize coil 3R–C, No. 41 to energize coil 2LR–UC, and/or No. 43 and/or No. 50 to maintain energized coil 3R–C. Pushing button SR will reform circuit No. 113 to energize coil 1LR–LC, No. 114 to energize coil 3R–C, No. 115 to energize coil 2LR–LC, and/or No. 43 and/or No. 50 to maintain energized coil 3R–C.

When overload occurs carrier K may be moving in advancing or returning directions. If a frame of carrier K is moving in an advancing direction from position P1 toward preselected end position P3, P6 or P7 when overload occurs, pushing the appropriate switch button will cause carrier K to continue in this advancing direction to service this end position, and then return to position P1 in the normal manner. If a frame of carrier K is moving in the returning direction from position P3, P6 or P7 toward position P1 when overload occurs, the frame of carrier K will start in the forward direction, since coil 1LR–LC has been energized and since coil 3R–C and/or coil 4R–C has been energized, to do one of the following events: (1) service an empty surface F–1 at position P3, P6 or P7; (2) engage a load by a jamming action in position P3, P6 or P7 so as to actuate switch LS–15 by trip LST–15; or (3) travel to the overtravel limit stop to actuate switch LS–1 or LS–6 with the count on counter HNN or VNN determining which of these events will occur; and then will move in the returning direction back to position P1. In any situation, the operator at position P1 will have full control of the operation.

Now, all frames of carrier K are in position P1, all circuits are deenergized except circuit No. 1 to transformer T in FIG. 21, and all contacts are in their normal and illustrated positions. Carrier K is in control position P1 so as to be easily viewed by the operator at this position and to receive further travel instructions from the operator.

*Manually Controlled Operation—(1) Horizontal Movement of Frame H of Carrier K in Direction DHF, and (2) Vertical Movement of Frame V of Carrier K in Direction DVU*

During set up or testing of the apparatus, it is desirable that the travel of the carrier K be limited either to one direction or to the travel of one frame member H or V at a time so as to accurately check the mode of operation and to avoid any damage to the component parts. This mode of control is provided by opening one or more of the switches SV and SE in FIG. 22B.

If the operator desires only horizontal travel of frame H in direction DHF to position P4 where all frames of carrier K will stop, he may open contact SV–1 of switch SV in FIG. 22B. After button SL or SR is pushed, horizontally movable frame H is moved by motor HM in horizontally forward direction DHF from position P1 to position P4 in "Advancing Travel Sequence No. 3K," and frame H stops in position P4. The proper circuits will be formed to permit frame H to travel to position P4, and then the open switch contact SV–1 of switch SV will prevent vertical movement of frame V because circuits Nos. 69 and 71 cannot be reformed to continue earlier defined "Advancing Travel Sequence No. 3K" to energize respectively brake coil VB–C and motor starter coil VFU–C.

If the operator desires horizontal travel of frame H in direction DHF from position P1 to P4 and then only vertical travel of frame V in direction DVU to position P5 where all frames of carrier K will stop, he may open contact SE–1 of switch SE in FIG. 22B. After button SL or SR is pushed, frame H is moved from position P1 to P4 and vertically movable frame V is moved by motor VM in vertical up direction DVU from position P4 to position P5 in earlier defined "Advancing Travel Sequence No. 3K," and frame V stops in position P5. Proper circuits will be formed to permit frames H and V to travel to position P5, and then the open switch contacts SE–1 of switch SE will prevent lateral movement of frame E in direction DEL or DER because the circuit No. 17 cannot be reformed to energize coil EL–C and circuit No. 118 cannot be formed to energize coil ER–C.

Closing switch SV and SE will permit carrier K to travel to position P6, P7, or one of the overtravel limit stop positions so as to be returned to position P1 in the manner earlier described.

*General Comments*

Some general aspects of the invention which come within the scope of the invention illustrated, are as follows.

First, although frame H is shown as being horizontally movable and frame V is shown as being vertically movable, it should be readily apparent that many of the described features will function well with any suitable directionally movable frame substituted for these frames to travel in zone KZ with this directionally movable frame movable horizontally, vertically, diagonally, or any combination thereof.

Second, although carrier K has been disclosed as always returning to start or reference position P1 said carrier, it should be readily apparent that it is within the scope of this invention to have said carrier travel directly from position P2 to P5, P5 to P2, P6 to P7, P7 to P6, and/or between different P5 positions respectively aligned with different load storage positions P6 or P7 located at different levels FL and/or bays FB in frame F instead of having to travel through position P1 or P4 when traveling between these positions.

Third, although a single position P3 has been provided for receiving the load W into the apparatus and for discharging the load W therefrom, it should be readily apparent that the load may be received at position P3 and discharged from the apparatus at a new position spaced therefrom along carrier travel zone KZ, or the load may be discharged at position P3 and received at this aforesaid new position.

Fourth, frame F has been disclosed in FIGS. 1 to 3, inclusive, as having load support surface F–1 as being part of the same frame in both the positions P3 and P6. It is intended that the word "frame," in referring to frame F, will cover any construction wherein a load support surface F–1 on frame F at position P3, or at some load storage position in frame F other than that illustrated as position P6 in FIG. 1, is either rigidly connected with or detachably associated in proper position with a corresponding surface at position P6. For example, frame F in FIG. 1 has load support surfaces F–1 at positions P3 and P6 rigidly connected together by welded and/or bolted construction. It will be readily apparent that any properly constructed dolly, cart, lift truck, or surface may be used in frame F, to take load W into or away from position P3 for storing in or receiving from stationary load storage position P6 in stationary frame F. If frame F is movable, such as mounted in the body of a semi-trailer, the load support surface F–1 in position P3 may be any stationary surface, dolly, cart or lift truck which may be moved into proper alignment. Also, load W may be brought to or taken away from the load support surface F–1 at position P3 in any suitable manner, such as by conveyor, rollers, fork lift truck, etc.

Fifth, frame F may serve as a storage wall backed against the structural wall of any manufacturing plant.

Sixth, the control means of the invention is especially adapted for automatic operation. This is readily apparent when one considers the travel of the carrier K from position P4 to P5 to P6 to P5 and back to position P4, which travel takes place in the same automatic manner as travel from position P1 to P2 to P3 to P2 and back to position P1. As frame V moves in direction DVU to approach position P5, frame E is moved from position PEC to position PEL or PER in position P5 in response to the vertically movable frame V approaching position P5 so as to actuate switch LS–8 in FIG. 2. As frame E approaches out position PEL or PER, load support frame J is moved to its opposite position, whether it be position PJU or PJD, in response to frame E being in one of these out positions so as to actuate switch LS–12L or LS–12R in FIG. 2. Then, laterally movable frame E is moved back to position PEC in the opposite direction DEL or DER in response to load support frame J being in its new or opposite position so as to actuate switch LS–10 or LS–11 in FIG. 3. As frame E approaches position PEC, frame V is caused to be moved in direction DVD in response to the movement of frame E actuating switches LS–13 in FIG. 2.

Seventh, as previously described, frame J may assume either an up position PJU or down position PJD. If frame J is in the wrong position through inadvertance, it may be moved to the other or right position by running carrier K through one forward and reverse cycle to the loading position P1 or to position P6 or P7 at any unloaded opening F–2 in the frame F.

Eighth, directionally movable frames H and V have their movements controlled by the associated circuits and respective counters HNN in FIG. 23H and VNN in FIG. 24V. The disclosed control means includes counting means responsive to travel of either of these directionally movable frames relative to position P1, P4 or P5 along a horizontal or vertical direction for maintaining directional movement of either of these directionally movable frames from one of these positions to another of these positions and for stopping either of these directionally movable frames at said other position. For example, travel of frame H from one position P1 to other position P4 is controlled by counter HNN.

Ninth, although counters HNN, in FIG. 23H and VNN in FIG. 24V are shown with only two number wheels HNN–W1 and HNN–W10 therein, it should be readily apparent that any suitable number of number wheels may be used in either of these counters, as is apparent from the aforesaid F. T. Blackman patent, No. 2,799,740, with the total number being determined by the number of bays FB and levels FL in frame F.

The structural features of the apparatus will be described as to: (1) multiplicity of functions provided by some components, (2) some general advantages of the construction not mentioned heretofore, (3) assurance of satisfactory operation of the apparatus under all conditions, and especially if settling of its base occurs or if some misalignment is encountered in the structure during operation of the apparatus, so as to assure that frame E may enter each opening F–2 and the load receiving or discharging position P3, and (4) the coaction of the frames of carrier K and of frame F so that minimum vertical space is wasted by operation of the apparatus and maximum space is retained for vertical stacking storage of load W in minimum space in frame F. Some of these features have been mentioned in detail heretofore and only the new ones will be mentioned at this time.

Frame F will be discussed. Its ease of assembly, accuracy after assembly, and rigidity of construction have been mentioned in the specific description of frame F. Top and bottom tie members F–7 and F–8 in transverse frame sections F–5 are spaced along and extend across carrier travel zone KZ with these tie members secured to both the left and right frame panels FAL and FAR to maintain generally constant the width of this travel zone KZ along the length thereof so that load carrier K may service any of the openings F–2 or positions P3, P6 or P7 therealong. The shape of this travel zone KZ is maintained so that frames V, E and J will have a clear, vertical, straight line travel between adjacent transverse sections F–5 in directions DVU and DVD. The upper tie members F–7 have secured thereto power lines L1, L2 and L3; rail member F–16; and the upper gear rack F–14. The lower tie members F–8 have secured thereto the lower rail member F–17, upon which wheels HM–12 of carrier frame H travel; and have secured thereto lower gear rack F–15. Hence, these tie members F–7 and F–8 register or align frame H for travel by its wheels HM–12 on rail member F–17. The bottom tie members F–8 provide switch trips LST–2 and LST–3 in FIGS. 4 and 13 at each bay FB for tripping switches LS–2 and LS–2 in FIG. 4 in alignment with each bay FB for controlling movement of carrier K, and especially its frames H and V, during alignment with any selected bay FB, or load support surface F–1 therein, arranged along direction DHF by pulsing the horizontal counter components in FIG. 23H; stopping travel of frame H in direction DHF; and starting upward movement of frame V in direction DVU. Horizontally movable frame H will be stopped in alignment with any preselected bay FB since the lower tie members F–8 are spaced apart with one at each bay FB because one is in each transverse frame section F–5, and switch LS–3 on frame H coacts with its trip LST–3 on tie member F–8 for stopping horizontally movable frame H at preselected bay FB.

If settling of cement frame base ZB occurs, mast H–1 will be maintained in vertical alignment with all vertically aligned openings F–2 in any bay FB. If the left end of the cement base ZB in FIG. 5 settles so as to downwardly incline toward the left racks F–14 and F–15 and rails F–16 and F–17, or if one end of frame F moves generally vertically relative to the end, mast H–1 would tend to swing counterclockwise from its vertical position to a position inclined upwardly to the left in FIG. 5. However, the structure of the apparatus will prevent this from occurring. Top and bottom pinion gears HM–8 are synchronized to rotate together by their connecting shaft HM–4 in FIGS. 6 and 7 for maintaining mast H–1 in generally vertical orientation and parallel to the vertically aligned openings F–2 in each bay FB because upper and lower racks F–14 and F–15 are secured to cross tie members F–7 and F–8 of each transverse frame section F–5. If necessary, frame H can ride on one of its rolling support means or wheels HM–12 rolling on rail F–17, and its side guide rollers HM–11 can move axially or vertically in their side guide channels F–13, so that frame H will travel on only one of its supporting wheels on the horizontally extending single rail member F–17 fixed with respect to the remainder of the load storage frame F. Carrier K is prevented from tilting on rail F–17 by the pinion gears HM–8 engaging racks F–14 and F–15 a spaced distance from this rail and by the guide way engaging means, shown as roller HM–11, on frame H traveling in the horizontally extending guide way channel member F–13 spaced above rail F–17. Since the distance between frame members F–9 is carefully maintained in each transverse frame section F–5 in FIG. 5, width of aisle or travel zone KZ is carefully controlled and rollers HM–11 keep mast H–1 properly aligned in zone KZ. Also, pinion gears HM–8 provide a positive drive if the direction of travel DHF or DHR is inclined relative to the horizontal because of settling. Also, if any misalignment of gears HM–8 and racks F–14 and F–15 exists or if bearings HM–7 are misaligned by lateral displacement out of coaxial alignment, compensation for misalignment will be provided by the flexibility of mast H–1 and by universal joints HM–5 in the synchronizing drive of gears HM–8.

The apparatus will work satisfactorily if the base for frame F, such as base ZB in FIG. 5, settles so that one end, corner or edge is lower than another, or if one end of frame F moves generally vertically relative to another, or if any other misalignment occurs. Then, in frame F the bolts in brackets F–13A connecting parallel reinforcing members F–13 and F–14 in FIGS. 5 and 7B, extending longitudinally of zone KZ, with frame sections F–5 will cause by a parallelogram action frame sections F–5 to remain parallel, vertical and equally spaced during settling, etc. so that the apparatus will operate properly.

Mast H–1 is flexible. Then, even though misalignment may exist, mast H–1 is flexible so that vertically movable frame V may be moved into alignment with all vertically arranged openings F–2 in any one bay FB for load movement through each of these openings without horizontally moving the horizontally movable frame H. Also, mast H–1 can be flexible without having load W cause substantial lateral deflection thereof. When load W is moved in direction DVU or DVD and frame E is in position PEC, the load is located between mast sections H–1A and H–1B to minimize lateral deflection of the mast and to load the mast generally axially. When frame E has been moved in direction DEL or DER and is out of position PEC, the load is located laterally of the mast so that it would normally tend to deflect laterally the flexible mast a substantial amount. However, lateral deflection of the mast is minimized because the weight of frame E, and any load W thereon, is supported by engagement of rollers EM–8 with load support members F–3 whenever frame E is out of position PEC so that this weight does not cause lateral deflection of the mast.

Mast H–1 is guided and supported. A horizontally extending guide way is provided by channel members F–13 in FIG. 7 carried by load storage frame F and fixed with respect to rails F–17. A guide way slidable engaging means, such as roller HM–11 on mast H–1, slidably engages this guide way or channel member during horizontal travel of frame H while wheels HM–12 travel on lower rail F–17. This construction minimizes lateral deflection of mast H–1; prevents tilting of frame H on rail F–17; steadies movement of frame V in directions DVU and DVD up near the top of the mast; if the frame F has settled by relative rotation of different portions thereof around an axis extending in direction DHF, causes guide rollers HM–11 and guide rollers HM–12 to swing frame H, during its movement in direction DHF or DHR, to follow the settling of frame F so that frame E can enter the openings in the storage frame; and causes the path of travel of carriers K on its rail to generally maintain alignment with all openings of frames F if any frame twists about the length of said rail as an axis of said rail changes its straight shape.

Mast H–1 carries the LST switch trips in FIG. 2 to maintain them in proper alignment with their associated limit switches LS on frame V during any settling of the frame F and during relative movement of the frames. These switches and trips are coacting position responsive means in the aforedescribed control means for detecting the position of vertically movable frame V.

Frame V is properly guided and supported on mast H–1. Mast H–1 has channels H–1A and H–1B engaged by rollers VM–8, VM–9, VM–10 and VM–11 in FIGS. 8 and 9 for vertically guiding frame V thereon with these frames and any load W carried thereby supported during vertical movement in cantilever relationship to mast H–1.

Lateral deflection of mast H–1 does not change horizontal orientation of frame V. Synchronized pinion gears VM–5 and VM–6 in FIG. 8 engage respectively the horizontally spaced apart, generally vertically extending pairs of gear racks H–3A and H–3B, secured to mast sections H–1A and H–1B (which mast sections are fixed together in lateral spaced relationship on frame H at bottom ends to base H–2; at top ends by connecting member H–1C securing to and spacing apart mast sections H–1A, H–1B; and at one or more spaced points along its vertical length by two rigid horizontal bars in FIG. 6 with each bar not shown in the drawings, extending between a pair of horizontally aligned rollers HM–11 in FIG. 6 behind mast sections H–1A and H–1B, secured at opposite ends to the brackets supporting these rollers to maintain the horizontal spacing between sections H–1A and H–1B, and located in the associated channel F–13) with these pairs of pinion gears having synchronized movements by their connecting shafts VM–4. This synchronized movement forces the frame V to remain parallel to base H–2 or during lateral deflection of mast H–1 (this parallel orientation being generally horizontal) even though there may be lateral deflection of mast H–1. Also, connecting member H–1C causes mast sections H–1A or H–1B to move together in lateral deflection.

Frame V requires only one brake VMB. Since these gear racks are generally fixed against vertical movement relative to the frame F with the rotatable pinion gears thereon driven by motor, automatic engagement of the brake VMB on these motors by the control means during stopping of the motor will prevent, by the gears and gear racks, downward free travel of the frame V. No separate brake is needed between frame V and mast H–1.

When the carrier is in position P2 or P5, suitable structure is provided to assure that frame E will properly enter the opening F–2 even though some misalignment may be present. Load storage frame F in FIGS. 6 and 14 has two parallel, horizontally or laterally extending guide ways F–3B in frame members F–3 at each load support surface F–1. Frame V has a similar horizontally or laterally extending guide way V–3B in member V–3. Each of these guide ways has two spaced apart opposed surfaces with each of these surfaces being at least L-shape in transverse section, as shown by horizontal surfaces F–3D or V–3C and by vertical surfaces F–3C or V–3C. A guide or slidable engaging means is provided on laterally moving frame E for engaging these guide way surfaces with these comprising at least two pairs of rollers on laterally movable E. At least one pair of these rollers EM–9 is rotatable about parallel vertical axes and at least the other pair of these rollers EM–8 is rotatable about parallel horizontal axes to roll respectively on the vertical surfaces F–3C and V–3C and on the horizontal surfaces F–3D and V–3D. One roller of each pair rolls on each L-shape of member F–3 or V–3 while frame E supports load W in vertically spaced relationship to these rollers. These rollers pull the laterally movable frame E into alignment with frame F even if some misalignment exists; guide passage of frame E between positions PEC and PEL or PER; and since mast H–1 is flexible, frame E may be easily moved by the rollers into alignment for movement through the opening F–2 into load engageable alignment with the load support surface F–1 thereat. Since each of these rollers EM–8 or EM–9 has a crowned periphery, it will easily insert into member F–3 even though, in each pair of these members F–3 and V–3 axially or longitudinally aligned along directions DEL and DER, the rollers and member V–3 may be twisted or rotationally displaced relative to member F–3 about this longitudinal axis. As mentioned before, the gear racks F–14 and F–15, H–3A and H–3B, and their associated synchronized meshing pinion gears HM–8, VM–5 and VB–6 force frame E to remain horizontal and parallel to frame H during settling or during lateral deflection of mast H–1 in direction DHF or DHR. Therefore, the rollers will easily fit into the channel members F–3, and especially since the tops and bottoms of the two sections H–1A and H–1B of mast H–1 are tied together at the top by member H–1C and at the bottom by the base H–2 of frame H.

During settling or misalignment, any tilting of frame H or V relative to its driving gear racks will not cause disengagement of or dangerous loads on the gear teeth of their drive pinion gears HM–8, VM–5 and VM–6, and their gear racks F–14 and F–15 or H–3A and H–3B. Since all pinion gears have long axial gear tooth extent, these gears will still drivingly engage their racks even though the frame H or V is tilted relative to its driving gear rack, such as when mast H–1 is laterally deflected or when frame H rides only on one wheel. Also, the teeth of the pinion gears are crowned so no corner bearing action on the teeth will occur during tilting to cause a high tooth stress load.

Means for moving the frame E between its positions is extremely compact to operate in minimum vertical height over and under the loads in frame F. The wheels, or sprockets EM–5 and EM–6 in FIGS. 12, 13 and 14, and the flexible means, or sprocket chains EM–7, lie in a plane parallel to the direction of motion DEL of the frame E so that it can easily reach between the stacked loads W.

Frames F and E are constructed so that maximum strength is obtained with minimum space wasted in frame F so maximum size loads W may be stored therein. Some of these features have been discussed in describing the drives for frames E or J. Also, load storage frame F has in each bay FB only two vertically extending columns F–9 straddling each load support surface F–1 and has in each level FL only two horizontally extending guides F–3 located at opposite sides of each load support surface F–1 with one guide carried by each column F–9. Also, each column F–9 serves as a single common column for guides F–3 in two adjacent bays FB. Only guide rollers EM–8 and EM–9 engage the guide surfaces F–3C and F–3D during travel between in and out positions PEC and PEL or PER. This simple construction provides maximum strength in minimum space at minimum cost with the least number of component parts.

Frame F is constructed so that the apparatus can handle a load having a greater vertical height than a single opening F–2 or the vertical distance between vertically adjacent load support surfaces F–1. This is specifically shown as load WA in FIG. 6. This is true as long as the width of the load is less than the horizontal dimension of the gap F–30 between facing support or guide members F–3 in FIG. 6.

Fluid driven jack motors JM–9 in FIGS. 12 and 17 are arranged to respectively exert equal vertical forces on the four corners of load support frame J. The motors in each form are connected in parallel with its associated pump JM–6, JM–7 in FIGS. 19 and 21 to be self-equalizing and exert these equal forces.

Minimum space is taken up by this jack motor construction. The piston and cylinder JM–10B and JM–10A of each motor JM–9 are generally aligned with at least some of the rollers EM–8 and EM–9 in the direction DEL or DER of travel of laterally movable frame E to provide a compact construction with minimum space waste in frame F. Fluid actuated lifting equipment is desirable if lifting of frame J is to occur in the limited vertical clearance between loads W. The construction in FIGS. 12–18 is especially adapted for operating in this minimum vertical clearance.

When frame V is moved in vertical up direction DVU by a first power means, including motor VM, it is stopped accurately at any preselected level FL so that frame E may be inserted by movement in direction DEL or DER. Trip LST–8 in FIG. 2 assures stopping at the proper level by serving as position responsive means for frame V for deenergizing motor VM. It is not necessary for frame V to overtravel upwardly in direction DVU and then come back down in direction DVD to accurately stop at the proper level. After frame E is moved to position PEL or PER, frame J is moved in direction DJU or DJD by a second power means, including motor JM, operable independently of the first means used to move frame V.

Safety overtravel, jam action and return of carrier K to position P1 has been described when frame J is in up position PJU to prevent collision damage by trying to move this frame J into out position PEL or PER at a load bearing surface on frame F. Also, if the bottom of load W in frame F should be bowed downwardly under the weight of the load so that surface W–3 in FIG. 3 prevents insertion thereunder of surface J–3 when frame J is in down position PJD, the jam action and the return of carrier K to position P1 will take place in generally the same manner.

If frame F is constructed with rail F–17 in FIG. 6 not perfectly straight, but with a limited amount of horizontal and/or vertical wave therein, all frames of carrier K will work properly. Since frame members F–13, F–16 and F–17 in FIG. 7 are fixed in corresponding positions on all frame sections F–10, and since all frame sections F–10 are identical in shape, any wave in rail F–17 will cause a corresponding wave in each of the other frame members and carrier K will always bear the same relationship to each frame section F–10 so that all frames of carrier K will operate properly.

Various changes in details and arrangement of parts can be made by one skilled in the art without departing from either the spirit of this invention or the scope of the appended claims.

What is claimed is:

1. A load transfer and storage apparatus comprising a storage frame having a plurality of load support means arranged in vertical and horizontal rows; means defining a pick-up and discharge station independent of said support means; a load carrier normally positioned at said station and movable between said station and any of said support means; said carrier comprising a horizontally movable frame movable past said vertical rows, a vertically movable frame thereon movable past said horizontal rows, a laterally extendible frame carried by said vertically movable frame extendible into said storage frame, and a lift frame carried by said extendible frame movable between raised and lowered positions for raising or lowering a load relative to said support means; power means separately actuating movements of said carrier frames in use; control means for operating said carrier comprising first control elements corresponding respectively to the vertical rows of said support means and second control elements corresponding respectively to the horizontal rows of said support means; said power means responsive to said control means to actuate said carrier frames in such manner as to deliver a load from said station to a selected one of said support means or return a load from said selected support means to said station, by sequential movements of said carrier frames in a single cycle of operation beginning and ending with said carrier positioned at said station, in response to actuation of selected first and second control elements corresponding to selected vertical and horizontal rows the intersection of which defines the location of said selected support means; said control means including means responsive to said lift frame in its raised position determining that said single cycle will effect delivery of a load to said selected support means and means responsive to said lift frame in its lowered position determining that said single cycle will effect return of a load from said selected support means.

2. A load transfer and storage apparatus as set forth in claim 1 wherein the recited control means includes means responsive to said laterally extendible frame in the extended position raising said lift frame when it is initially in the lowered position and means responsive to said laterally extendible frame in the extended position lowering said lift frame when it is initially in the raised position.

3. A load transfer and storage apparatus as set forth in claim 1 wherein the recited control means includes means responsive to said lift frame moving from raised to lowered position and means responsive to said lift frame moving from lowered to raised position, when said extendible frame is in its extended position, causing said laterally extendible frame to retract from its extended position.

4. A load transfer and storage apparatus as set forth in claim 1 wherein the recited control means includes means responsive to loads positioned simultaneously on both said selected support means and said carrier stopping, before collision damage occurs, travel of said laterally extendible frame in the direction of said storage frame, and means automatically thereafter returning said carrier to said station.

5. A load transfer and storage apparatus as set forth in claim 1 including means defining a normal limit of travel away from said station for said horizontally movable frame; means defining a normal limit of travel of said vertically movable frame in an upward direction; and wherein the recited control means includes means responsive to overtravel of said horizontally movable frame and means responsive to overtravel of said vertically movable frame automatically returning said carrier to said station.

6. A load transfer and storage apparatus as set forth in claim 1 wherein the recited control means has at least some electrical components; means responsive to thermal overloading of at least one of said electrical components automatically stopping said carrier during its travel in any direction; and a manually actuatable element for automatically moving said carrier to said station after correcting said overload.

7. A load transfer and storage apparatus as set forth in claim 1 wherein the recited control means includes manually actuatable elements located on said carrier for controlling thereat all movements of the frames of said carrier.

8. A load transfer and storage apparatus as set forth in claim 1 with said control means including means responsive to said laterally extendible frame moving out of said storage frame for moving said carrier back to said station.

9. A load transfer and storage apparatus as set forth in claim 1 with said storage frame having left and right side load support means straddling said carrier relative to its horizontal path of movement; said control means including manually actuatable control elements corresponding to said left and right side load support means; and means for moving said laterally extendible frame left or right and into alignment with one of said support means in response to actuating the control element corresponding to a selected side.

10. A load transfer and storage apparatus as set forth in claim 1 with said control elements mounted on said carrier and actuatable at said station for preselecting thereat one of said load support means for controlling the movement of said carrier to said last mentioned load support means; and said control means including means for automatically returning said carrier to said station in response to movement of said laterally extendible frame out of said storage frame.

11. A load transfer and storage apparatus as set forth in claim 1 wherein the recited horizontally movable frame has a vertically extending mast; said vertically movable frame movable vertically on said mast; and said control means including coacting vertically movable frame position responsive means on said mast and vertically movable frame for controlling movement of some of said frames, with alignment of said position responsive means maintained during relative movement of said frames.

12. A load transfer and storage apparatus as set forth in claim 1 with said power means including a first power means for vertically moving said vertically movable frame; vertically movable frame position responsive means for deenergizing said first power means when said vertically movable frame reaches alignment with one of said load support means so that said laterally extendible frame is aligned to move into said storage frame; and including a second power means operable independently of said first power means for moving said lift frame between its positions while said laterally extendible frame is in said storage frame.

13. A load transfer and storage apparatus comprising a storage frame having a plurality of load support means arranged in vertical and horizontal rows; means defining a pick-up and discharge station; a load carrier movable between said station and any of said support means; said carrier including laterally extendible means extendible into said storage frame for picking up a load from or depositing a load at any of said support means; at least a portion of said laterally extendible means being movable between raised and lowered positions for raising and lowering a load relative to said support means; power means for actuating said carrier; control means for operating said carrier including a common selector means for said load support means; said selector means comprising first control elements each corresponding respectively to an entire vertical row of said support means and second control elements each corresponding respectively to an entire horizontal row of said support means; said power means responsive to said control means to actuate said carrier in such manner as to cause it to move forwardly from said station toward and into a selected one of said support means in response to actuation of selected first and second control elements corresponding to selected vertical and horizontal rows the intersection of which defines the location of said selected support means; said control means including reversing means automatically returning said carrier to said station in response to picking up a load from or depositing a load at a selected support means; means for interrupting said forward motion including pressure actuated means carried by said portion and positioned thereon to pass under a load on a selected support means when said portion is in its lowered position and to abut a load already on a selected support means when said portion is in its raised position, and means responsive to said pressure actuated means operatively connected with said reversing means for actuating said reversing means and causing return of said carrier to said pick-up and discharge station.

14. A load transfer and storage apparatus as set forth in claim 13, wherein means is provided for stopping said carrier upon travel of said carrier beyond said horizontal row farthest spaced vertically from said pick-up and discharge station or beyond said vertical row most remote from said pick-up and discharge station.

15. A load transfer and storage apparatus as set forth in claim 13, wherein means is provided for stopping said carrier responsive to undesirable overload of said power means.

References Cited in the file of this patent

UNITED STATES PATENTS

| | | |
|---|---|---|
| 292,265 | Stoddard | Jan. 22, 1884 |
| 920,630 | Ocumpaugh | May 4, 1909 |
| 940,878 | Jones et al. | Nov. 23, 1909 |
| 1,566,488 | Lewis et al. | Dec. 22, 1925 |
| 1,768,360 | Jenney | June 24, 1930 |
| 1,824,201 | Eisenberg | Sept. 22, 1931 |
| 1,879,713 | Scott | Sept. 27, 1932 |
| 1,911,015 | Crabbe et al. | May 23, 1933 |
| 2,028,391 | Harnischfeger | Jan. 21, 1936 |
| 2,102,995 | Coombs | Dec. 21, 1937 |
| 2,451,368 | White et al. | Oct. 12, 1948 |
| 2,602,557 | Sinclair | July 8, 1952 |
| 2,605,004 | Gruenberg | July 29, 1952 |
| 2,605,912 | Small et al. | Aug. 5, 1952 |
| 2,626,065 | Sanders et al. | Jan. 20, 1953 |
| 2,626,718 | Weber | Jan. 27, 1953 |
| 2,652,938 | Murphy | Sept. 22, 1953 |
| 2,663,436 | Bowser | Dec. 22, 1953 |
| 2,665,013 | Socke | Jan. 5, 1954 |
| 2,667,983 | Billings | Feb. 2, 1954 |
| 2,675,134 | Becker | Apr. 13, 1954 |
| 2,676,388 | Faure et al. | Apr. 27, 1954 |
| 2,691,448 | Lontz | Oct. 12, 1954 |
| 2,699,878 | Avery | Jan. 18, 1955 |
| 2,707,666 | Becker | May 3, 1955 |
| 2,720,694 | Hines | Oct. 18, 1955 |
| 2,804,218 | Sylvester et al. | Aug. 27, 1957 |
| 2,896,800 | Thomas et al. | July 28, 1959 |
| 2,915,204 | Alimanestiano | Dec. 1, 1959 |

FOREIGN PATENTS

| | | |
|---|---|---|
| 337,726 | Great Britain | Oct. 28, 1930 |
| 717,018 | Great Britain | Oct. 20, 1954 |

UNITED STATES PATENT OFFICE

CERTIFICATE OF CORRECTION

Patent No. 3,132,753 May 12, 1964

Anthony R. Chasar et al.

It is hereby certified that error appears in the above numbered patent requiring correction and that the said Letters Patent should read as corrected below.

In the grant, lines 1 to 3, for "Anthony R. Chasar, of Cleveland, and Walter F. Double, of Bainbridge, Ohio, assignors to Triax Equipment, of Cleveland, Ohio, a partnership," read -- Anthony R. Chasar, of Cleveland, and Walter F. Double, of Bainbridge, Ohio, assignors, by mesne assignments, to The Triax Company, a corporation of Ohio, --; line 12, for "Triax Equipment, their heirs" read -- The Triax Company, its successors --; in the heading to the printed specification, lines 4 to 6, for "Anthony R. Chasar, Cleveland, and Walter F. Double, Bainbridge, Ohio, assignors to Triax Equipment, Cleveland, Ohio, a partnership" read -- Anthony R. Chasar, Cleveland, and Walter F. Double, Bainbridge, Ohio, assignors, by mesne assignments, to The Triax Company, a corporation of Ohio --; column 4, lines 32 and 33, strike out "surface XF-1 being on"; same column 4, line 34, for "a" read -- A --; column 7, line 24, for "vertically" read -- vertical --; column 17, line 60, for "3R-3", second occurrence, read -- 3R-C --; column 18, line 11, for "CFU-1" read -- VFU-1 --; column 19, line 42, for "1LR-C" read -- 1LR-UC --; column 26, line 65, for "HN2-2" read -- HN2R-2 --; column 40, line 9, for "T-100" read -- T-10 --; column 50, line 9, for "LS-2", second occurrence, read -- LS-3 --; column 52, line 11, for "motor," read -- motor VM --; line 16, after "carrier" insert -- K --; line 31, after "movable" insert -- frame --; same column 52, line 54, for "VB-6" read -- VM-6 --.

Signed and sealed this 20th day of October 1964.

(SEAL)
Attest:

ERNEST W. SWIDER
Attesting Officer

EDWARD J. BRENNER
Commissioner of Patents